United States Patent
Reis et al.

[11] Patent Number: 5,341,142
[45] Date of Patent: Aug. 23, 1994

[54] TARGET ACQUISITION AND TRACKING SYSTEM

[75] Inventors: James J. Reis, La Palma; Anthony L. Luk, Rancho Palos Verdes; Antonio B. Lucero, Anaheim; David D. Garber, Cypress, all of Calif.

[73] Assignee: Northrop Grumman Corporation, Los Angeles, Calif.

[21] Appl. No.: 576,121

[22] Filed: Aug. 28, 1990

Related U.S. Application Data

[63] Continuation of Ser. No. 77,717, Jul. 24, 1987, abandoned.

[51] Int. Cl.$^5$ .............. G01S 13/86; G01S 13/88; G01S 13/89
[52] U.S. Cl. .......................... 342/64; 342/52; 342/53; 342/62; 342/63; 342/67; 244/3.15; 244/3.16; 244/3.17; 244/3.19
[58] Field of Search .................. 356/5, 28, 28.5; 342/52–57, 59, 61–68; 102/393; 244/3.15–3.19

[56] References Cited

U.S. PATENT DOCUMENTS

| | | | |
|---|---|---|---|
| 3,076,961 | 2/1963 | Bibbero | 342/53 |
| 3,108,270 | 10/1963 | Fairbanks | 342/53 |
| 3,501,762 | 3/1970 | Klees | 342/53 |
| 3,787,857 | 1/1974 | Lazarchik et al. | 342/52 X |
| 3,981,010 | 9/1976 | Michelsen | 342/55 |
| 4,015,258 | 3/1977 | Smith et al. | 342/54 |
| 4,264,907 | 4/1981 | Durand, Jr. et al. | 342/53 |
| 4,317,117 | 2/1982 | Chasek | 342/53 |

*Primary Examiner*—Bernarr E. Gregory
*Attorney, Agent, or Firm*—Terry J. Anderson; Robert B. Block; Karl J. Hoch, Jr.

[57] ABSTRACT

An automatic target acquisition and tracking system has been developed for a focal plane array seeker. The automatic target acquisition is achieved by three independent target acquisition algorithms, viz., the maximum likelihood classification, the video spatial clustering, and the target-to-interference ratio. Each algorithm operates asynchronously and provides independent target detection results. Target information is then combined hierarchically in a probabilistic fashion and prioritized. The highest priority target is handed off to a dual mode tracker consisting of a minimum absolute difference correlation tracker and a centroid tracker. The dual mode tracker subsequently provides a feedback signal to a proportional navigation system or other guidance/control system for directing the flight path of a munition.

59 Claims, 63 Drawing Sheets

```
                    EDGE DIRECTION IN "POINTED-TO" PIXEL
            0   1   2   3   4   5   6   7   8   9  10  11  12  13  14  15
         -----------------------------------------------------------------
    C   0 |  P   P  -C  -C   R   R   R   R   R   R   R   R   R   R  +C  +C
    E   1 |  P   P  -C  -C   R   R   R   R   R   R   R   R   R   R  +C  +C
    N   2 | +C  +C   D   D  -C  -C   R   R   R   R   R   R   R   R   R   R
    T   3 | +C  +C   D   D  -C  -C   R   R   R   R   R   R   R   R   R   R
    E   4 |  R   R  +C  +C   P   P  -C  -C   R   R   R   R   R   R   R   R
    R   5 |  R   R  +C  +C   P   P  -C  -C   R   R   R   R   R   R   R   R
        6 |  R   R   R   R  +C  +C   D   D  -C  -C   R   R   R   R   R   R
    D   7 |  R   R   R   R  +C  +C   D   D  -C  -C   R   R   R   R   R   R
    I   8 |  R   R   R   R   R   R  +C  +C   P   P  -C  -C   R   R   R   R
    R   9 |  R   R   R   R   R   R  +C  +C   P   P  -C  -C   R   R   R   R
    E  10 |  R   R   R   R   R   R   R   R  +C  +C   D   D  -C  -C   R   R
    C  11 |  R   R   R   R   R   R   R   R  +C  +C   D   D  -C  -C   R   R
    T  12 |  R   R   R   R   R   R   R   R   R   R  +C  +C   P   P  -C  -C
    I  13 |  R   R   R   R   R   R   R   R   R   R  +C  +C   P   P  -C  -C
    O  14 | -C  -C   R   R   R   R   R   R   R   R   R   R  +C  +C   D   D
    N  15 | -C  -C   R   R   R   R   R   R   R   R   R   R  +C  +C   D   D

P  = PERPENDICULAR STRAIGHTNESS      D  = DIAGONAL STRAIGHTNESS
    +C = CLOCKWISE CURVATURE             -C = COUNTER CLOCKWISE CURVATURE
    R  = RESIDUALS
```

*Fig. 13*

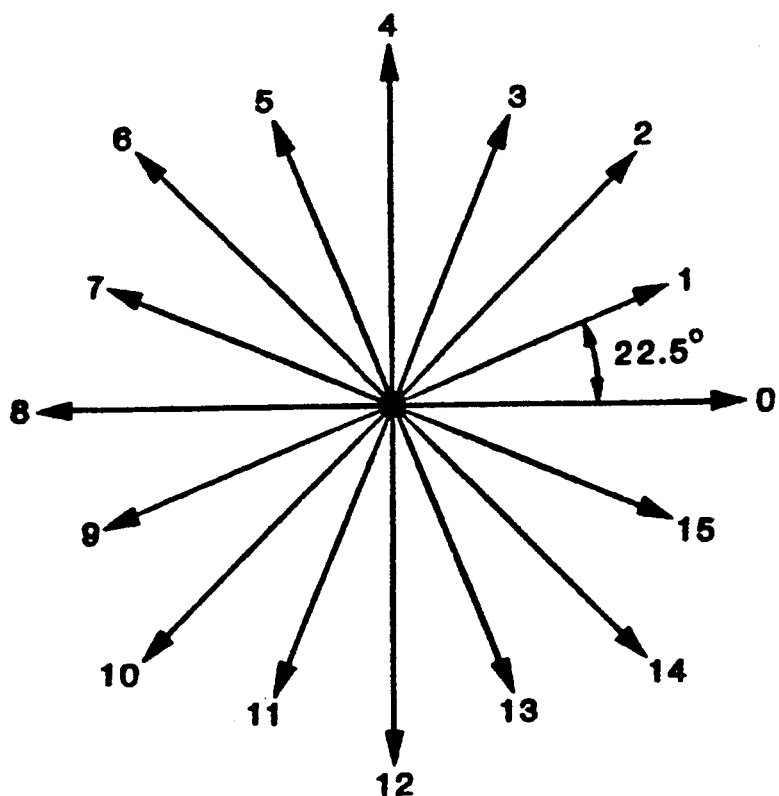

*Fig. 11*

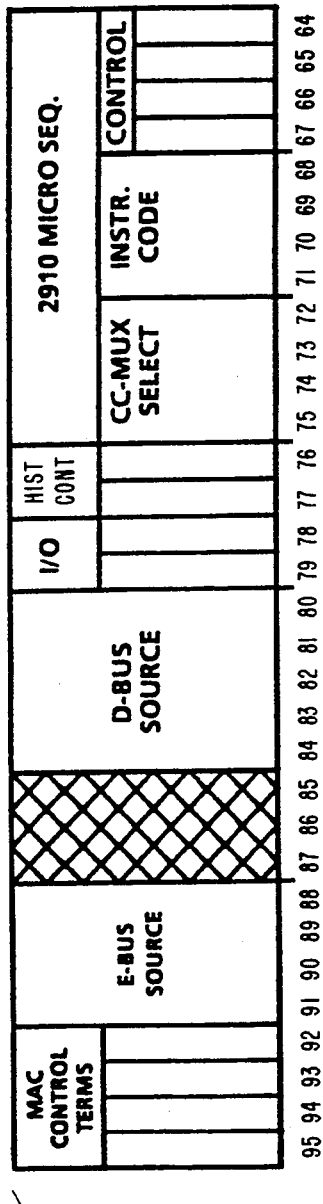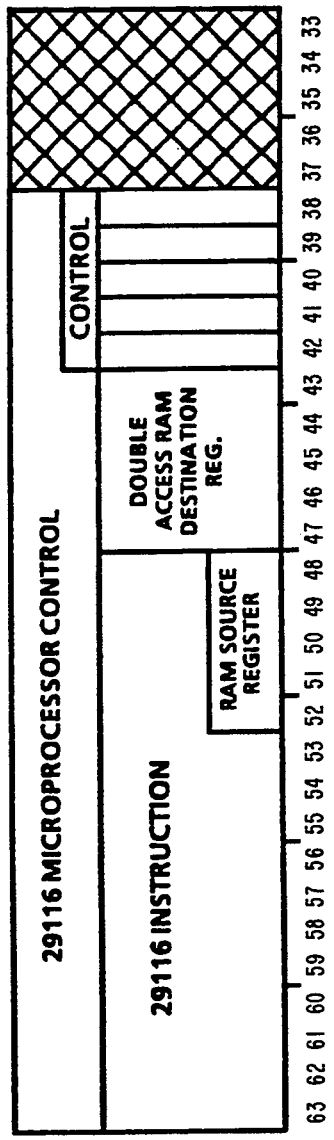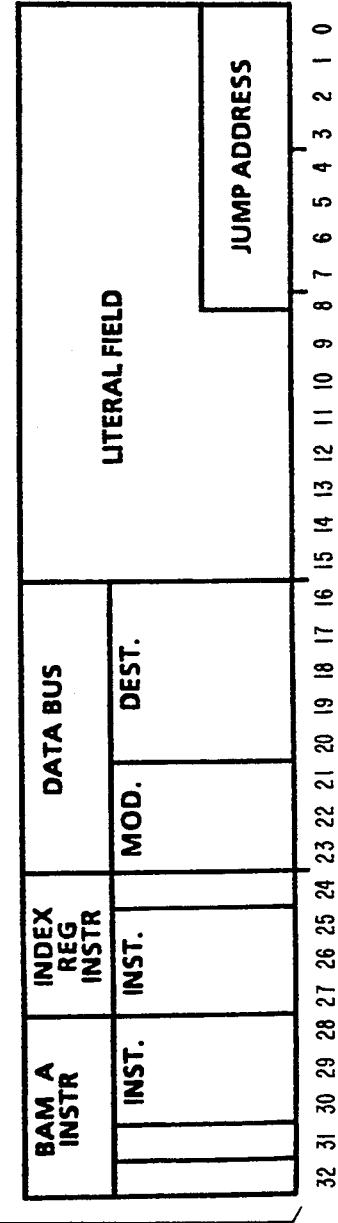
Fig. 47

TARGET ACQUISITION AND TRACKING SYSTEM

This is a continuation of copending application(s) Ser. No. 07/077,717 filed on Jul. 24, 1987, now abandoned.

THE INVENTION

This invention relates to clustered munitions and more particularly to a plurality of autonomously guided submissiles capable of target recognition, tracking, and self guidance to home on targets.

BACKGROUND OF THE INVENTION

Clustered munitions have been used to deliver a variety of war heads, ranging from small field deployed tactical weapons to inter-continental ballistic systems. Tactical systems reside at the conventional end of this class of weapons. The delivery vehicles are customarily referred to as submunitions. Historically submunitions were dispensed in a preselected pattern with or without guidance to control submunition aimpoint.

Wentink, U.S. Pat. No. 4,172,407 on "Submunition Dispenser System" issued Oct. 30, 1979 is exemplary of the early rudimentary submunitions scatter delivery schemes. Obviously such weapon systems are not effective against hard targets such as tanks, armored vehicles or other entities not easily damaged by randomly scattered small munitions. However, hard targets can be destroyed by a direct hit with a shaped charge explosive.

In view of the early shortcomings of ballistic trajectory submunitions such as the Wentink system and the similar Kuesters et al system described in U.S. Pat. No. 4,307,650, improvements have been made to allow guidance of the individual submunitions. One such improvement may be found in the Oglesby et al system presented in U.S. Pat. No. 4,281,809 for "Method Of Precision Bombing" issued Aug. 4, 1981. In this system, a precision guided weapon is launched toward a prime target. The precision guided weapon deploys a plurality of homing beacons which are subsequently tracked by a plurality of inexpensive guided munitions. Such systems still fail to pin point hard targets and are not responsive to moving targets. Therefore, further improvements to missile delivery systems were required.

One attempted improvement is C. Lair et al, U.S. Pat. No. 4,522,356 on "Multiple Target Seeking Clustered Munition And System". This system provides tracking capabilities in the submunitions. Each submunition locks on to the first target of opportunity detected by its guidance systems and tracks and destroys that target. Unfortunately, this system has no means to ascertain if the target happens to have been previously destroyed. Furthermore, the system cannot distinguish between military and civilian targets.

The shortcomings of Lair et al are overcome to a certain extent by the Maudal system for "Sequential Time Discrimination System For Sub-Delivery Systems" of U.S. Pat. No. 4,394,997. This system provides medium range search/seek guidance in the primary delivery vehicle combined with a short range starting seeker and ejector system which attempts to prevent the submunitions from tracking previously destroyed targets.

The identification problem is to find a true target in the presence of high clutter. Previous art required targets to be resolved with high contrast without regard to the background, which, unfortunately, was frequently not met in real world conditions.

K. Eichweber in U.S. Pat. No. 4,004,487 for "Missile Fire Control System And Method" issued Jan. 25, 1977 attempts to solve the target recognition problem for clustered munitions by providing a means whereby an operator may view the target area and designate targets for the individual submunitions. This is a costly system requiring operators to be actively engaged in weapon system guidance up to the final second and therefore subject to failure due to the vulnerability of the operators.

G. Tisdale et al, U.S. Pat. No. 4,497,065 on "Target Recognition System Enhanced By Active Signature Measurements" and the Grumet system in U.S. Pat. No. 3,779,492 on "Automatic Target Recognition System" are examples of recognition systems which allow weapon guidance systems to recognize a specific type of target from among a clutter of possible targets and home on the selected target. But the state of the art of such systems does not have the capability of assigning independent priorities for various submunitions of a clustered system. Therefore their use in such a clustered system would result in plural munitions descending on a common target.

All of the previous systems incorporate expensive guidance systems usually incorporating inertial platforms relying on costly gyros which nevertheless fail to hit the target due to false alarms from clutter. This has effectively limited progress on autonomously guided submunition systems.

There is, therefore, a need for an improved target acquisition system which will overcome the above limitations and disadvantages particularly in eliminating the effects of false alarms without reducing the potential capability of identifying all true targets.

OBJECTS OF THE INVENTION

In general, it is an object of the present invention to provide a target acquisition and tracking system which will overcome the above limitations and disadvantages by combining the results of a plurality of target recognizers characterized by being substantially independent in their image analysis view point and of, at most, modest performance so as to reduce their combined false alarm rate to very low values.

In view of the inability of the prior art target seeking clustered munition systems to accurately deploy each munition against a separate high priority target, it is a further general object of the present invention to provide a multiple target seeking clustered guided munitions system wherein each submunition is provided in the form of a submissile including an target seeking system with the capability of assigning target priorities which are different from the priorities of the other submissiles in the cluster and which includes means to actively track and seek out the most vulnerable points of the high priority targets it can identify.

A further general object is to provide a processor and system of the above character for use in a weapon system designed for the top-down attack of vehicular targets by multiple submissiles.

Another object of this invention is to provide a tactical weapon system of the above character comprising single missiles for transporting a plurality of submissiles to a deployment point over a target area wherein each submissile can choose from its own internally generated target list to autonomously acquire a target based on a priority strategy and is guided to the selected target by a proportional guidance system.

A further object is to provide a dual mode tracker combined with aimpoint selection to guide submissiles to high priority targets with an high accuracy of less than one meter.

A still further object is to provide a method of missile guidance which includes target selection, target lock on and guidance via signal processing algorithms, and target tracking.

A further object of the present invention is to provide a gradient/edge detection process which detects contour points and measures corresponding edge direction. Joint edge events are defined based on neighboring edge directions and are used by a maximum likelihood pattern classifier in a statistical matched filter to select a target.

Another object is to create a target acquisition system combining the results of (1) a maximum likelihood pattern classifier for target recognition; (2) a target to interference ratio matched filter for finding compact, anomalous hot/cold regions; and (3) video spatial clustering algorithm for recognizing target shapes.

Another object is to create a guidance system incorporating a dual mode tracking algorithm combining correlation tracking and centroid tracking.

Another object is to provide a guidance system using a minimum absolute difference correlation technique to track gross temporal changes.

Another object is to provide a guidance system with a tracking window which adaptively adjusts to accommodate target growth created by decreasing altitude.

SUMMARY OF THE INVENTION

FIG. 1A illustrates submissile disbursement. A canister of submissiles is deployed to a predetermined location over an area of known target concentration and the submissiles are randomly dispensed. Each submissile orients itself by sensing ground feature, recognizes all targets in its field of view, hands off a high priority target to the tracker and selects an aimpoint for optimum war head effectiveness. The total elapsed time from ground acquisition to impact is normally about 7 seconds. Historically, the bombs of a cluster weapon are referred to as submunitions, but this term fails to do justice to the sophisticated target acquisition and guidance system used by each deployed device in the system presented herein. Therefore, the term submissile is used herein to more accurately characterize the individual warhead delivery vehicles.

Specific numeric values are included in this description to illustrate an exemplar scenario utilizing this invention. However, it should be realized that such numbers are given only by way of example and are not to be taken as a limitation on the invention.

Target selection, handoff (lock-on) and guidance is accomplished with a host of signal processing algorithms which perform ground acquisition, target acquisition, target tracking and aimpoint selection. An onboard, dual mode tracker guides each submissile to its target with an accuracy of less than one meter.

FIG. 1B illustrates the flight of a single submissile. The submissile is deployed at a near vertical descent free-fall trajectory. It rapidly achieves a terminal velocity of 250 feet per second. At approximately 1500 feet the submissile activates a ground acquisition algorithm. Ground acquisition may be achieved by simultaneously tracking five non-overlapping regions on the ground. During this phase, the five tracks provide altitude, translation and rotation related data. These parameters are used by the guidance system to stabilize the guidance platform in preparation for the acquisition of a target based on the three independent algorithms of the present invention.

FIG. 1B also shows the nature of the target acquisition problem to be solved. A submissile is deployed at the 1500 foot altitude. It goes in to a ground lock phase after acquiring ground. The purpose is to stabilize the submissile so that the motion between the imaging sensor onboard the submissile and the ground is minimized to prevent blurring. The next task is the target acquisition phase. The submissile continuously estimates the altitude from the ground lock algorithm. At about 1200 feet the submissile enters the target acquisition phase where targets then are recognized and acquired. The acquisition algorithms are those that are shown in FIGS. 7 and 8 functional block diagrams and include MLC, VSC, and GTIR; their in dependent detection results are combined in the hierarchical prioritization logic functional block HPL.

The first algorithm functions as a maximum likelihood classifier (MLC) which prepares statistics of target sized areas that are then compared to statistical data stored in a signature library. In a high clutter environment, the spatial arrangement of the edge-based features are useful to recognize targets from clutter. The field of view is scanned by a target sized window. At each scan position, the MLC selects the most probable class from its library and assigns a confidence measure to the classification. In FIG. 1A high confidence target decisions are associated with the tanks and very small portions of the remaining clutter are low confidence target decisions. The MLC algorithm provides a statistical measure of target-like objects. An edge detection process transforms the sensed image in to its corresponding gradient vector representation. A gradient operator detects contour points and measures their corresponding edge direction. The neighboring edge directions are then transformed in to joint edge directions from which features are derived. The features are used by a maximum likelihood pattern classifier to detect targets.

Simultaneously and in dependently of the MLC algorithm, the second algorithm using target to interference ratio techniques (GTIR) uses a matched spatial filter to locate hot and cold anomalous target-like regions.

The MLC and GTIR algorithms view the image through target sized windows. The third algorithm, Video Spatial Clustering (VSC), also views the image through a target sized window. The VSC algorithm computes two grey-level optimal thresholds at each scan position. Pixels with intensity less than or equal to the lower threshold are candidate pixels of cold targets. Hot candidate pixels are spatially clustered through a region growing process. Pixels having intensity values greater than or equal to the higher threshold are candidate pixels of hot targets. A feature vector is extracted for each spatial cluster based upon the cluster size, the threshold values, and the global histograms of the image.

During the target acquisition phase, the scene is analyzed independently and simultaneously by the three algorithms, namely (1) MLC, a maximum likelihood pattern classifier for target detection; (2) GTIR, spatially matched filter for anomaly detection: and (3) VSC, a spatial clustering algorithm for object recognition. Detection information from the three algorithms is spatially merged and their confidences combined hierarchically in a 3-dimensional feature space to form a composite target/non-target decision along with a composite confidence measure. FIG. 1C gives an illustrative situation showing the autonomous detection of the seven highest priority targets in a field of view. The subscripts indicate target priority rank. Note that the top ranking priority class includes three heavy tanks and the closest to the center of the field of view is assigned the highest priority. The latter strategy statistically alleviates the problem of assigning multiple submissiles to the same target. It is handed off to the tracker which guides the submissile to the target.

The top ranked target (or a highly ranked target near the center of the submissiles field of view) is handed off to a dual mode tracking algorithm which incorporates correlation tracking and centroid tracking as a unitary algorithm. A minimum absolute difference correlation technique is used to track gross temporal changes. For non-occluded targets, the track point is refined by optimally thresholding the target sized window and performing region growing and object analysis. The centroid of the target is computed to provide an accurate, highly stable track point. The tracking window adaptively adjusts in size to accommodate target growth accompanied by decreasing altitude. As the submissile descends, the target becomes more highly resolved and a distinguishable aimpoint becomes apparent.

Each submunition, or submissile, contains within it the entire system package for executing ground lock, target selection, target tracking, and aimpoint algorithms, together with the infrared focal plane array sensor. However, one could have a system intelligence concept which partitions the system in allocating the target detection portion of the system in a smart canister and the rest in not so smart submunitions.

After a particular target has been acquired by the target acquisition algorithms (FIG. 7), the system enters the tracking phase, that is, a highly ranked object in the field of view is selected as the target. The submissile locks onto it and then goes through a tracking algorithm. The tracking algorithm guides the submissile to the target and ultimately the submissile will hit the target at some specified aimpoint. The aimpoint selection algorithm is not part of this invention. While the procedures and algorithms disclosed herein were optimized for this particular application, they are much more useful than just for this scenario.

In the above discussed scenario, algorithm(s) refers to the mapping of intensities of some image in to labels of targets, and in a larger sense becomes the whole operation of transforming pixel intensities in to target labels. It includes all of the techniques and algorithms that are required to make that transformation happen.

One of the key points of this invention is combining the results of multiple in dependent algorithms through the hierarchical combining logic. As described before, each algorithm assesses the picture to give a total evaluation of what it "sees" in the image. The success of this invention is not keyed to the particular algorithms (MLC, VSC, or GTIR) even though they are sophisticated algorithms in their own right. The last design criterion turns out to be a better, more robust way to generate pattern recognition solutions and operate pattern recognition systems than those previously used. The side constraint requires that the algorithms be independent or anti correlated, which is easy to achieve for the first several algorithms, but it becomes factorially more complicated as one adds more and more algorithms to the method of the invention.

In our pattern recognition problem, it involves recognizing targets from non-targets, and in dealing with the ambiguous cases in which either the answer "target" or "non-target" is equally likely.

It is useful to consider an analogy. The drawings of Escher and Boring often exhibit equally possible interpretations of pictorial material. In Escher, the drawing "Metamorphosis" contains areas that are clearly of one character, other areas clearly of another character; and ambiguous areas where they could belong to either or both of the depicted characters. In Boring's drawing the depiction could be either a young or old person depending on interpretation. See, for example, Escher, M.D. and Locher, J. L., The World of M. C. Escher, Abrams Publishers, (New York 1971) pages 82–85, and Boring, Edward G. Drawing, "Young Girl or Old Hag".

In both, the ambiguous cases have two concepts simultaneously embodied in the very same drawing. Now, if one tries to build a pattern recognition system to distinguish these interpretations, it would not be possible for it to decide which was which. In fact, there is no unique answer to the question of which is correct, because both are acceptable.

FIG. 2 shows the canonical mapping of a target recognition problem. The left most portion of the diagram shows a small square which is labeled $15 \times 15$ with a picture of a tank in its middle. The $15 \times 15$ refers to the number of pixels, that is the number of sampling elements that make up that square. There are 15 horizontal rows and 15 vertical columns pixels or a total of 225 samples of a scene of a tank in the middle of the picture. Each sample which is quantized to 8 bits or 256 grey levels, is referred to as a pixel or pel (picture elements). The product of the number of pels and the number of bits per pel gives a total of 1800 bits to specify completely and uniquely every possible digital picture so far defined by the parameters of picture size and grey-level resolution. Moreover, the 1800 bits relate to the possible number of patterns available, giving 2 to the 1800 th power possibilities or, in a more familiar notation $10^{541}$. This is the number of possible patterns that this small picture can create. $10^{541}$ is an astronomically large number. It is more than the total number of atoms in the universe. The fundamental problem is to find a way to make a look-up table for each and every of the $10^{541}$ locations to assign a target/non-target decision. If one could build such a look-up table, it would, in fact, be the ultimate target detector as it would never make a mistake because it would specify, for every input picture possible, what the proper target decision should be.

In FIG. 2 a convoluted picture is shown that is made up of a light shade, a medium shade and some dark shades. It is also labeled LUT to represent a look-up table address map. In the horizontal layout, it contains a dimensionality of $10^{361}$, and vertically $10^{180}$, corresponding to the $10^{541}$ locations which are in the basic look-up table. So the look-up table is a way of specifying or enumerating each of the possible images which can be created by an in coming $15 \times 15$ window of pixels. This picture should be interpreted to correspond to the three general classes of images.

First, those images that are unambiguously targets, that is those combinations of pixel values that only represent targets. These pictures can never be mistaken for anything but targets. They correspond to the darkest shades in the look-up table address map.

Second, those images that are unambiguously non-targets are represented by the medium tone shade in the lock-up table address map. Their mapping occupies most of the area in the look-up table address map. These pictures can never be confused with a target or, to more properly state it, there can never be an example of a real target which in fact would look identical to a non-target as in Esher's or Boring's pictures.

Third, the shade of coloring in the diagram which is labeled Target/Non-Target Overlap corresponds to instances in the picture where exactly the same combination of pixel levels can be interpreted either as a target or a non-target. They behave in the same way as Esher's or Boring's pictures by having the very same combination of pixels and lines represent two opposite conclusions. The reason for this ambiguity is that there is not enough information available in the sensed image to resolve the inherent ambiguity. This problem is fundamental. It happens at every level of every complicated system, and only differs in the matter of degree. Target recognition systems need to specify some way to find out how to fill up all of these locations given by an arbitrary input picture. A $15 \times 15$ pixel input image was picked for this example because in fact that turns out to be the approximate size of the targets that are typical in the present application of this invention.

The problem is how to determine the proper class label for each of $10^{541}$ different possible images. If it could be solved how to specify each one of those class labels, one would have the ultimate target detector. As mentioned before the number is so large that one cannot enumerate every possibility. The problem is how to approximate the enumeration and that's the subject of this invention. Since FIG. 2 is not physically realizable, one has to find what in fact is physically realizable.

Referring now to FIG. 4 the next canonical form of this process shows a generalization of realistically realizable classifiers. This consists of the same input image as in FIGS. 2 and 3 only it now is being fed in to a pre-processor which provides some kind of a functional mapping such as by using edge detection, clustering algorithms, features extraction or two-dimensional filters or any other way to reduce the 1800 bits down into something which is substantially much smaller, i.e. N, which in FIG. 4 is so labeled on the output of the functional mapping block. It is desirable that N be reasonably small, say about 20. That would still be $2^{20}$ locations, i.e. about one million. Even that is a good size look-up table. But, the dimensionality of the space has been reduced from 1800 bits down to 20 bits and it's the purpose of the pre-processor block to do that reduction or mapping operation. Obviously that mapping operation, reducing 1800 bits down to 20 bits is to take the starting pattern space and to fold it onto itself many, many times so that the net effect of the reduction operation is to degrade the ultimate performance of the classifier by deliberately mixing together certain kinds of classes or certain portions of the feature space. This is referred to as a dimensionality issue whereby certain kinds of patterns are deliberately excluded from consideration. For instance, since it is known that the classifier is going to be dealing with real world object pictures, there will be no need to ask the pattern classifier to make decisions about line drawings, or printed text or alphanumeric characters, or other things of that type. It does not matter that dimensional reduction may map pictures of, say, the letter "A" into the target class since in actual usage the classifier will never be shown the picture of an "A", and so the potential confusion is irrelevant. Therefore, all such kinds of pictures which are possible to make with a $15 \times 15$ window are not important and can be ignored since the classifier will never be asked to look at them.

The problem remains, however, as to how to specify for every one of the $2^{20}$, one million, locations, the target/non-target decision. This is typically done by some kind of a thresholding operation, a statistical processor, some decision logic or binary decision tree or others to decide for each input image what the output should be. This is called classifications. The purpose of the functional mapping is to transform the input image, which is 1000 bits, or a $15 \times 15 \times 8$ bit image, onto a measurement space which is substantially smaller, in this example, 20 bits. The classifier then examines the reduced data ($2^{20}$) and maps it into a target/non-target label space which is only 1 bit. These two intermediate operations then constitute the canonical form for all pattern recognition systems currently being developed.

In the context dealt with here, all the pattern recognition systems basically consist of two processes. The first is feature extraction, and the second is classification. MLC, VSC, and GTIR are classifiers both individually and also as a nested set. They work together to reinforce true target detections and reduce false alarms. FIG. 4 shows how the problem is broken up into smaller problems. As shown, there is a canonical form which, after feature extraction, gives a smaller number of bits which is amenable to generate a look-up table for the target/non-target decision.

In FIG. 5, the dimensionality example illustrates the real problem in building classifiers. Assume that the number of features that are being extracted be 4 (as shown in the diagram), each having 3 bits. Four features with 3 bits per feature total 12 bits of information coming into the look-up table, which corresponds to N=12 as shown in FIG. 2B. The problem now is for every combination of these features, $2^{12}$ or 4,096 locations, a target/non-target decision has to be made. If one were fortunate enough to be able to collect the right kind of pictures out in the world, one would at most need only 4,906 images against which to train this classifier. Unfortunately, one can never get the right 4,906 in order to completely train the target classifier for a variety of reasons. The first reason is that when the features were being extracted from the picture to begin with, the pattern spaces were overlapped together and some things which were previously unambiguous targets in the original 1800 bit space have now been put on top or mapped into regions which were previously unambiguous non-targets; so there is an unintentional confusion between targets and non-targets. Unfortunately, some designers are not aware that this type of self-induced ambiguity has occurred. Furthermore, in most data collection activities, one simply cannot collect enough information to discover by data analysis the extent of the ambiguity.

Classifiers are trained with a number of real pictures. Whether a particular image contains a target or does not contain a target is known. This procedure is called ground truth, where the true label for every pel in the image is known for a certain picture. One can divide up these training sets of data into small images of $15 \times 15$ containing targets and non-targets. By way of example, assume there is a training set consisting (from FIG. 5 (a) of 8 examples where the targets were unambiguously targets, (b) 10 samples where there was some target/- non-target overlap regions, and (c) of 40 examples of unambiguous non-targets. There is a total of 58 samples. One now has to extrapolate these 58 examples or samples to the 4,906 which represents the entire pattern space in the system. It is this extrapolation problem that forces a critical examination of the operations; i.e., the target/non-target overlap was 10 out of 58, which is believed to be too large. One method for reducing that amount of overlap is to add another feature to the classifier; i.e. extracting some additional information from the image to help separate the target/non-target overlap. Now in stead of having 4 features of 3 bits each, here are 5 features of 3 bits each. This gives a total of 15 bits of address space in stead of 12 bits of address space. When that new feature is added, everything ends up separating perfectly, that is, the targets and the non-targets are completely separated and the classifier is giving perfect results on this training set of 58 examples. But the further problem is now seen in that, although the training set is now perfectly classified according to ground truth, the pattern space has grown by a factor of 8. This means that the sampling density is now $\frac{1}{8}$ of what it used to be, so there are 8 times as many points that now have to be specified as there were before, which means that one now has 8 times as many opportunities to in fact make mistakes. So it is evidently impossible to extrapolate these 58 points (each with 15 bits) to make them go 8 times farther. In general, this problem is called the "curse of dimensionality" and it is absolutely fundamental in the way pattern classifiers are built and there is no general way around it.

However, in accordance with the present invention, it is accepted that it is generally impossible to build a classifier based upon field data where the dimensionality is high, that is, where the number of bits is greater than about 14 or 15 bits. Here, there is adopted a rule of thumb that says classifiers should not be of a dimensionality higher than 3 or 4 and the total number of bits in the classifier should not exceed 15 to 20, that is that the address space for the look-up table should not exceed one million locations, and that's assuming that one can collect data for a training set on the order of about 1,000 to 2,000 samples to train a feature space of about 50,000 to 1,000,000 possible locations. It turns out that the training set is limited to a few thousand samples. How then can one overcome the fact that classifiers of low dimensionality tend to have significant false alarm rates.

In the present invention, a plurality of classifiers are designed so that each classifier extracts information from the scene reliably but independently from the information extracted by the other classifiers. This is shown in the functional diagram in FIGS. 7 and 8. This invention teaches that in order to beat the curse of dimensionality with the 2,000 points available, build 3 statistically independent classifiers each of a dimensionality 3 or 4 and train each one of those independent classifiers using the same training set. So, if each classifier is extracting additional information and if the classifier points of view are chosen to be widely divergent from each other (independent), then by mapping 1800 bits down to 20 bits in each of the individual classifiers separately, that mapping will be so widely different for each of the classifiers that the amount of overlap will approach zero.

The present invention chooses edge statistics for the maximum likelihood classifier (MLC) in which targets are identified based upon edge statistics only. The second choice dealt with shape characteristics, called Video Spatial Clustering (VSC) algorithms which took size and shape as the primary criteria. The last choice was an algorithm for finding spot-like anomalies (GTIR). Each one of these choices presents different points of view sufficiently different from each other that the kinds of false alarms, i.e. the kinds of mistakes made were independent of the kinds of mistakes made by the other classifiers. These 3 classifiers were built and each trained with the same amount of data. Each classifier independently performs fairly well in terms of detecting targets and only modestly well in terms of false alarms. Typically these systems are designed so that for a detection ratio about 0.90–0.95, the false alarm rate is about 0.10–0.15. So, with a given false alarm rate and the independence criteria, if the 3 classification results are combined together, the false alarm probabilities will product together. If the 3 classifiers have a 10% false alarm rate, their product rate would be a 1/10% false alarm rate. This mechanism of combining allows the present invention to circumvent the "curse of dimensionality" and allows 3 modest performance classifiers, disclosed herein to give an outstanding performance when properly combined.

Referring now to FIG. 8, there is shown a more target acquisition specific depiction of MLC, VSC, and GTIR, each extracting data independently from the same picture according to the various points of view specific to each algorithm. MLC is using joint edge statistics as its features and it's using a statistical matching process to do the mapping of features into class labels. VSC is using an optimal grey level thresholding algorithm to extract geometric parameters which are then used to determine target/non-target labels. GTIR is using a matched template approach and it basically is an estimate of the signal-to-clutter ratio. The nature of each one of these algorithms is to take their respective abstract features and to map them into the probability of target or non-target as their corresponding outputs. These outputs then represent a target or non-target label with probability measures. They in turn are treated as features supplementing a three-dimensional feature space which is input to the HPL algorithm. The HPL algorithm views MLC, VSC, and GTIR as if they were very sophisticated feature extraction modules in their own right. Accordingly, HPL can be trained as a pattern classifier with its inputs being the outputs of the MLC, VSC, and GTIR. This hierarchical combining allows each one of the 4 boxes that are shown in FIG. 9, MLC, VSC, GTIR, and HPL to be trained as 4 separate classifiers each one getting the same amount of data, that is, the same training set. By combining them together, a classifier is created whose final dimensionality is the total dimensionality of MLC, VSC, and GTIR. If each one of those were 4 dimensions apiece, the classifier of this invention would be a 12 dimensional classifier but it achieves the same kind of robustness as a 4 dimensional classifier in terms of the training set extrapolation efficiency, together with a tremendous reduction in false alarm rates.

These and other features and objects of the invention are set forth in the following detailed description, claims, and drawings, of which:

BRIEF, DESCRIPTION OF THE DRAWINGS

FIG. 11 is a vector diagram of edge directions set at 22.5 degree increments used by MLC.

FIG. 13 illustrates the ordered pairs of joint edge events mapped into rotationally invariant features used by MLC.

Figure 24:
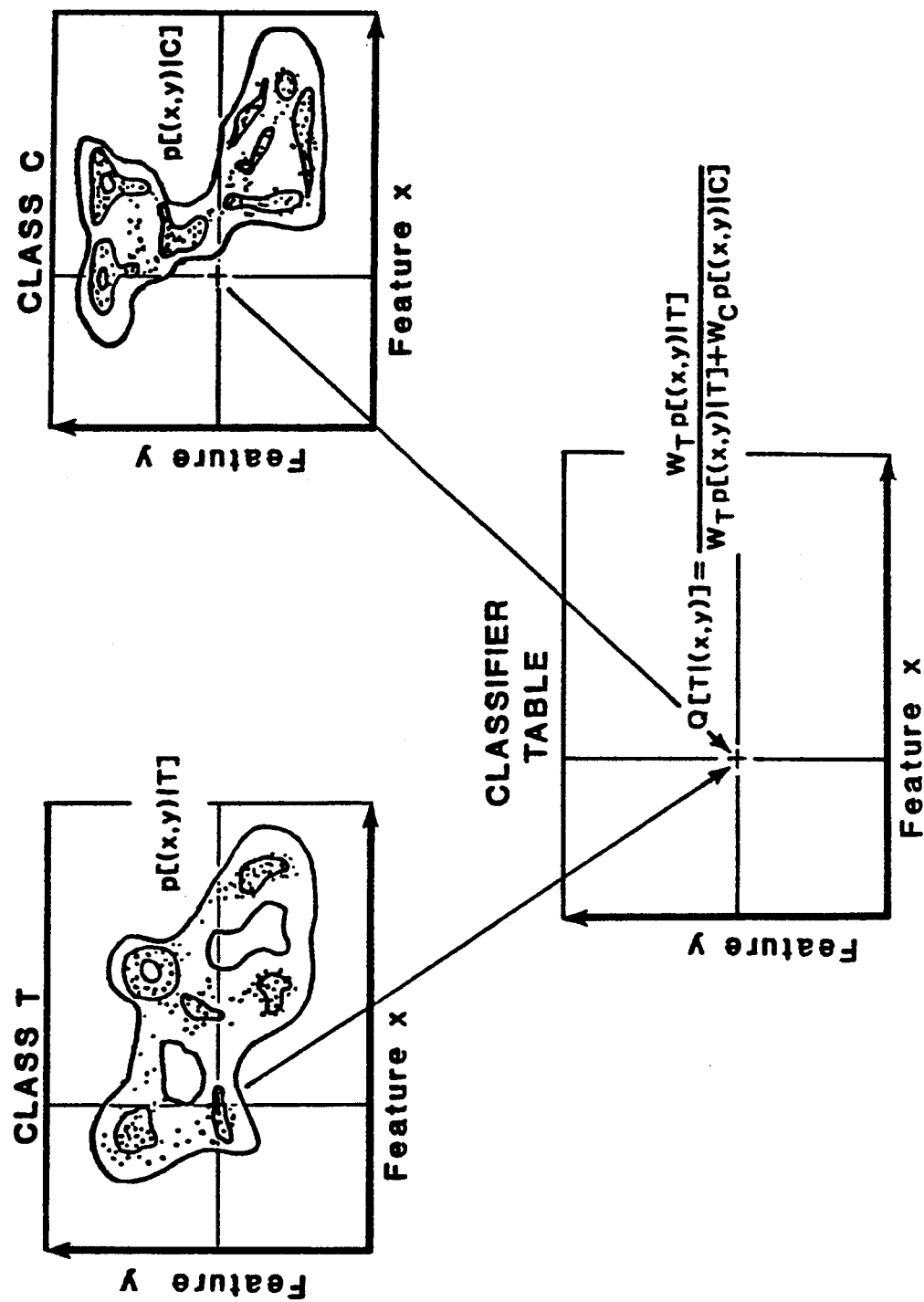

FIG. 24 graphically and mathematically depicts the process of generating an entry into a classifier table.

Figure 25:
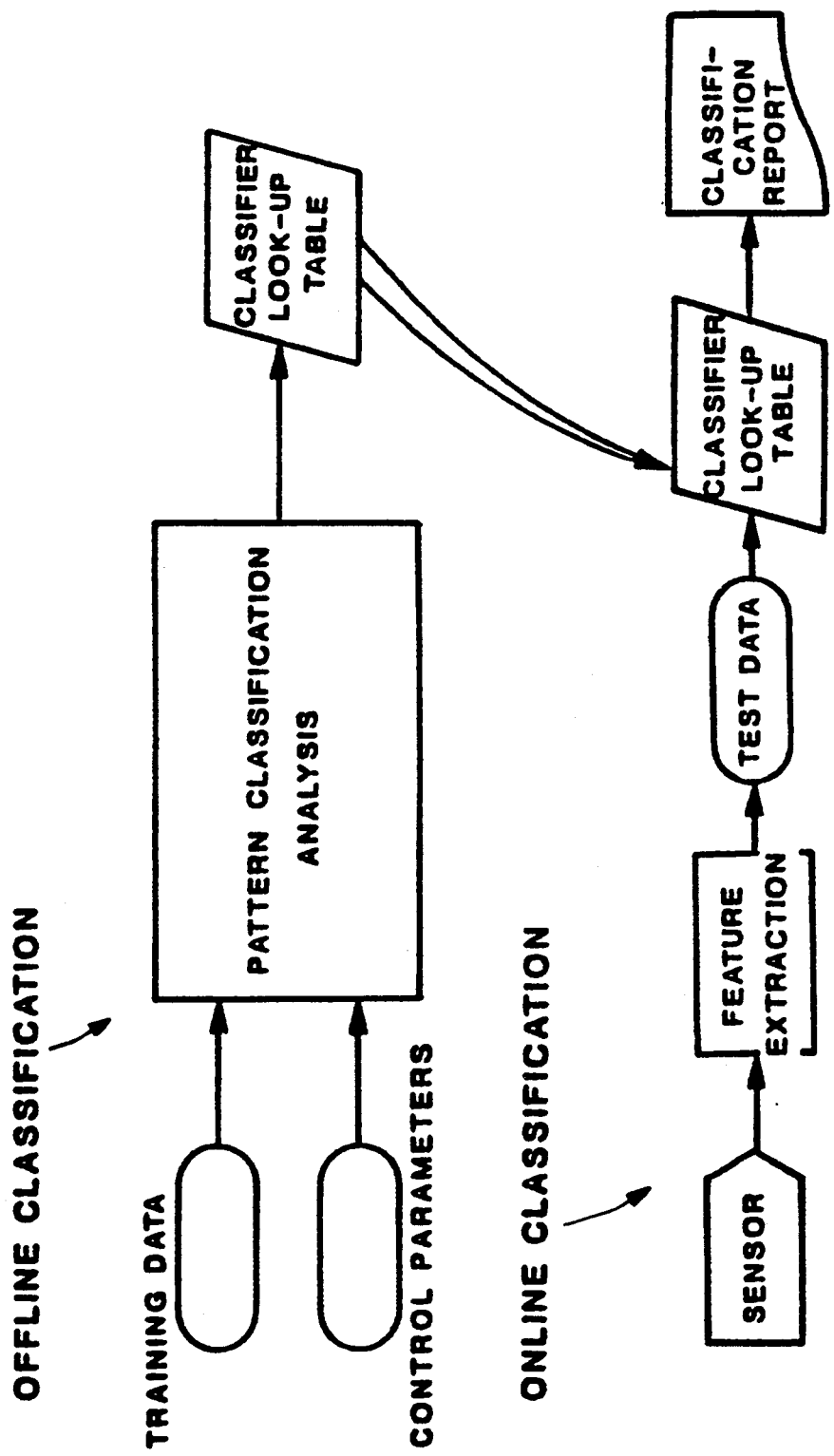

FIG. 25 is a flow diagram outlying the generation and use of classifier look-up tables.

Figure 26:
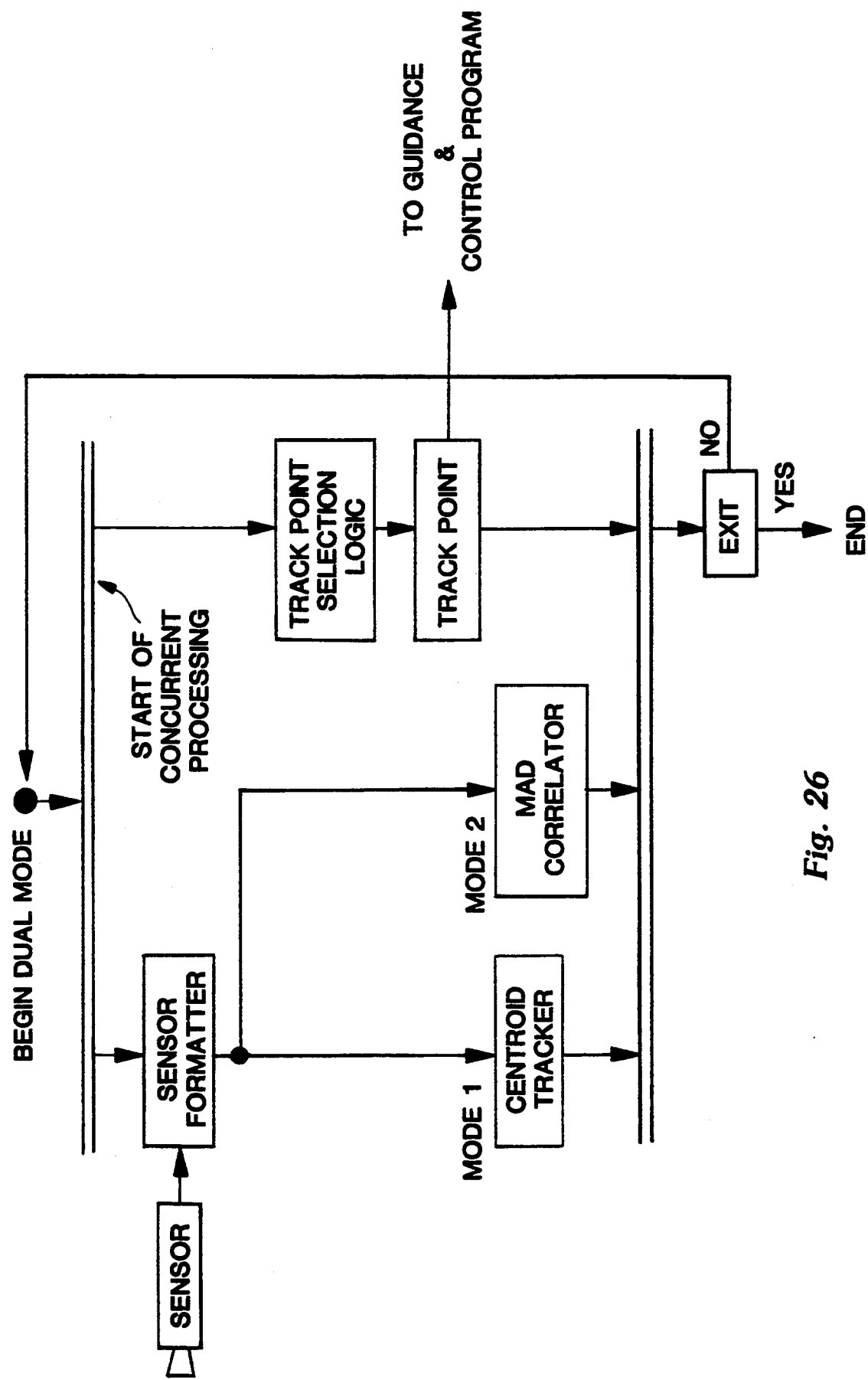

FIG. 26 is a simplified block diagram of the tracker program.

Figure 27:
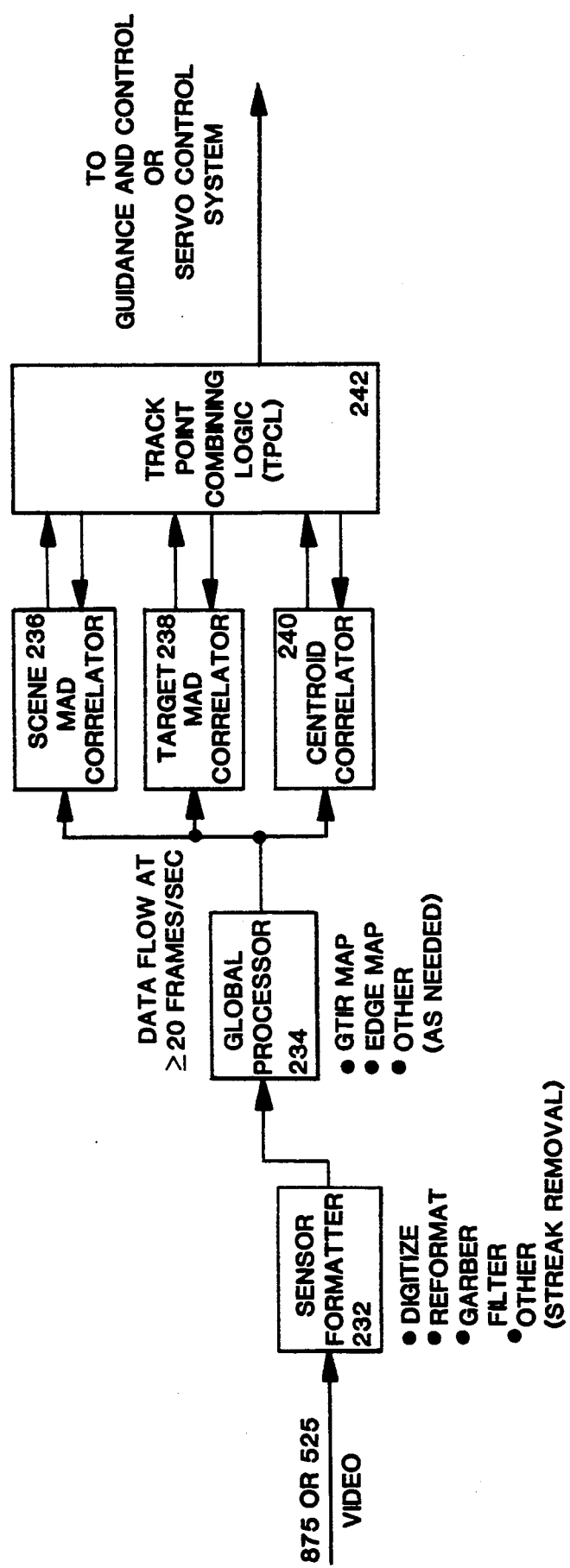

FIG. 27 is a functional block diagram of the dual mode tracker.

Figures 1, 28:
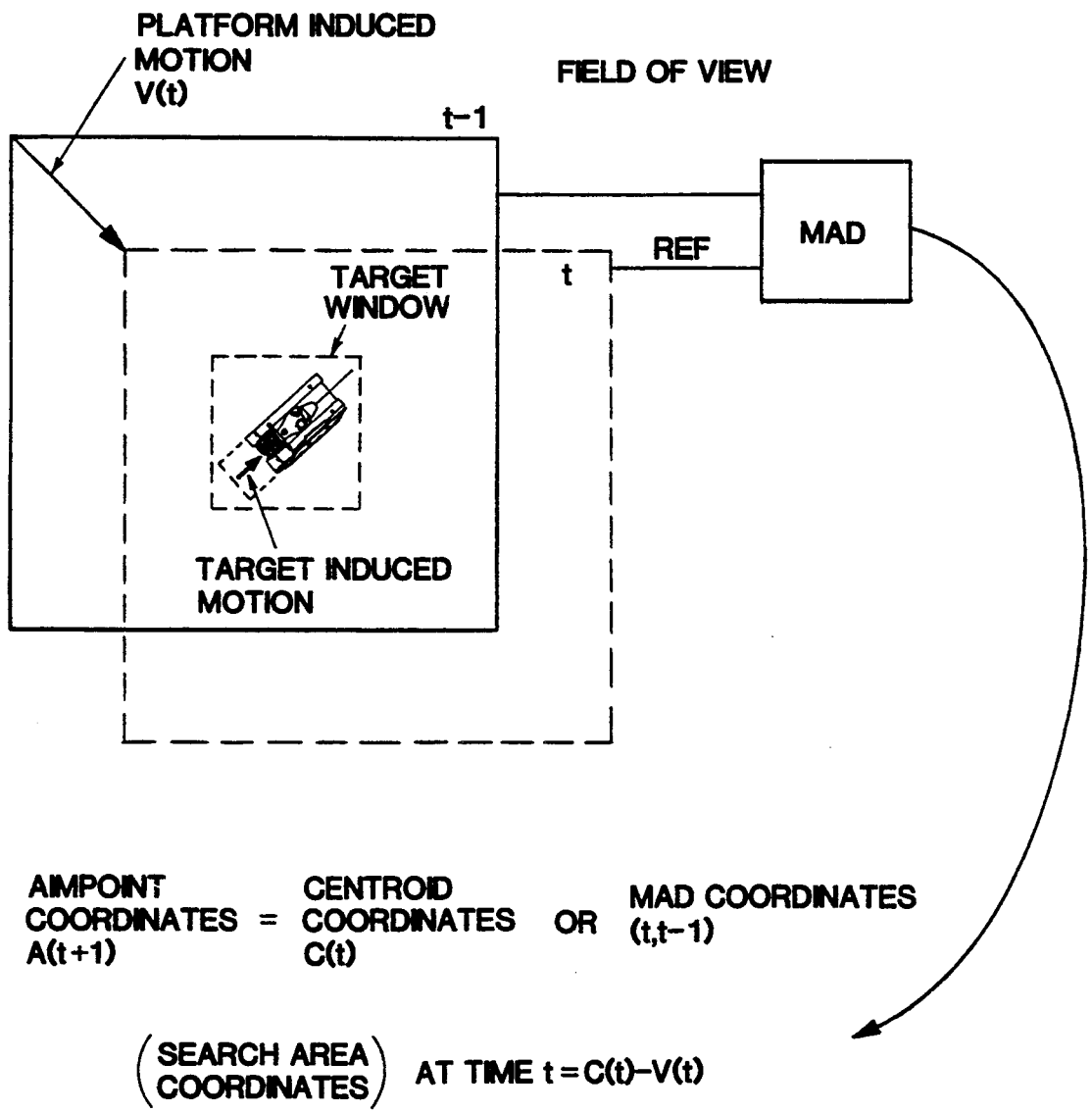
Figures 2, 28:
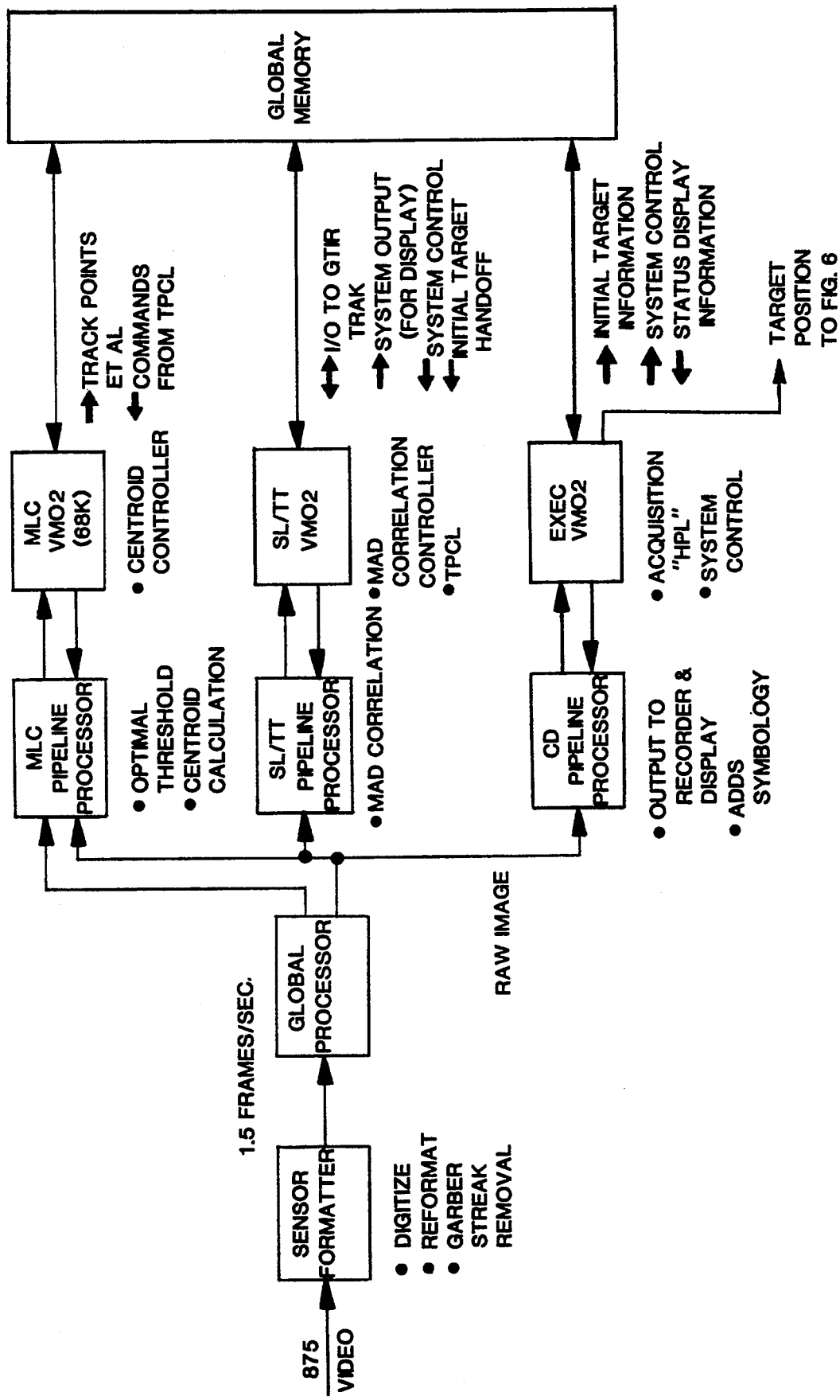

FIG. 28-1 is a diagram relating the target window, target induced motion, and platform induced motion.

Figure 2:
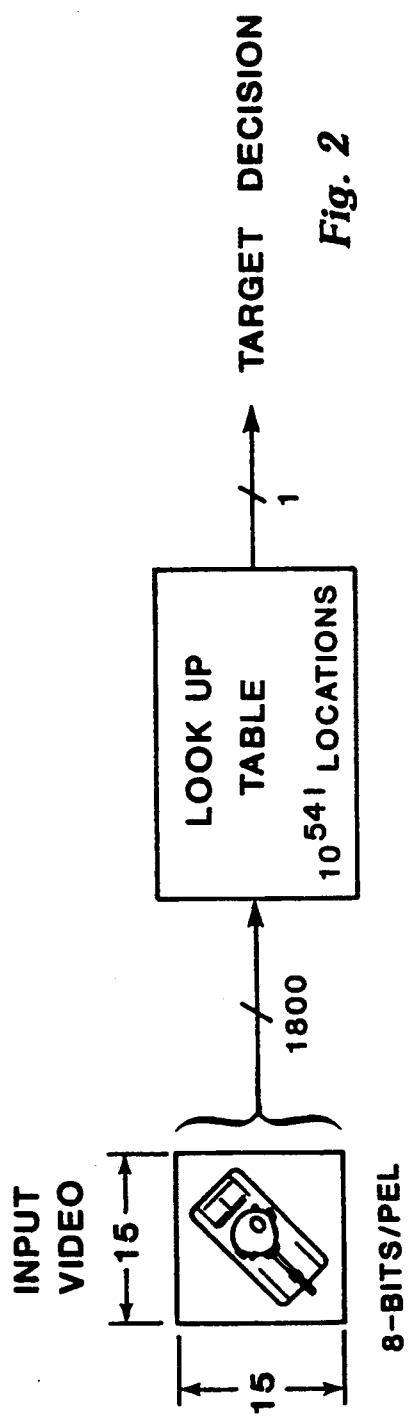
FIG. 2 represents an idealized ultimate target detector.
Figure 3:
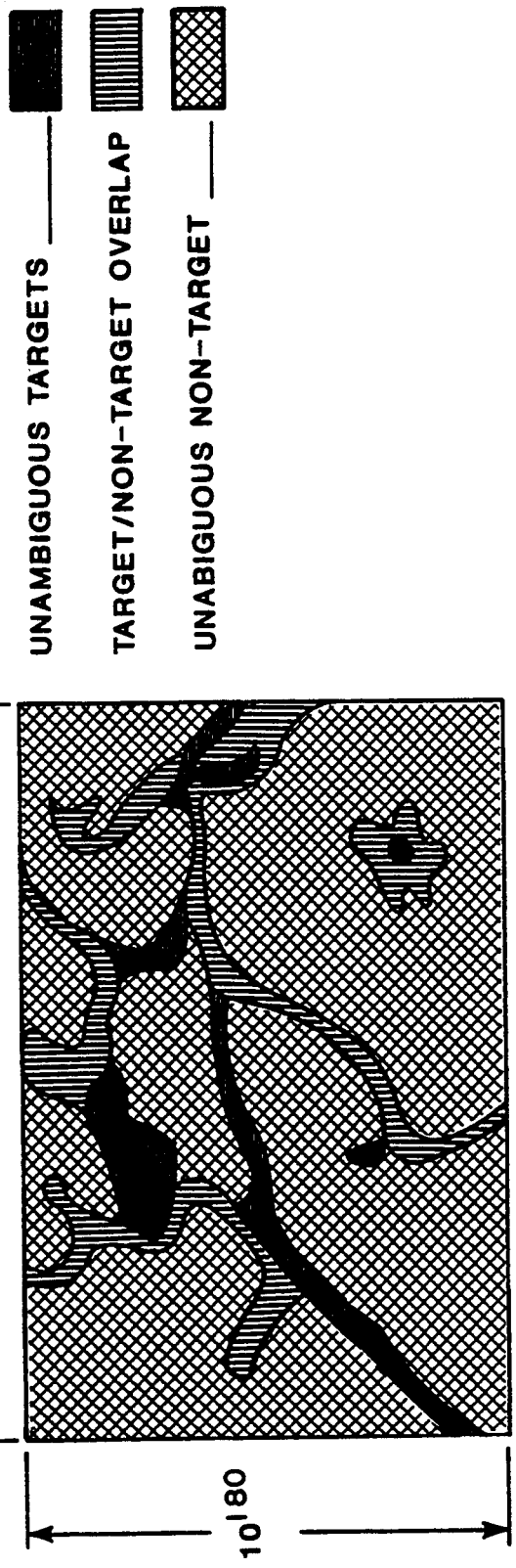
FIG. 3 is a representation LUT for the target detector of FIG. 2.
Figure 4:
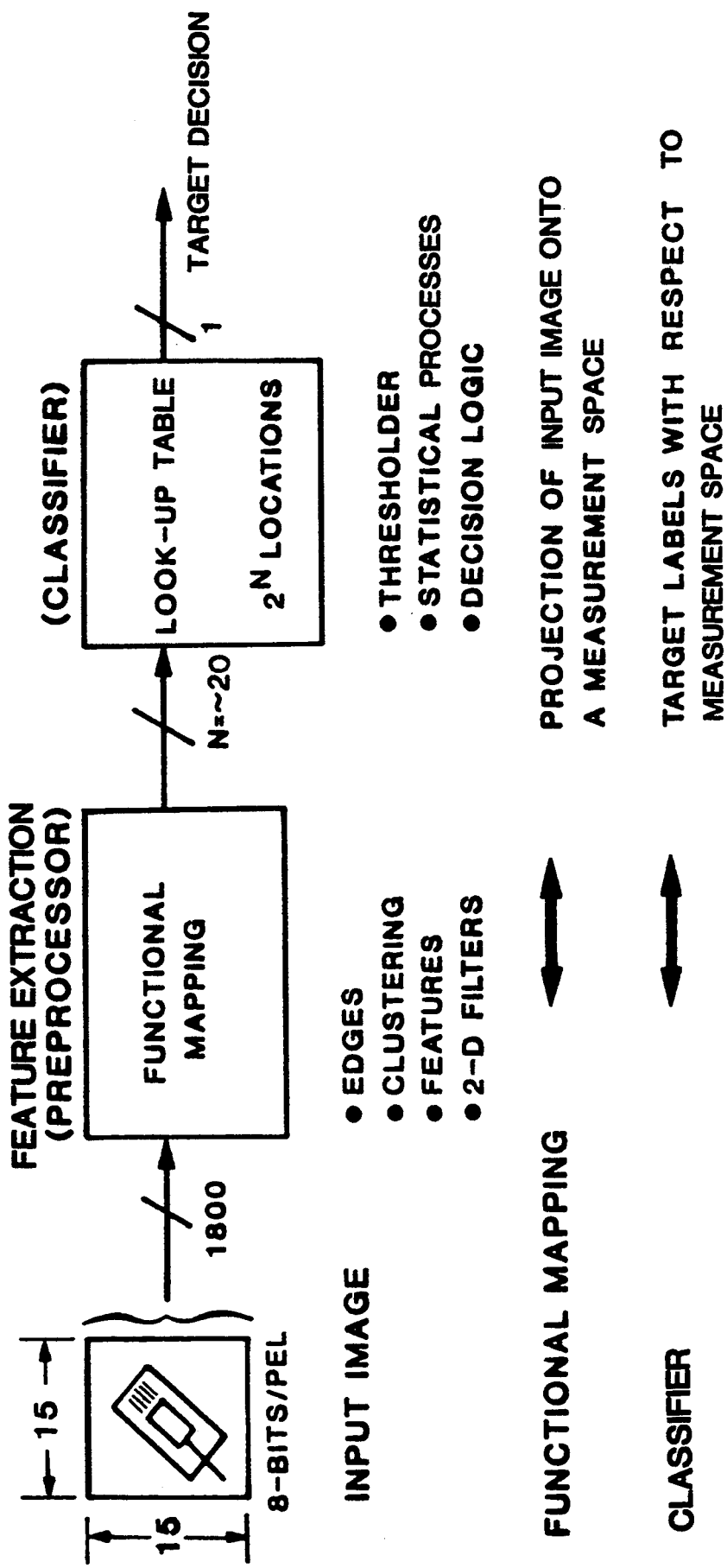
FIG. 4 is a diagram illustrating realistically realizable classifiers.
Figure 5:
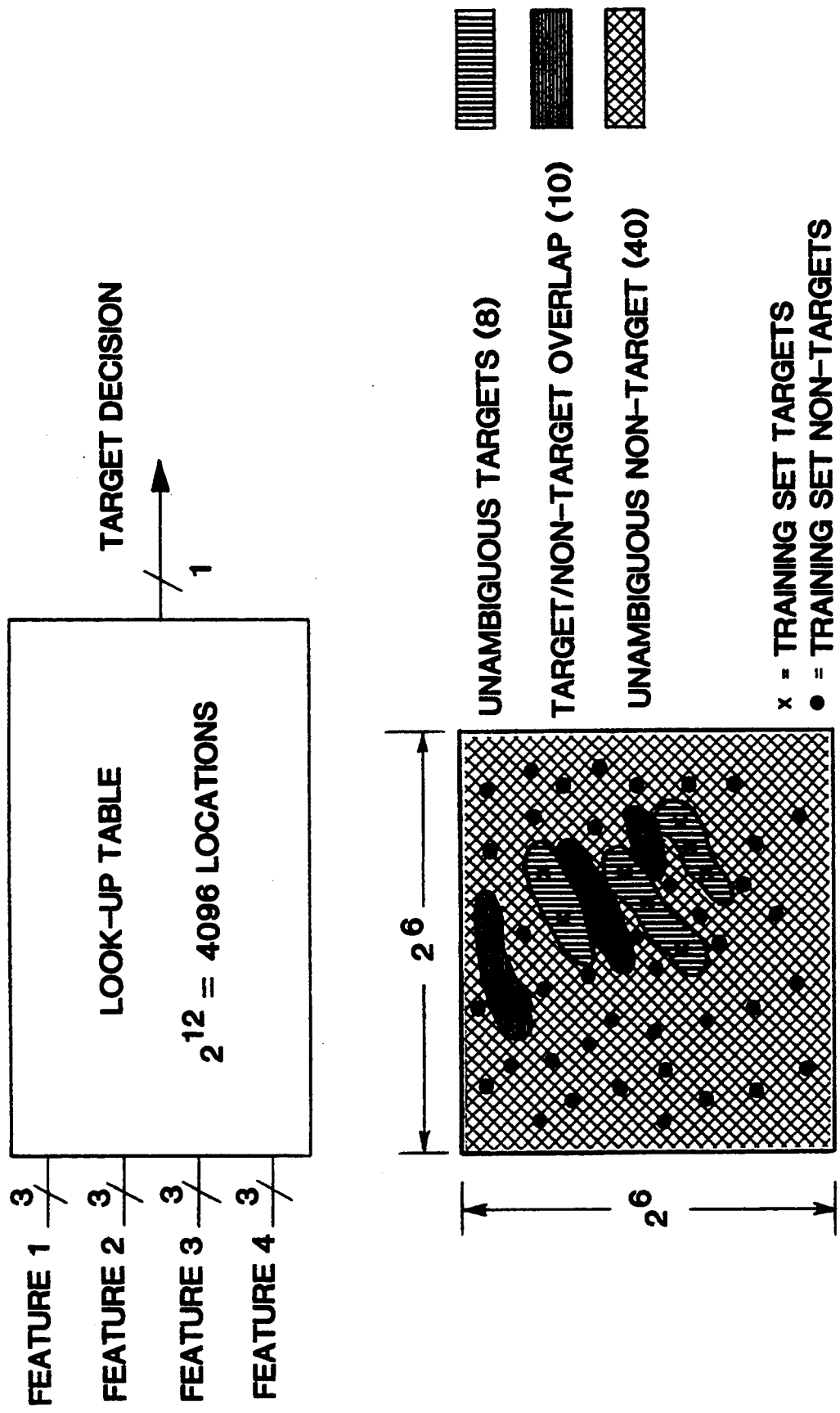
FIG. 5 is a diagram illustrating the dimensionality problem.

FIG. 28-2 is a processor flow block diagram of the dual mode tracker.

Figure 29:
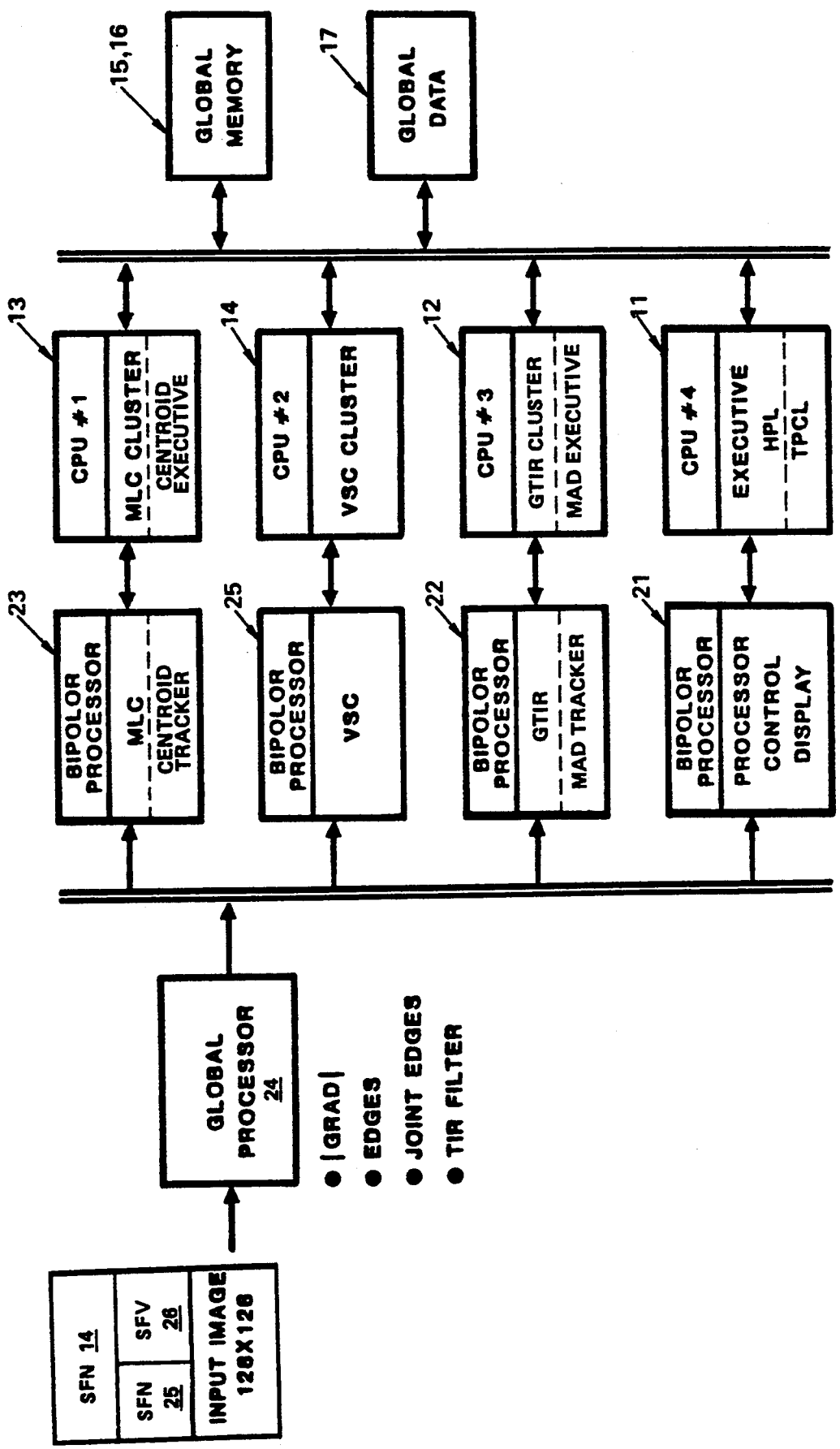

FIG. 29 is a hardware block diagram of the target acquisition and tracking system of the present invention.

Figure 30:
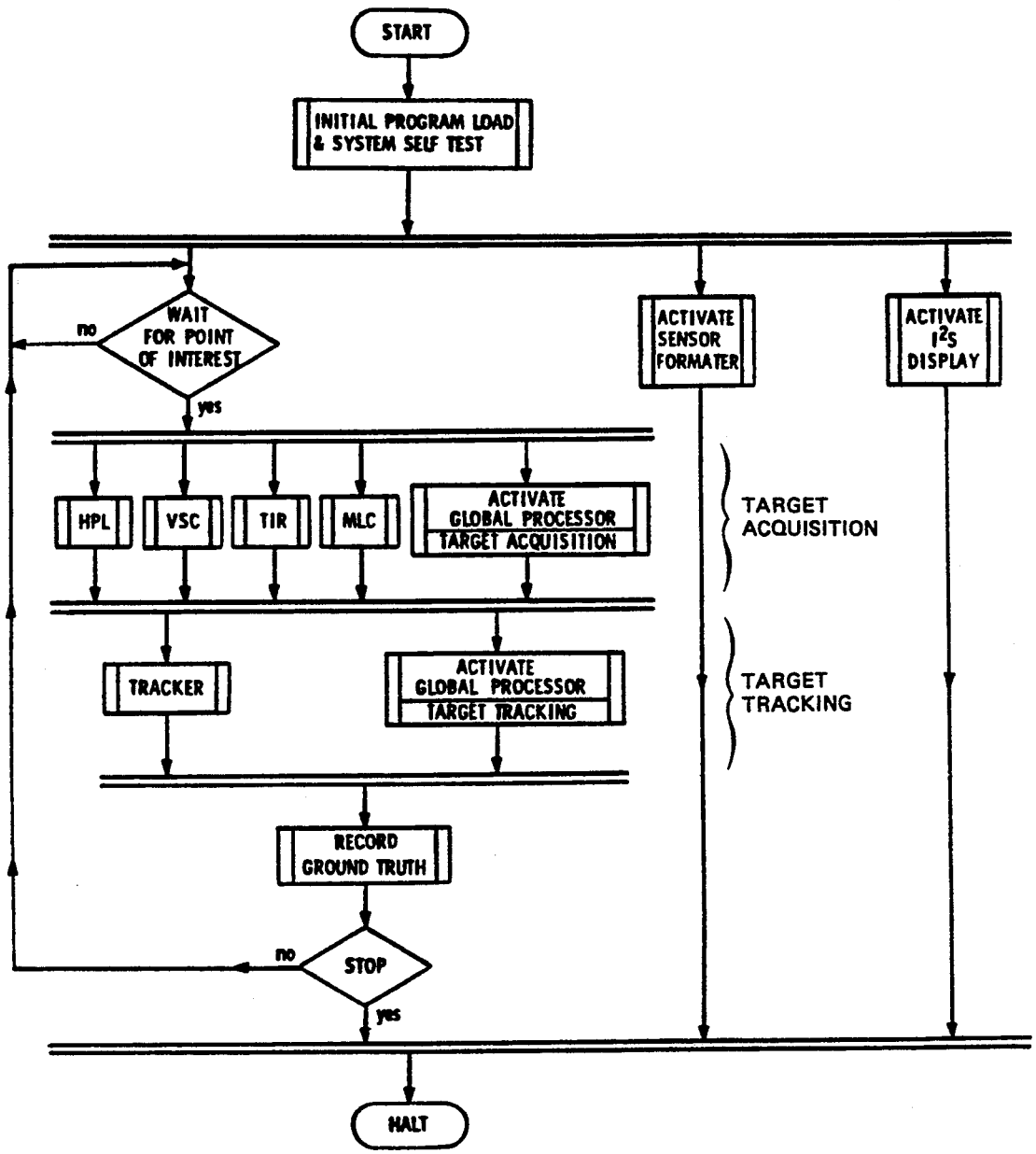

FIG. 30 is a software block diagram for the system of FIG. 29.

Figure 31:
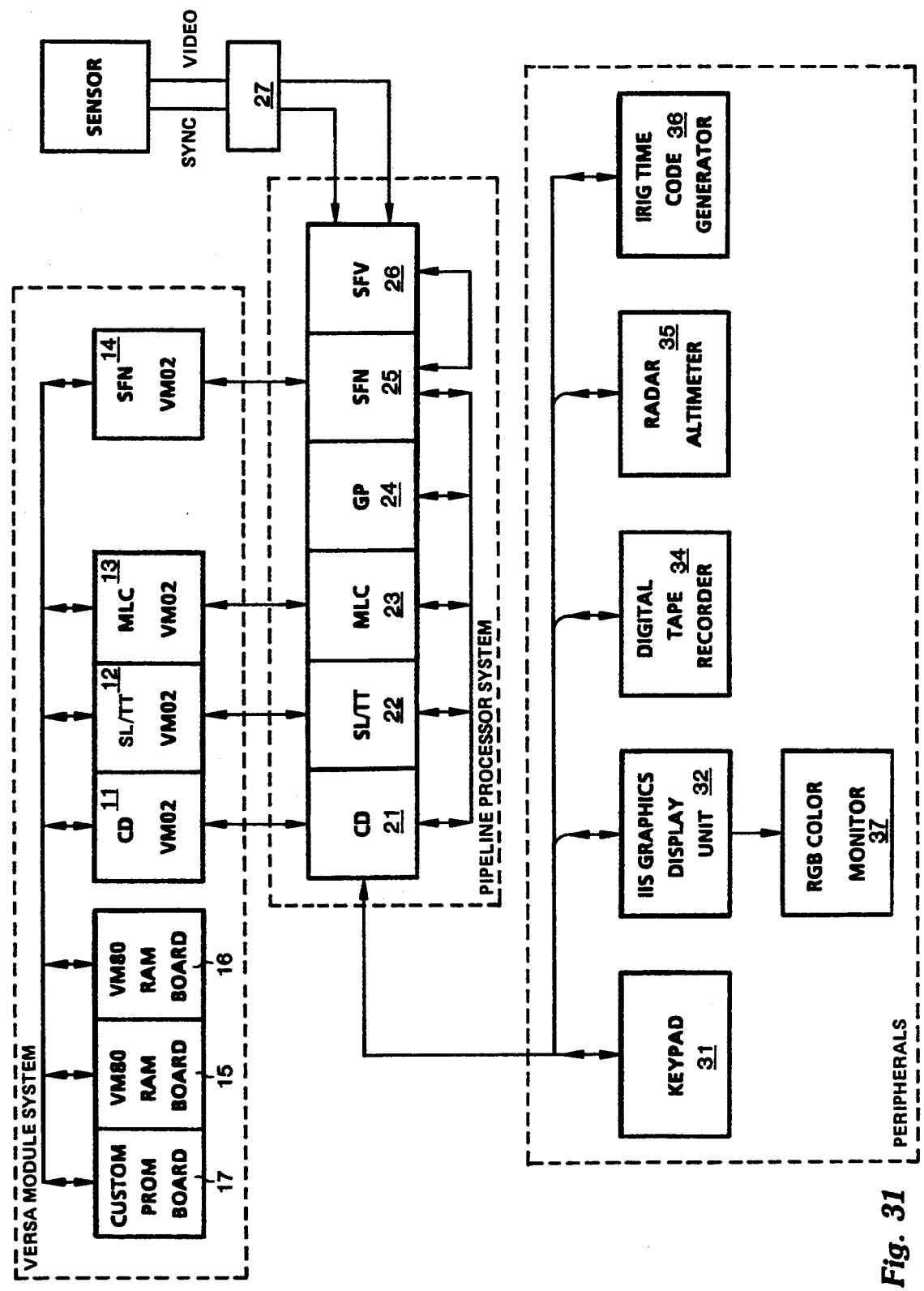

FIG. 31, is the basic hardware block diagram for the system of FIG. 29.

Figure 32A:
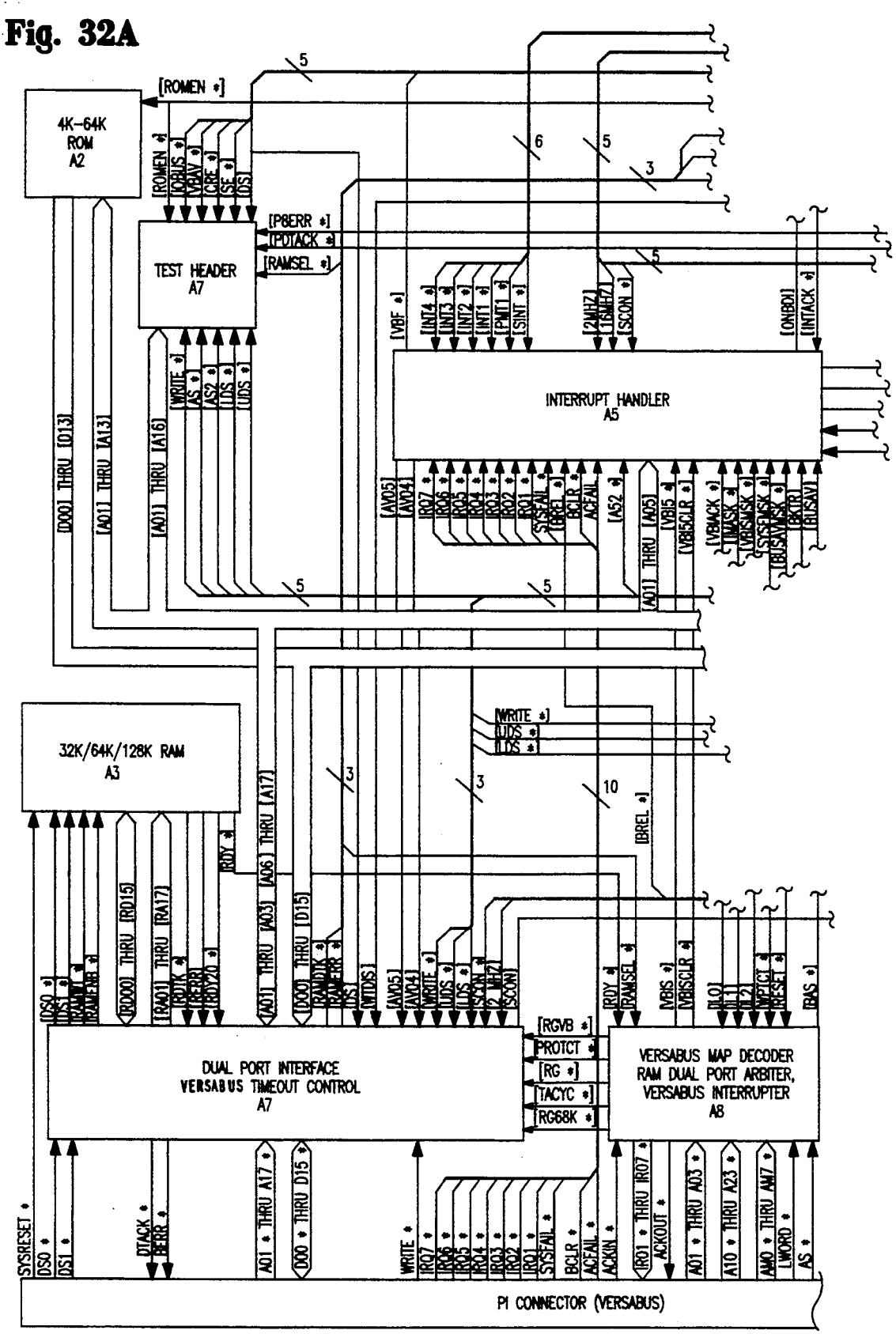
Figure 32B:
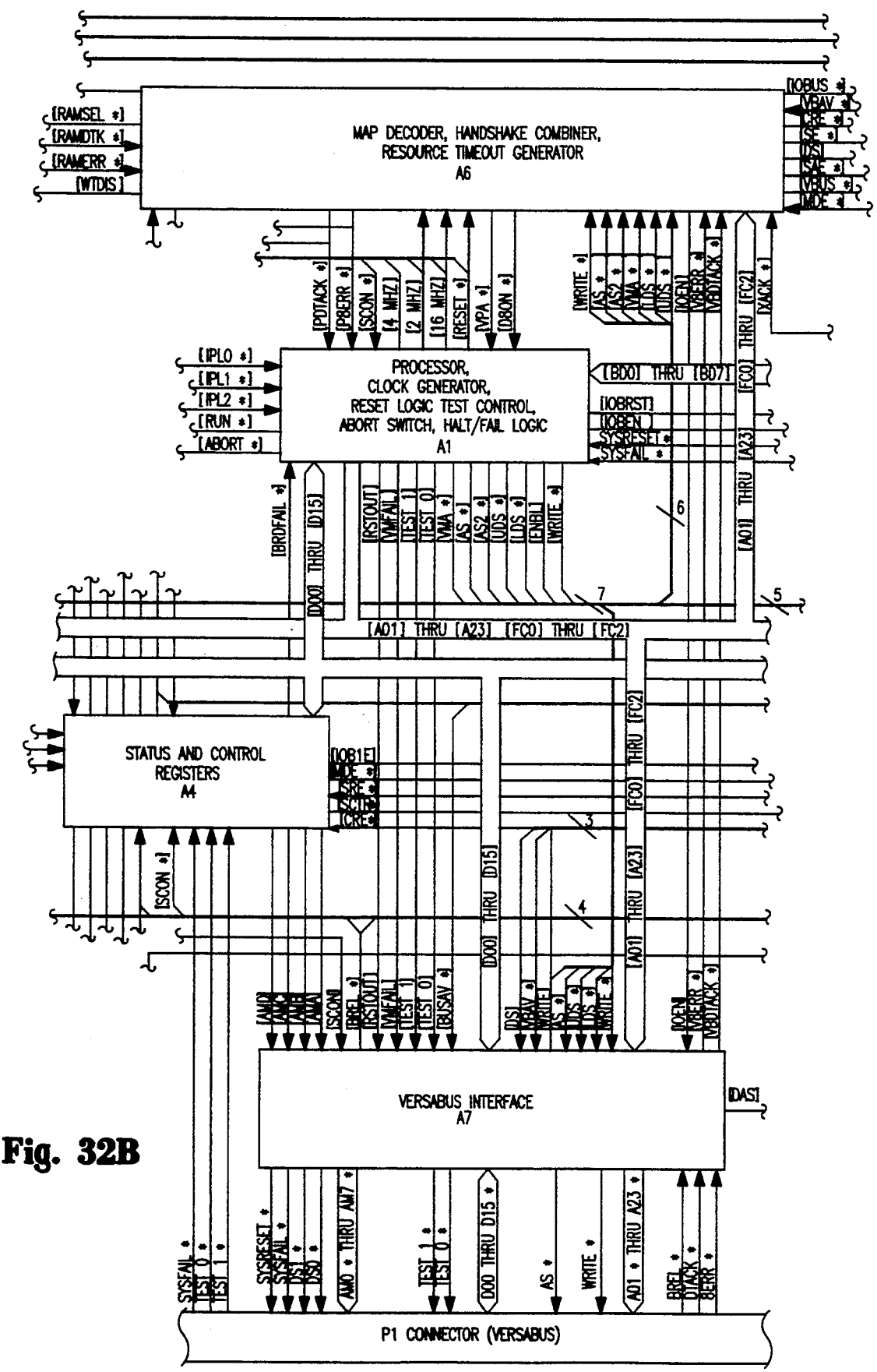
Figure 32C:
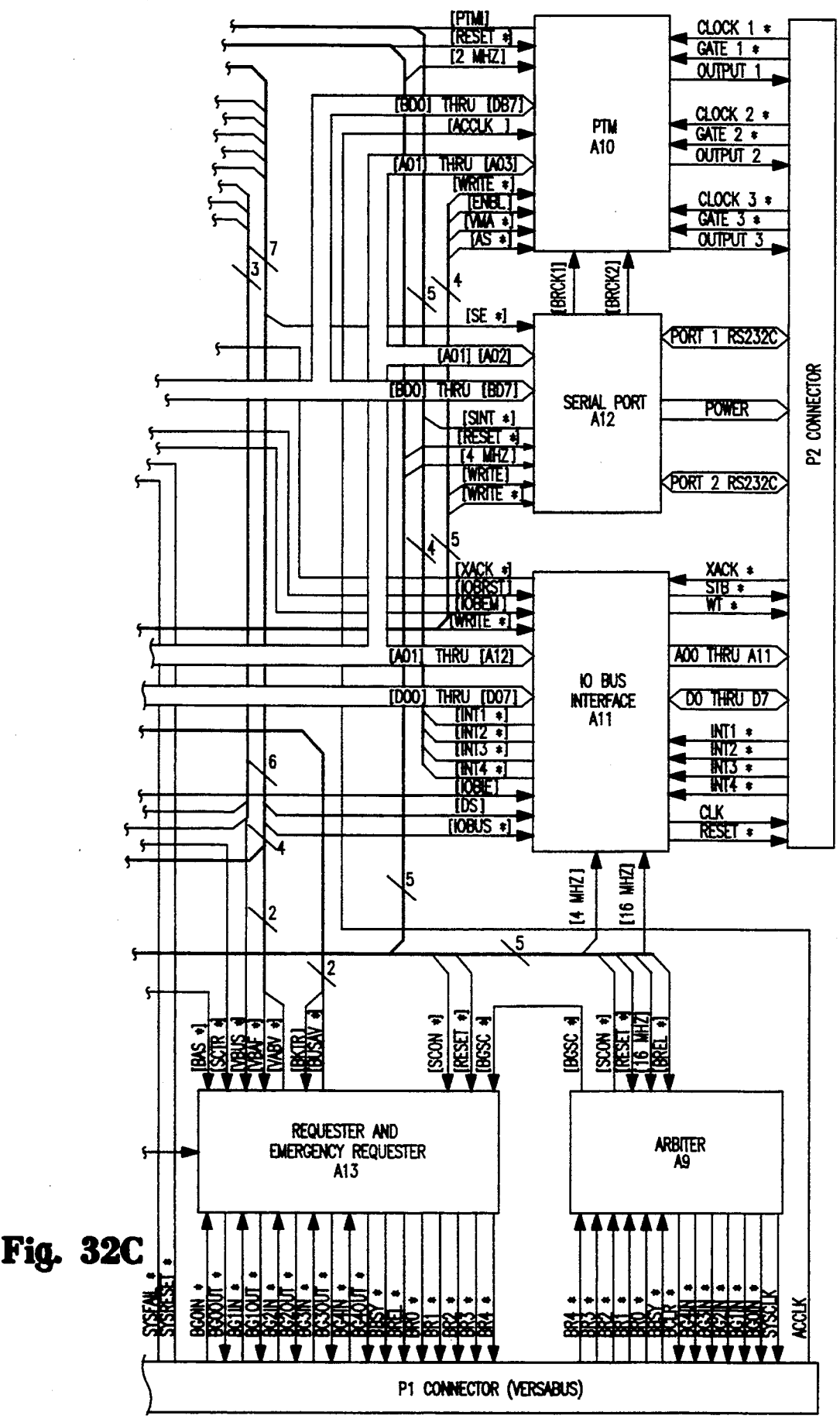

FIGS. 32A, 32B AND 32C, taken together, comprise a block diagram of an M68KVM02 monoboard computer.

Figure 33A:
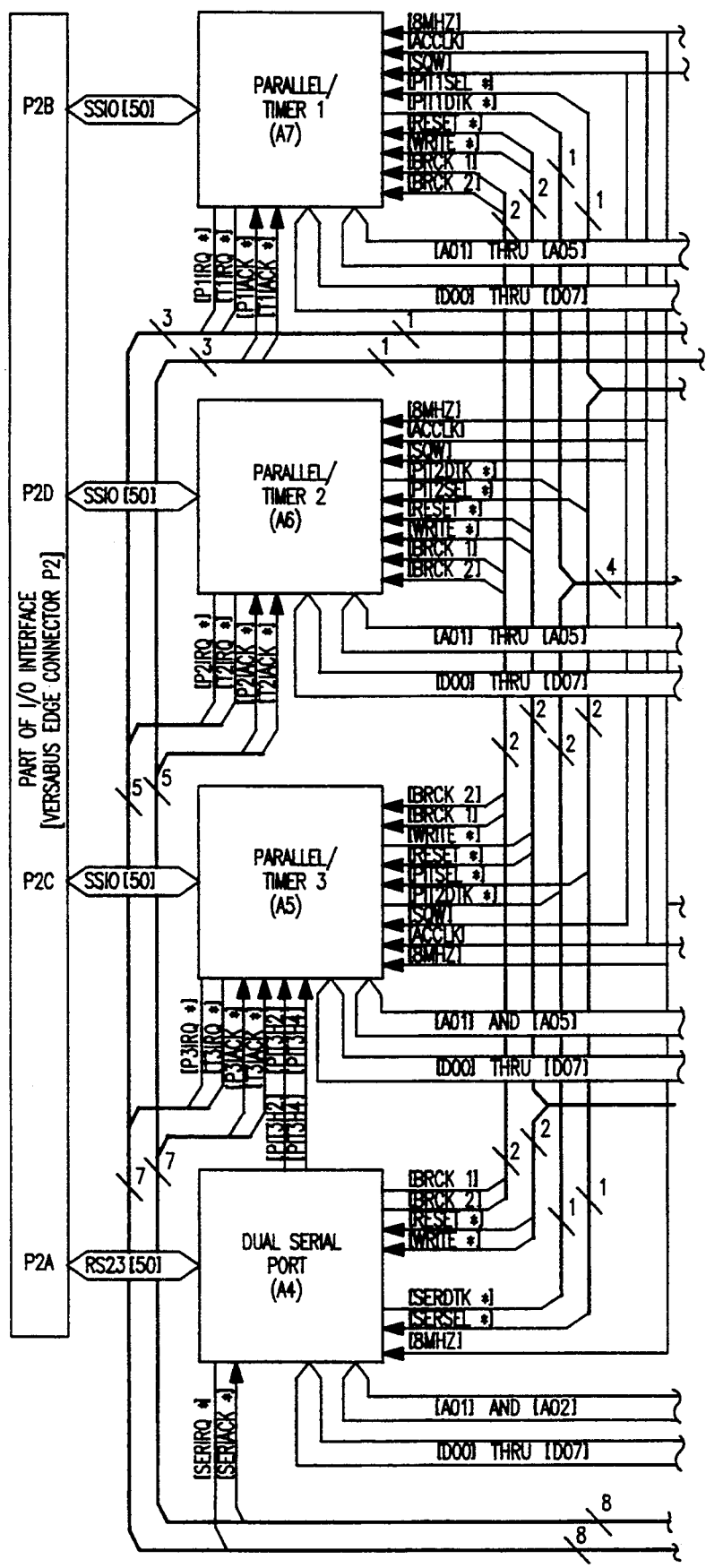
Figure 33B:
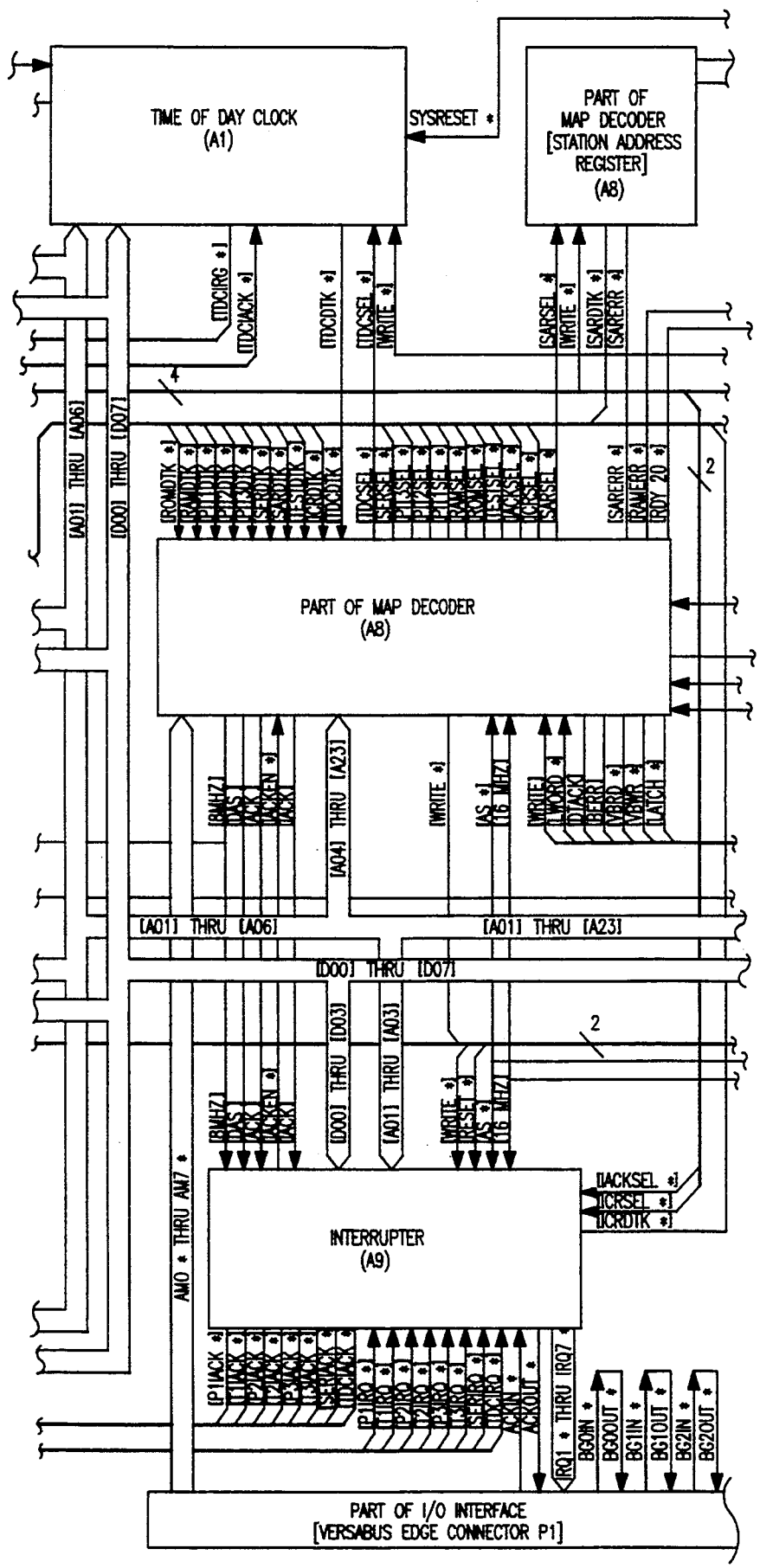
Figure 33C:
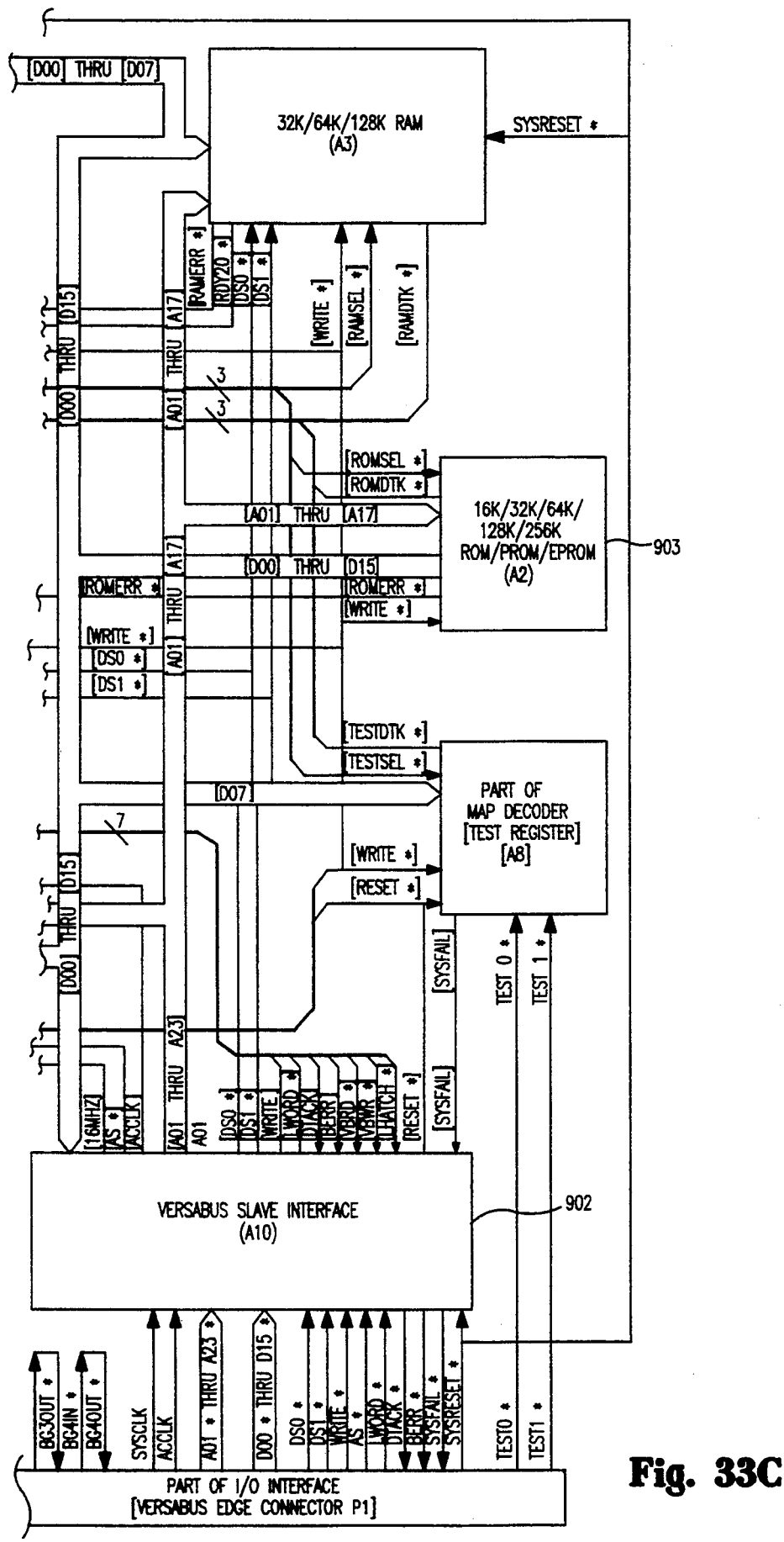

FIGS. 33A, 33B, AND 33C, taken together, comprise a block diagram of an M68AKVM80 memory board.

Figure 34:
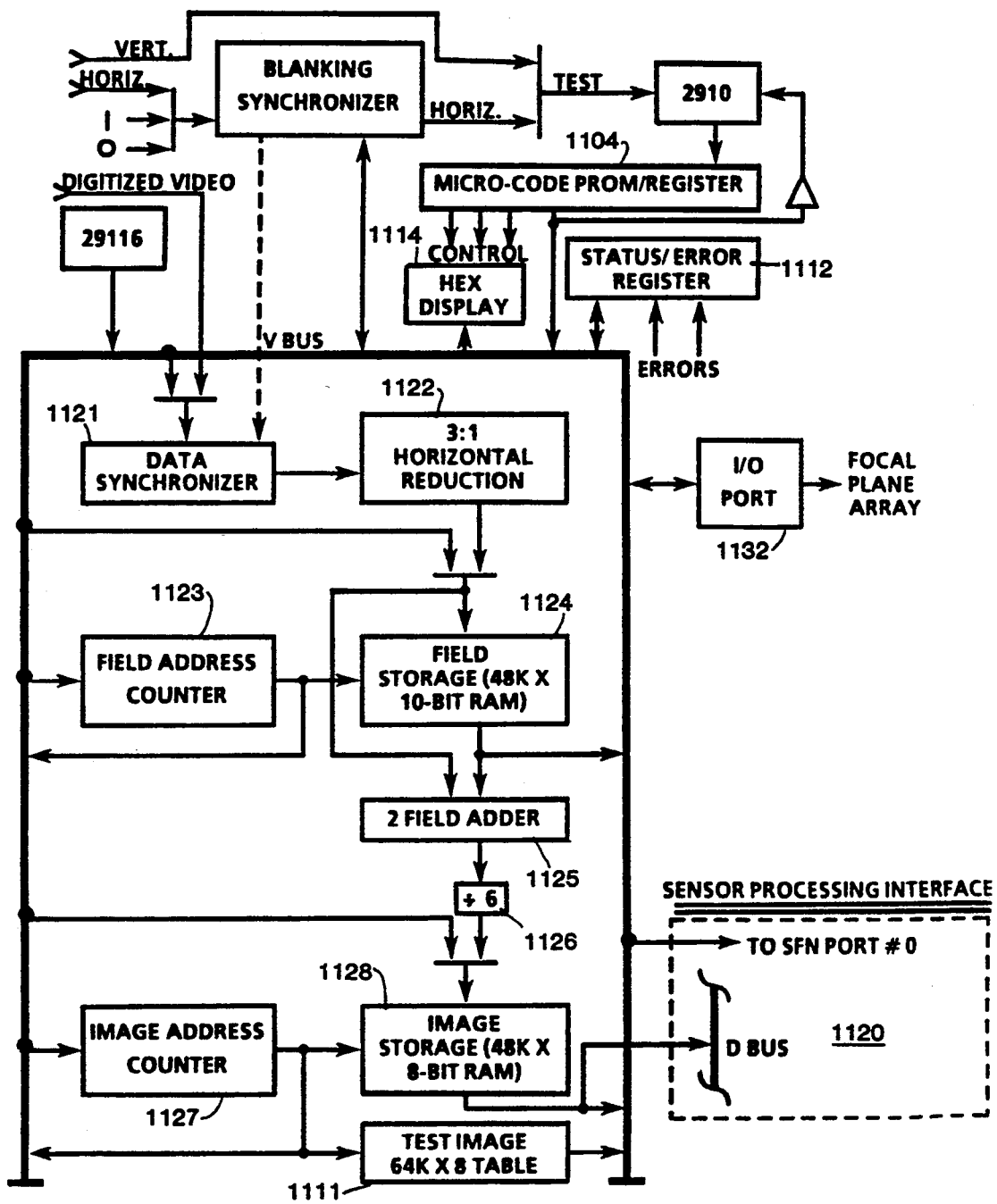

FIG. 34 is a block diagram of the sensor formatter/video processor of FIGS. 29 and 31.

Figure 35:
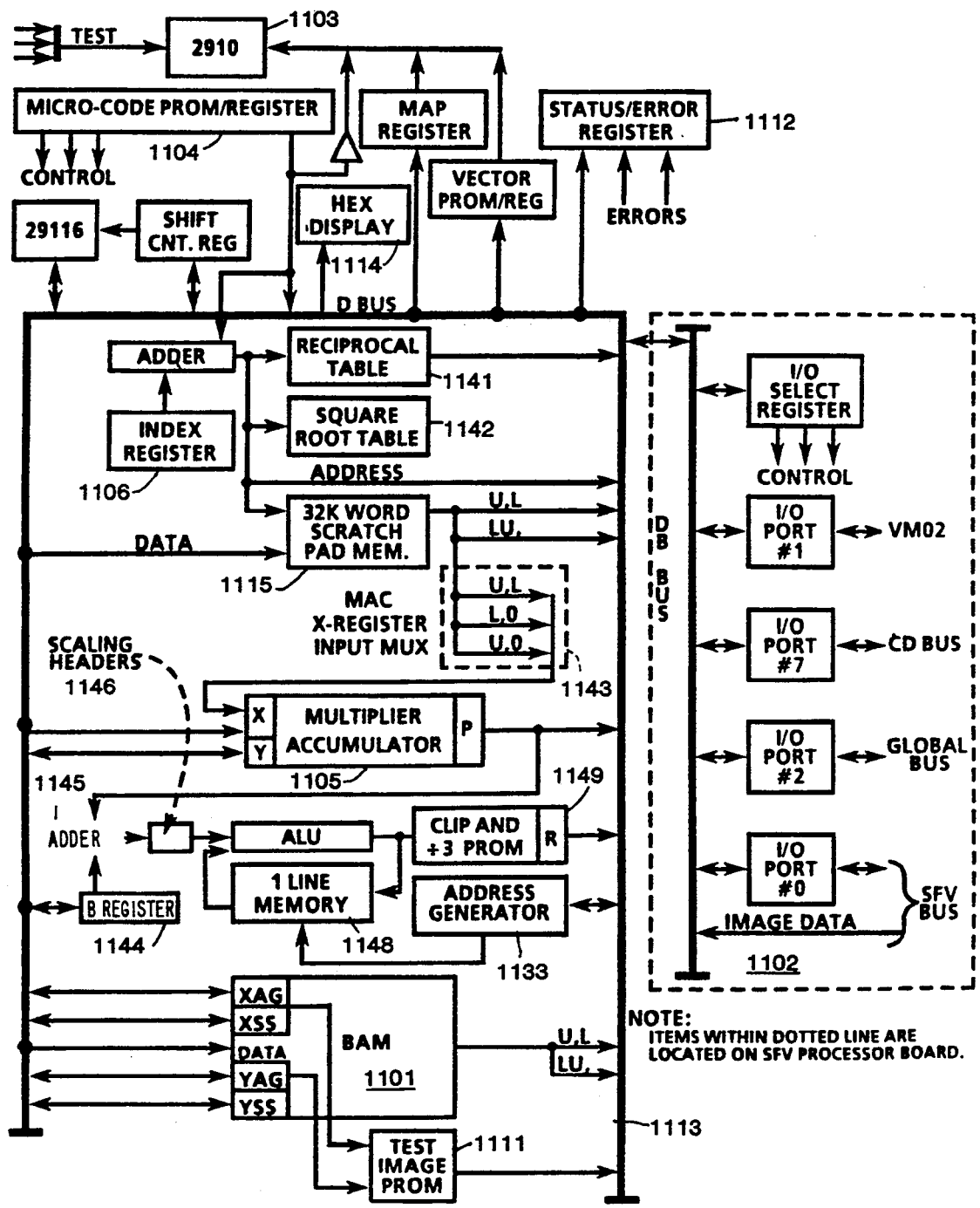

FIG. 35 is a block diagram of the sensor formatter/numeric processor of FIGS. 29 and 31.

Figure 36:
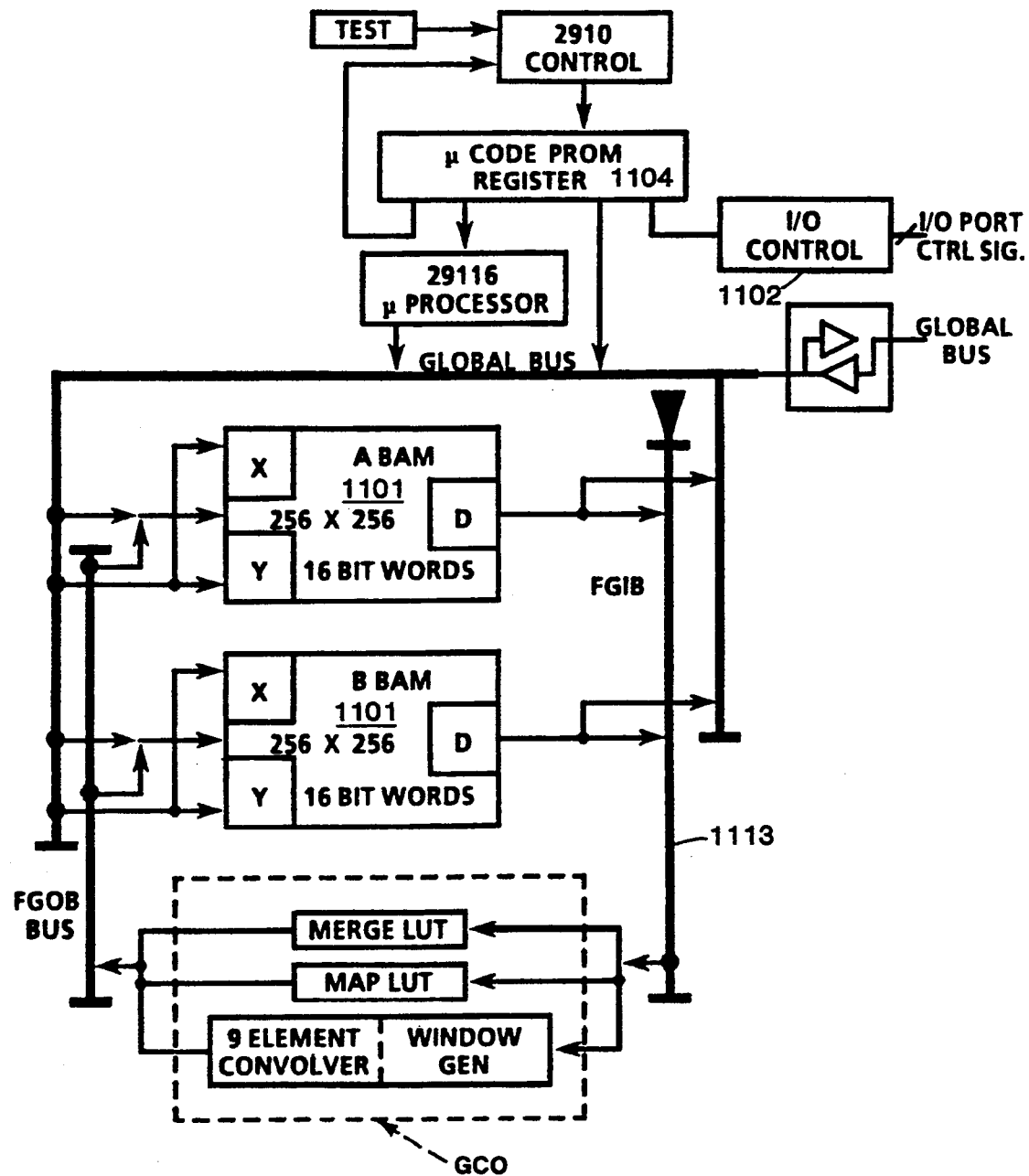

FIG. 36 is a block diagram of the global processor of FIGS. 29 and 31.

Figure 37:
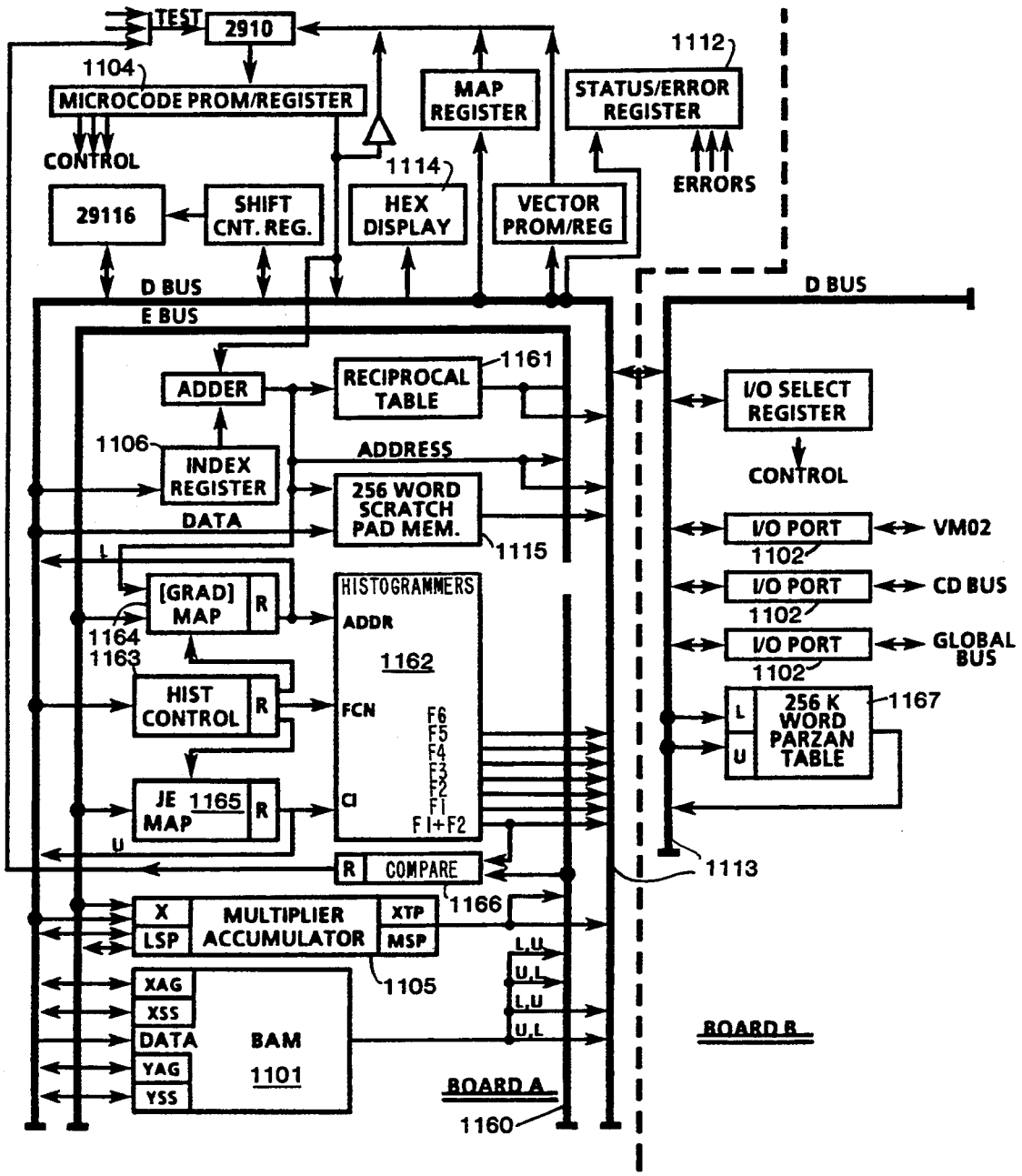

FIG. 37 is a block diagram of the maximum likelihood classifier processor of FIGS. 29 and 31.

Figure 38:
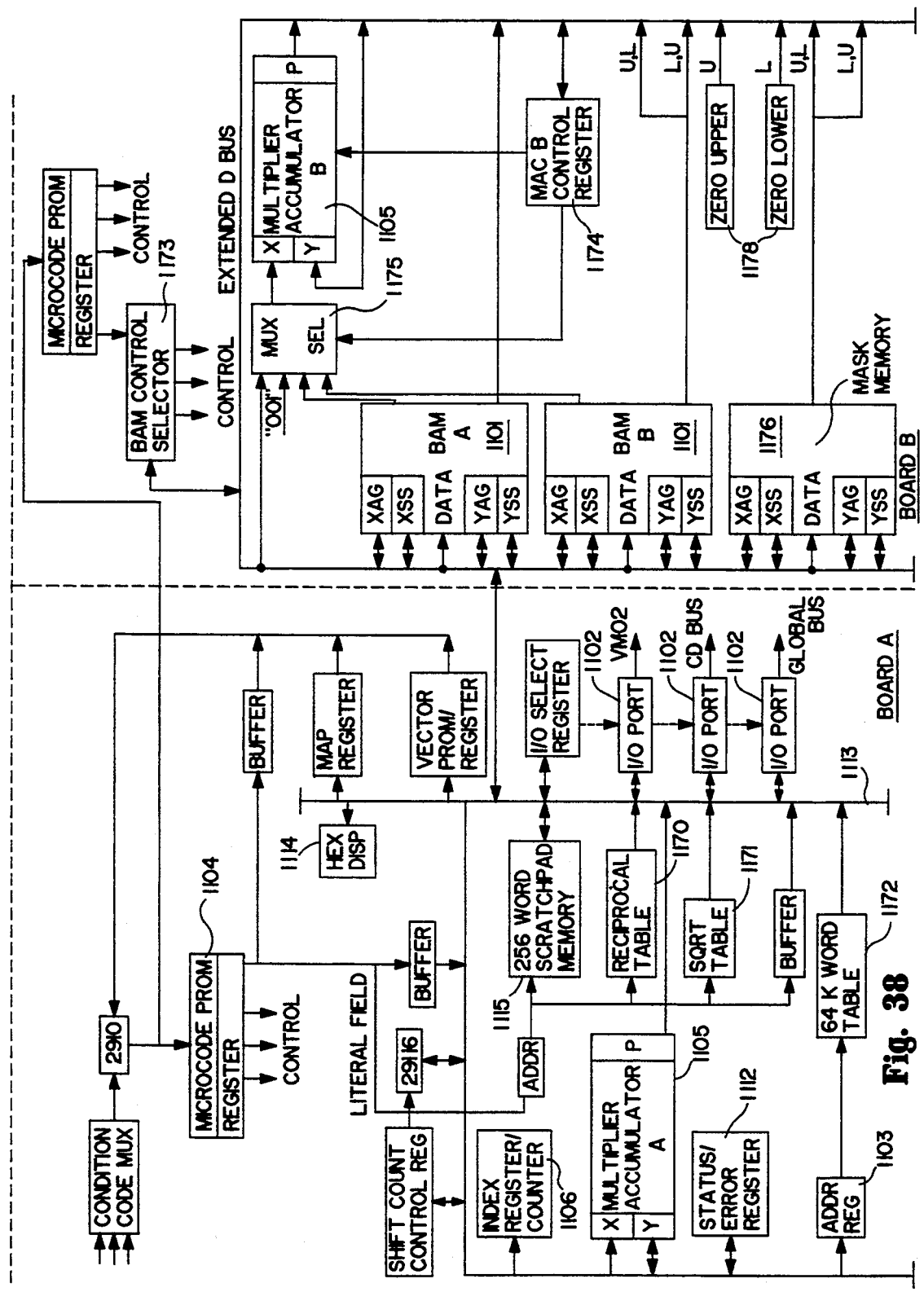

FIG. 38 is a block diagram of the scene-lock/target-track processor of FIGS. 29 and 31.

Figure 39:
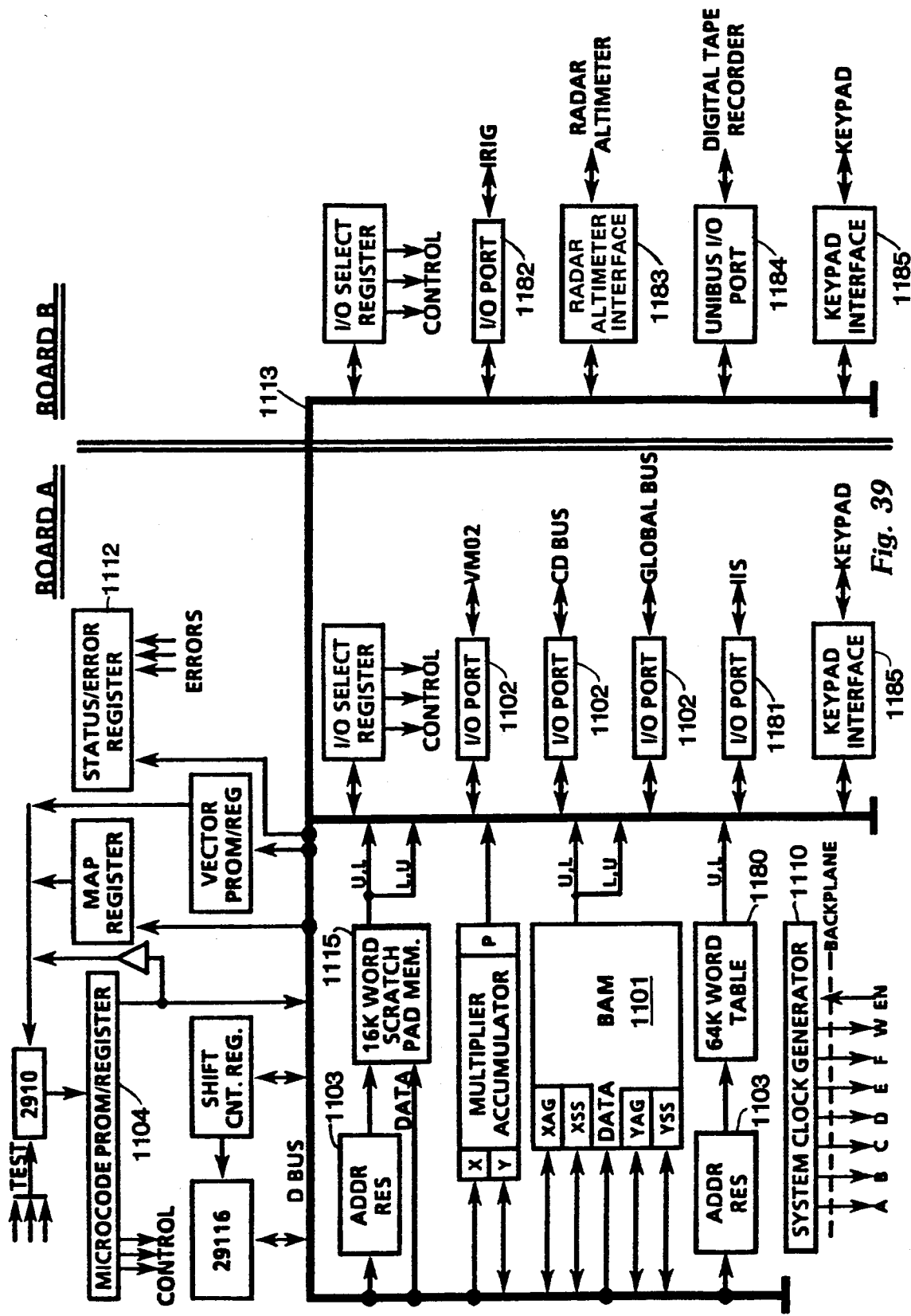

FIG. 39 is a block diagram of the control and display processor of FIGS. 29 and 31.

Figure 40:
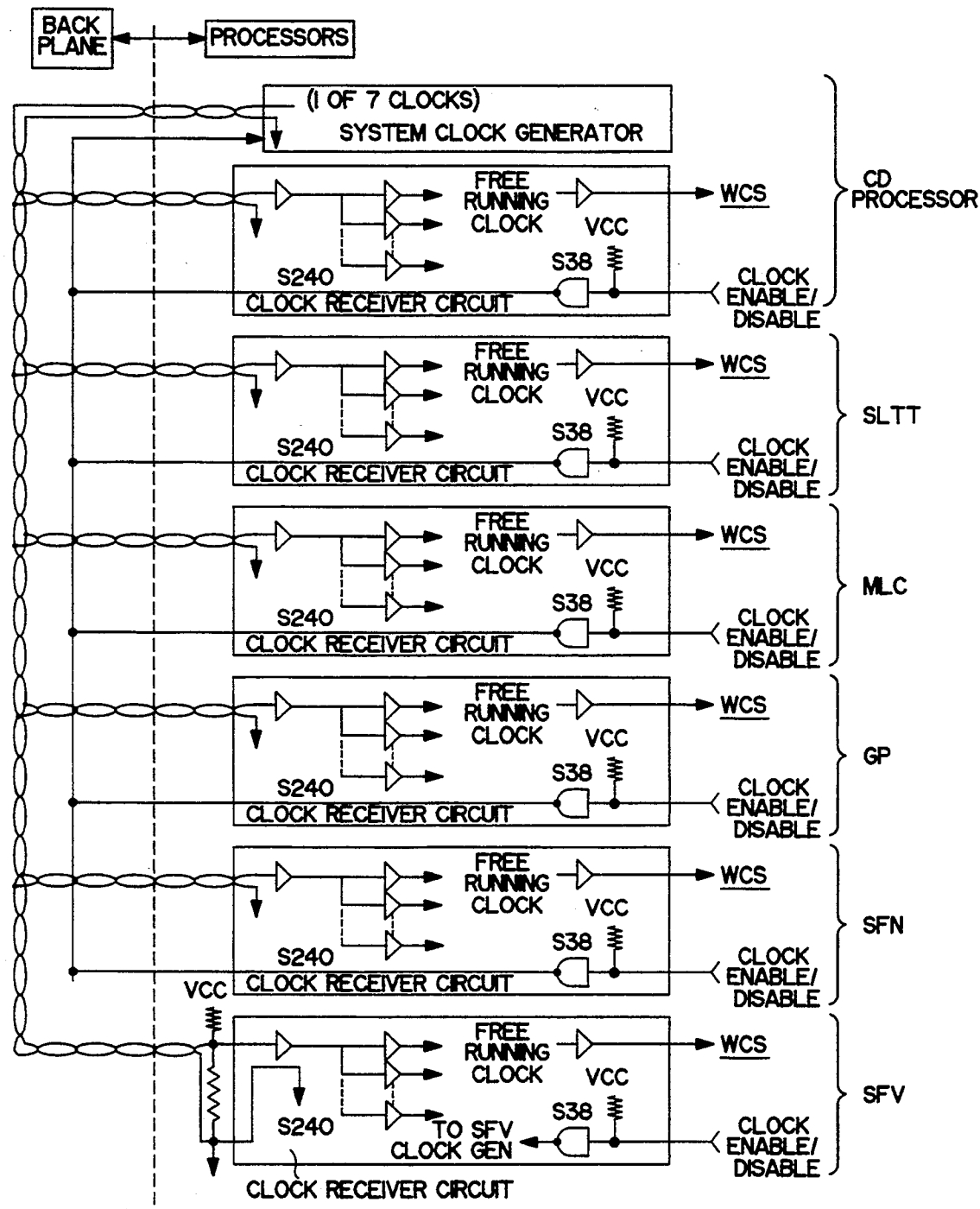

FIG. 40 is a diagram showing clock distributions throughout the pipeline processors of FIG. 39.

Figure 41:
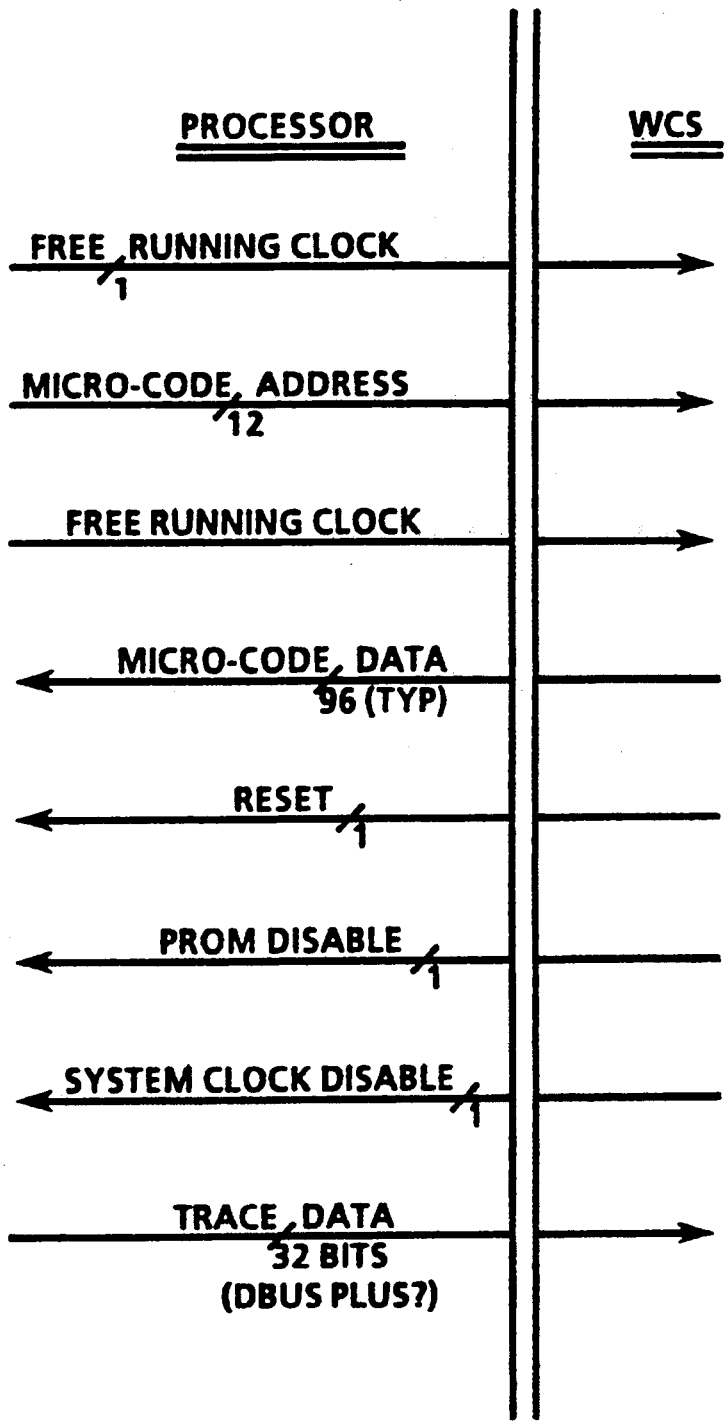

FIG. 41 is a schematic diagram of the writable control store interface for the processors of FIGS. 34–39.

Figure 42:
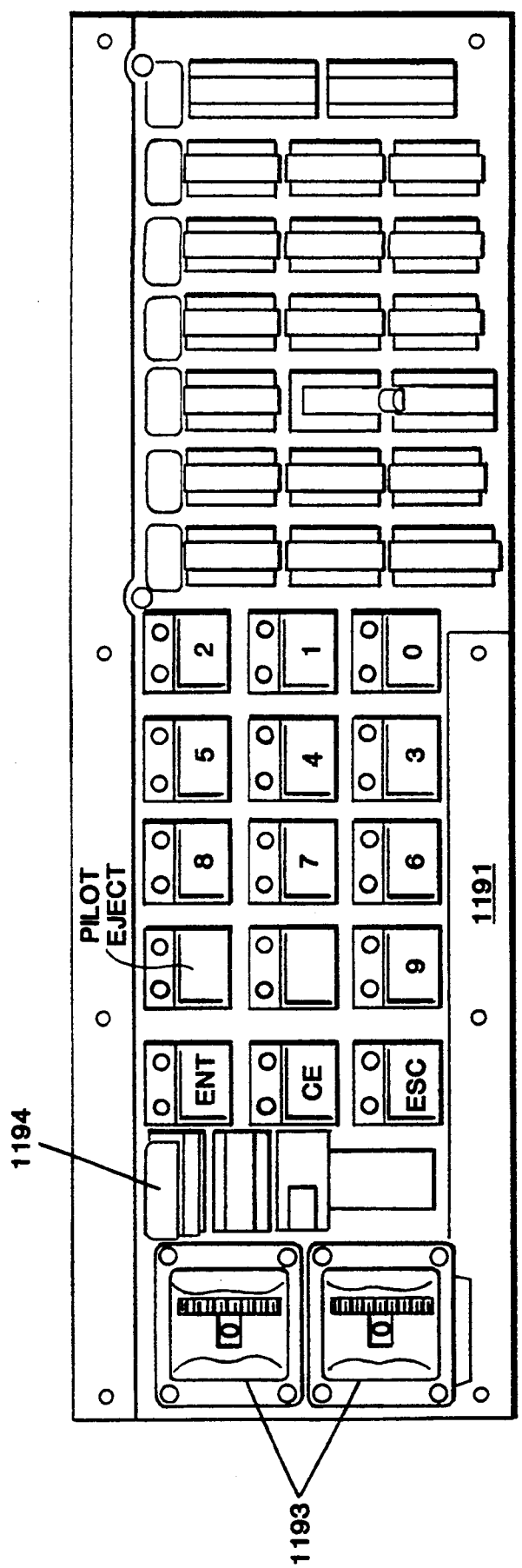

FIG. 42 is a plan view of the data input keypad for the system of FIG. 31.

Figure 43:
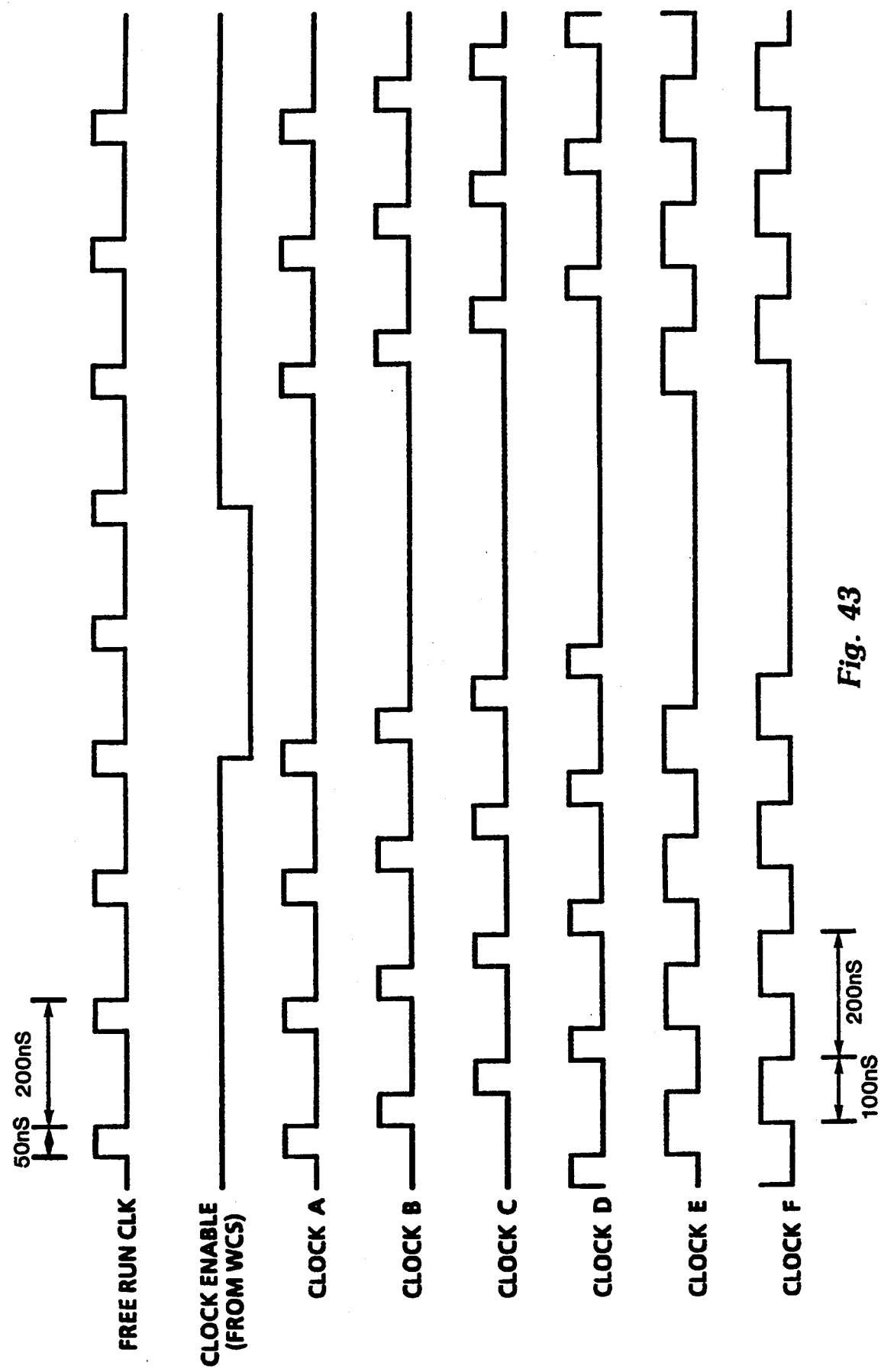

FIG. 43 illustrates the interrelation and duration of the pulse trains produced by the system clock generator of FIG. 39.

Figure 44:
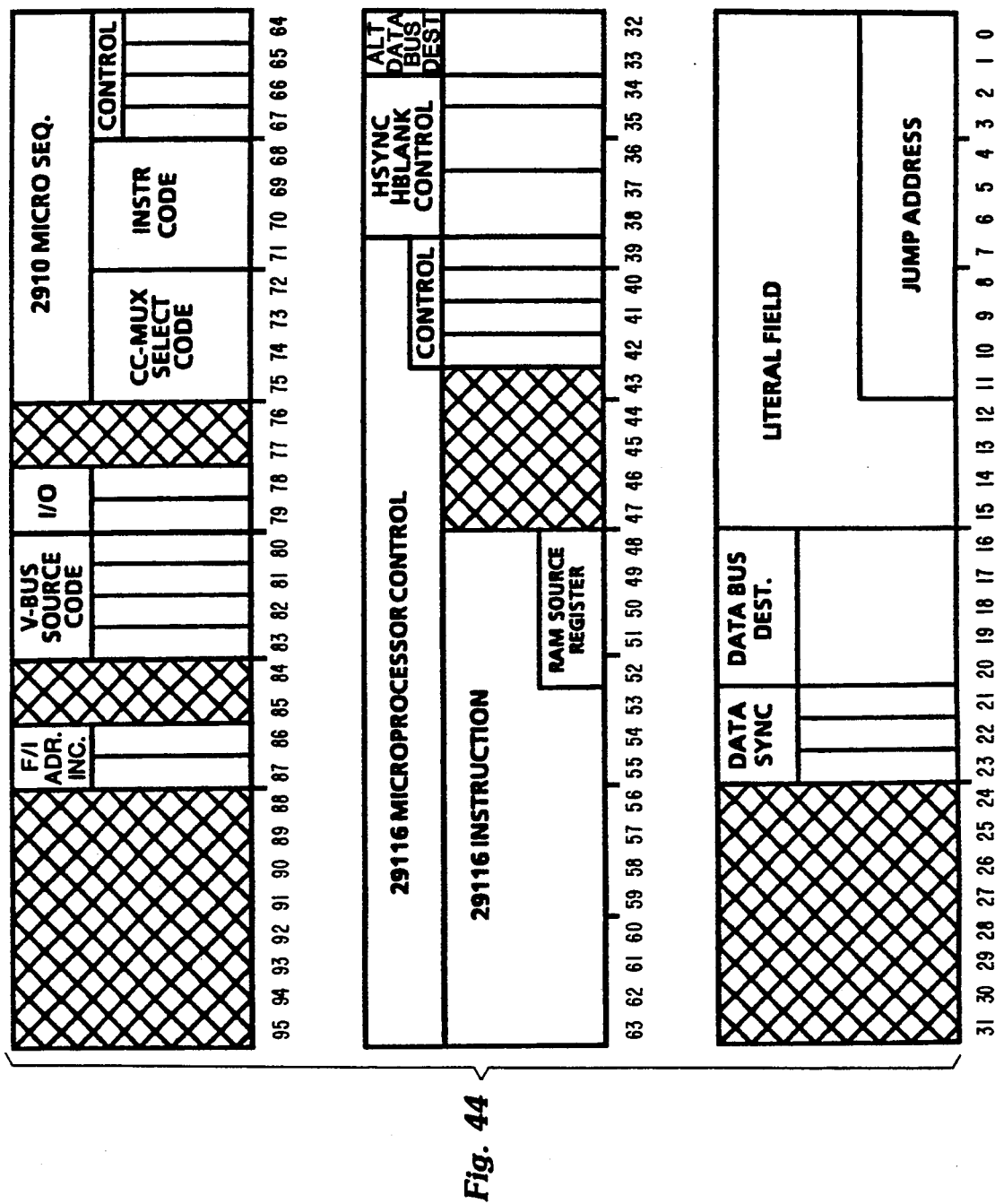

FIG. 44 illustrates the microword format used by the sensor formatter/video processor of FIG. 34.

Figure 45:
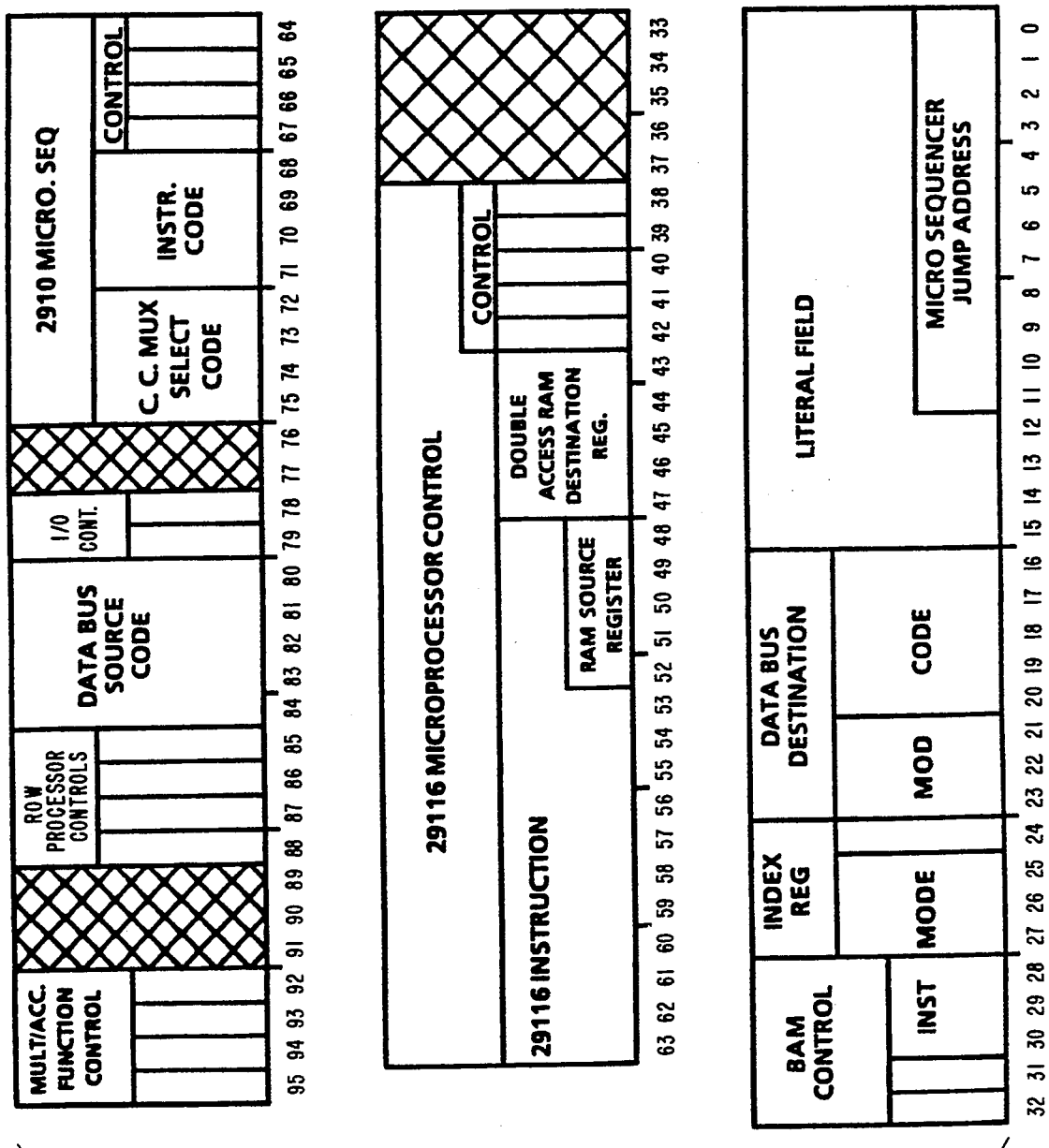

FIG. 45 illustrates the word format used by the sensor formatter/numeric processor of FIG. 35.

Figure 46:
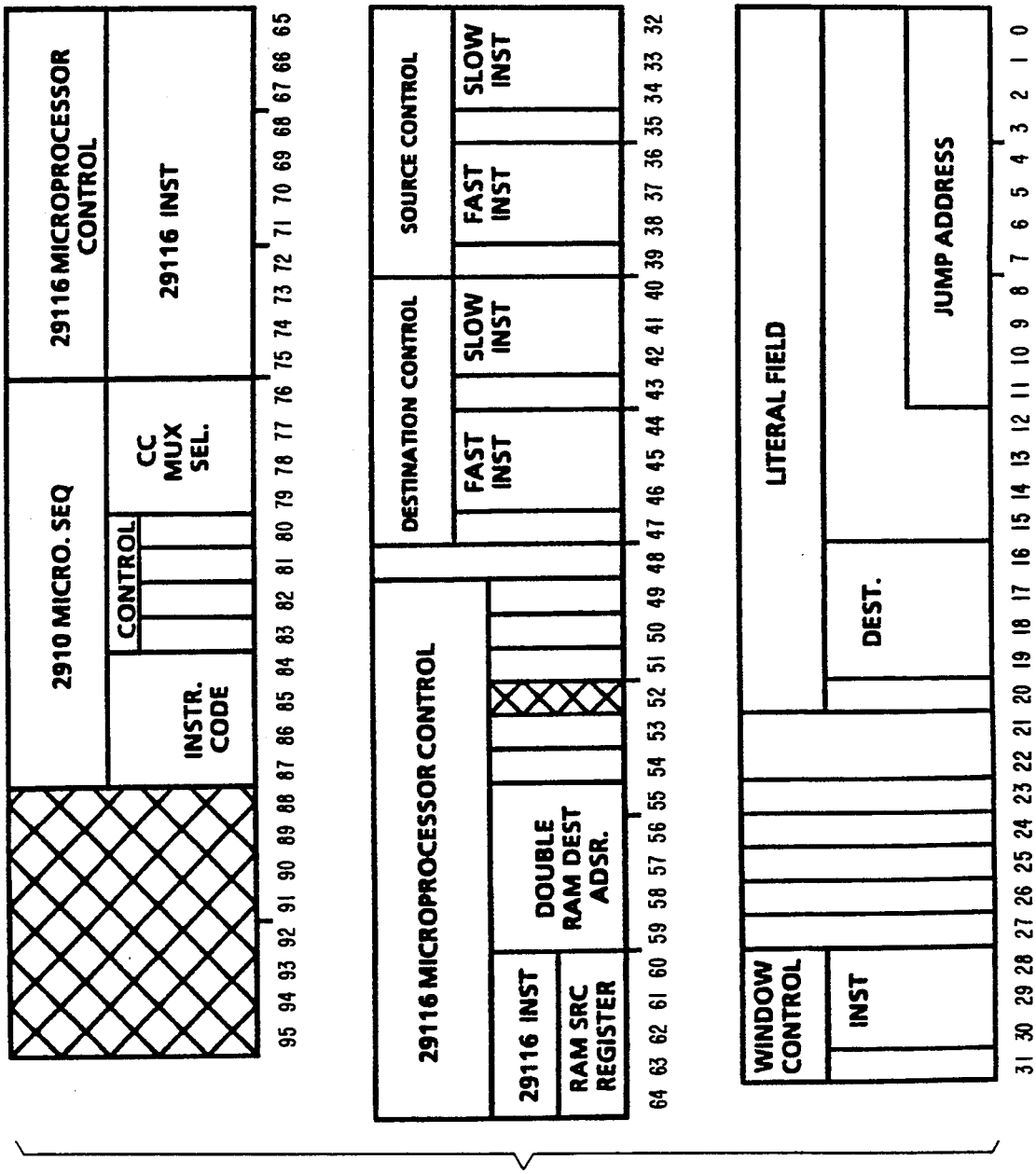

FIG. 46 illustrates the microword format used by the global processor of FIG. 36.

FIG. 47, illustrates the microword format used by the maximum likelihood classifier processor of FIG. 37.

Figure 48:
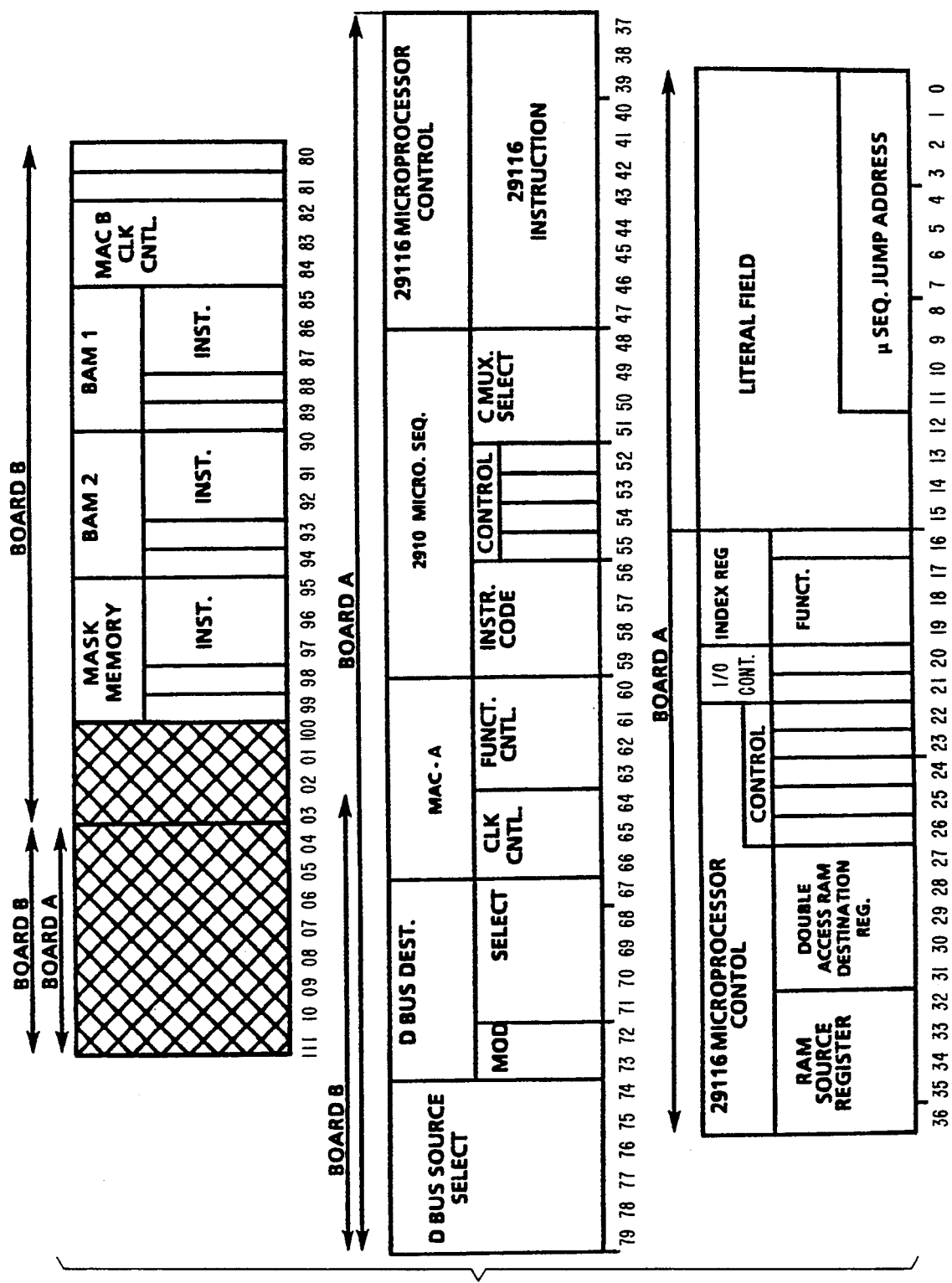

FIG. 48 illustrates the microword format used by the scene-lock/target-track processor of FIG. 38.

Figure 49:
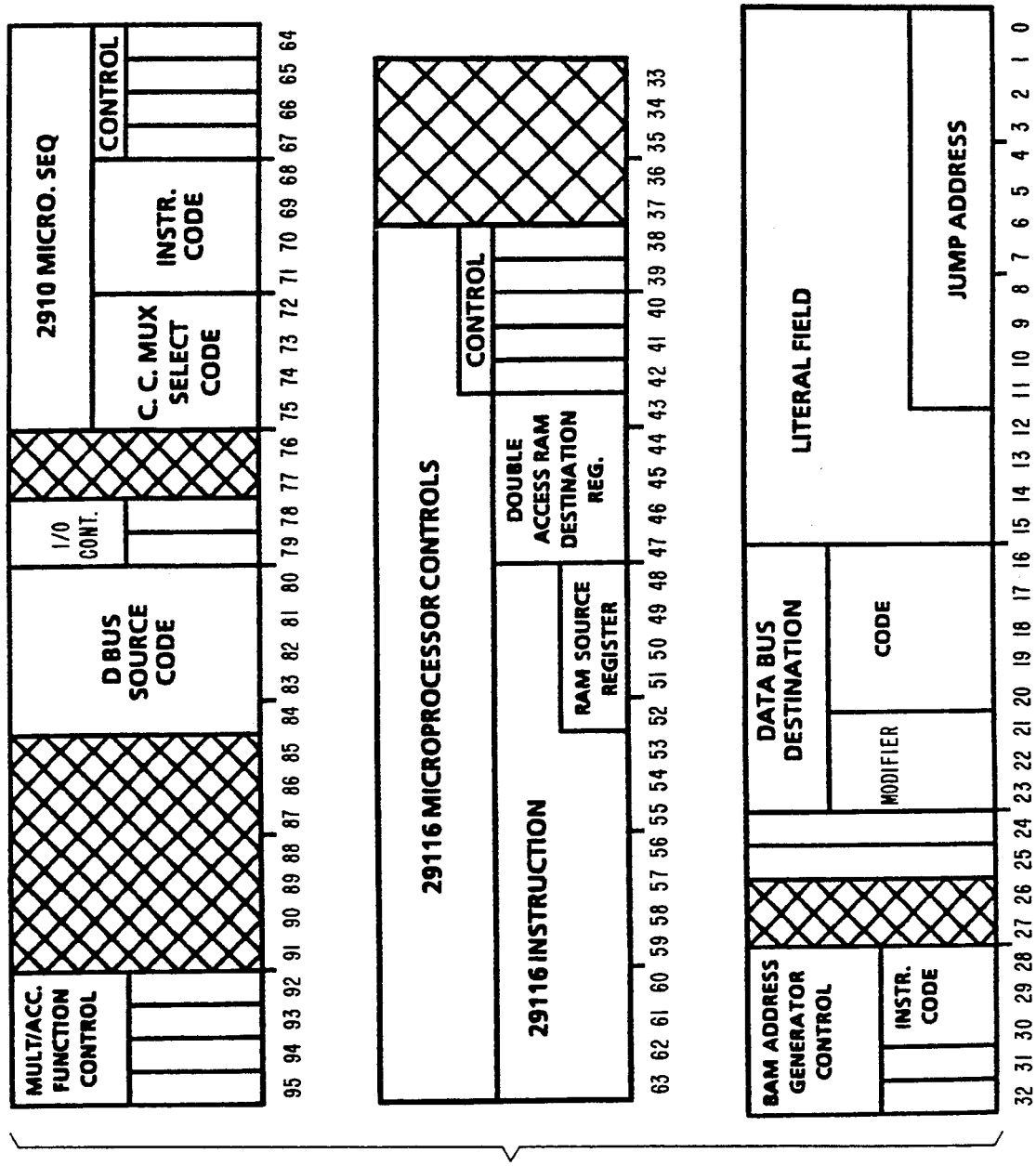
Figure 50A:
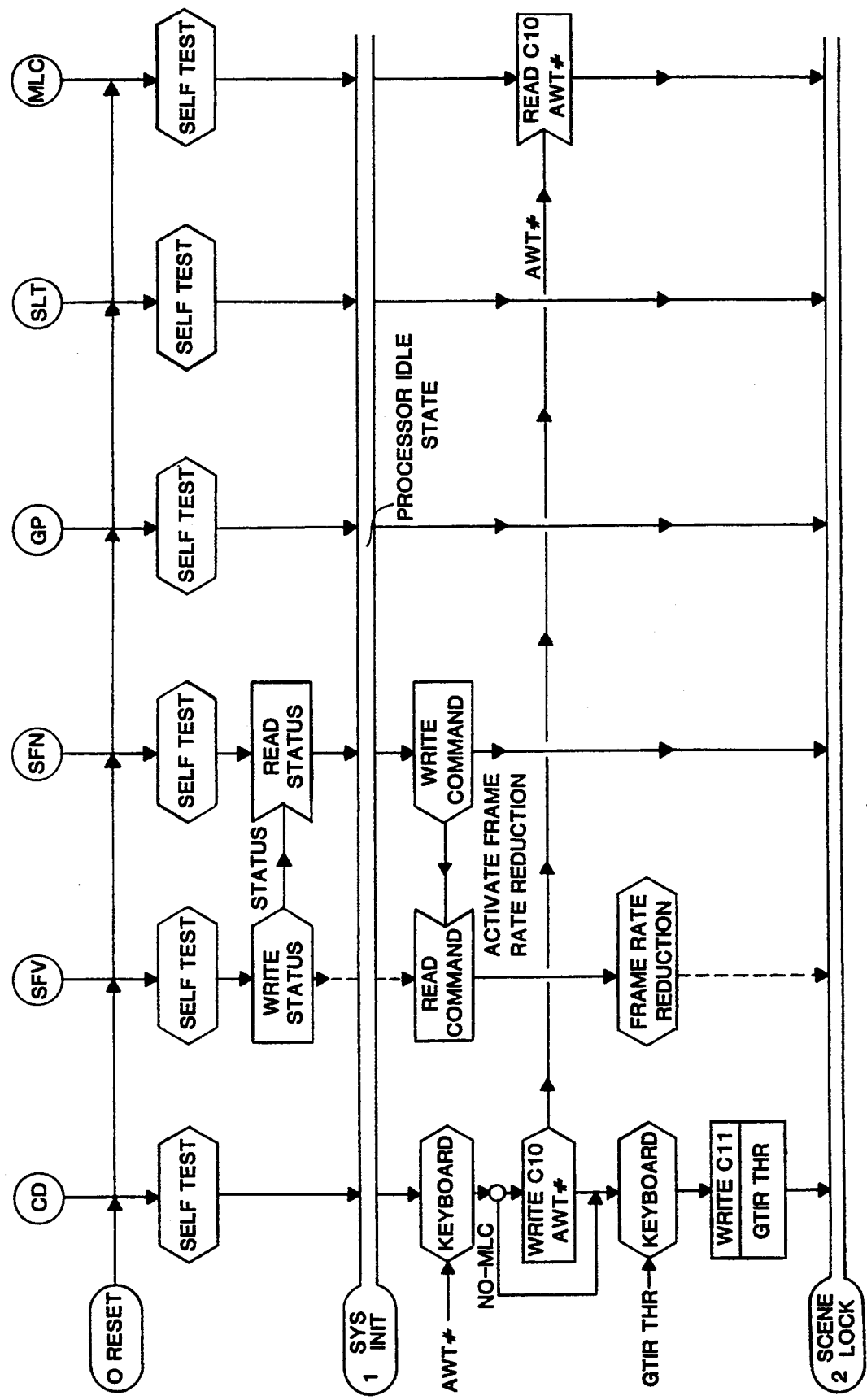
Figure 50B:
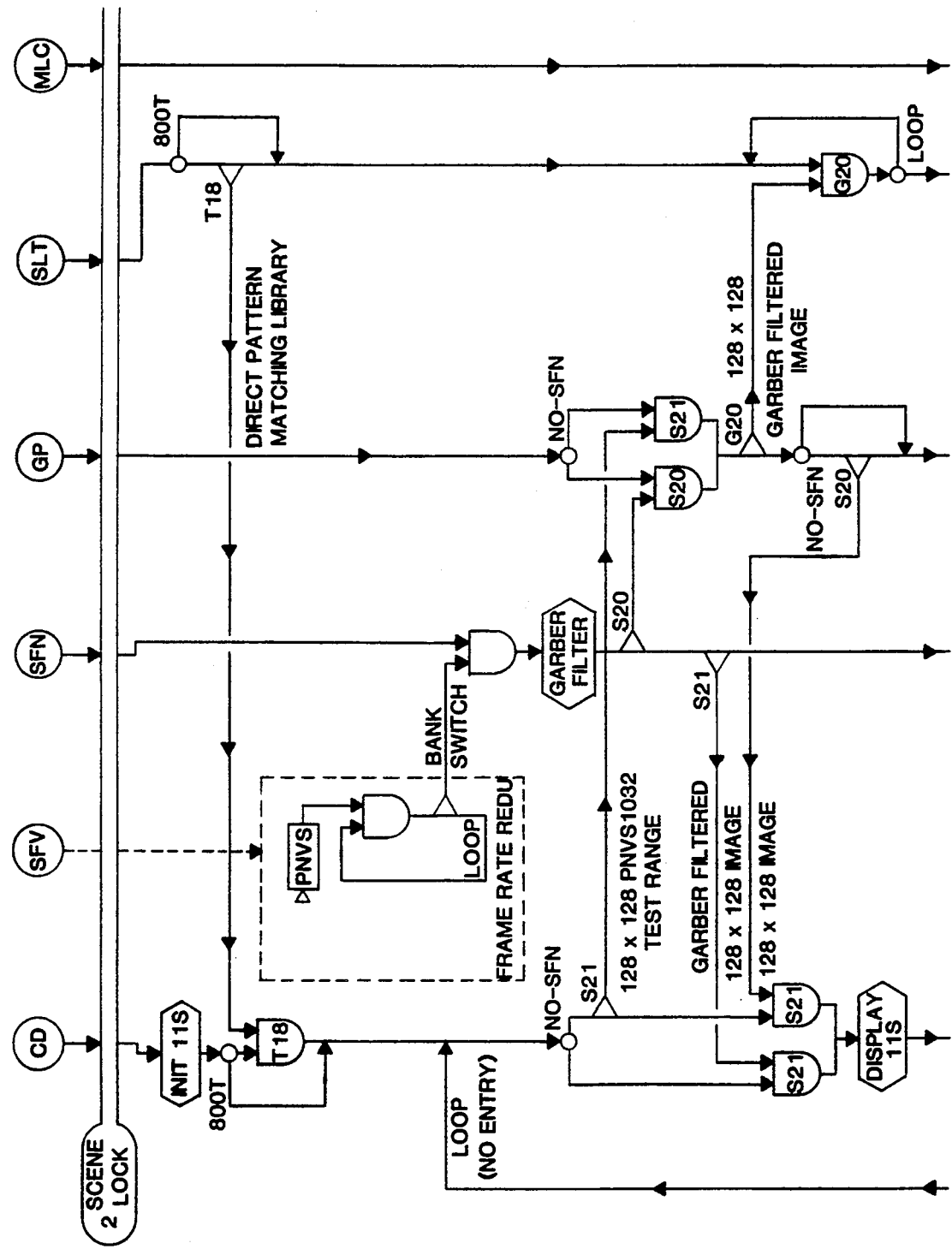
Figure 50C:
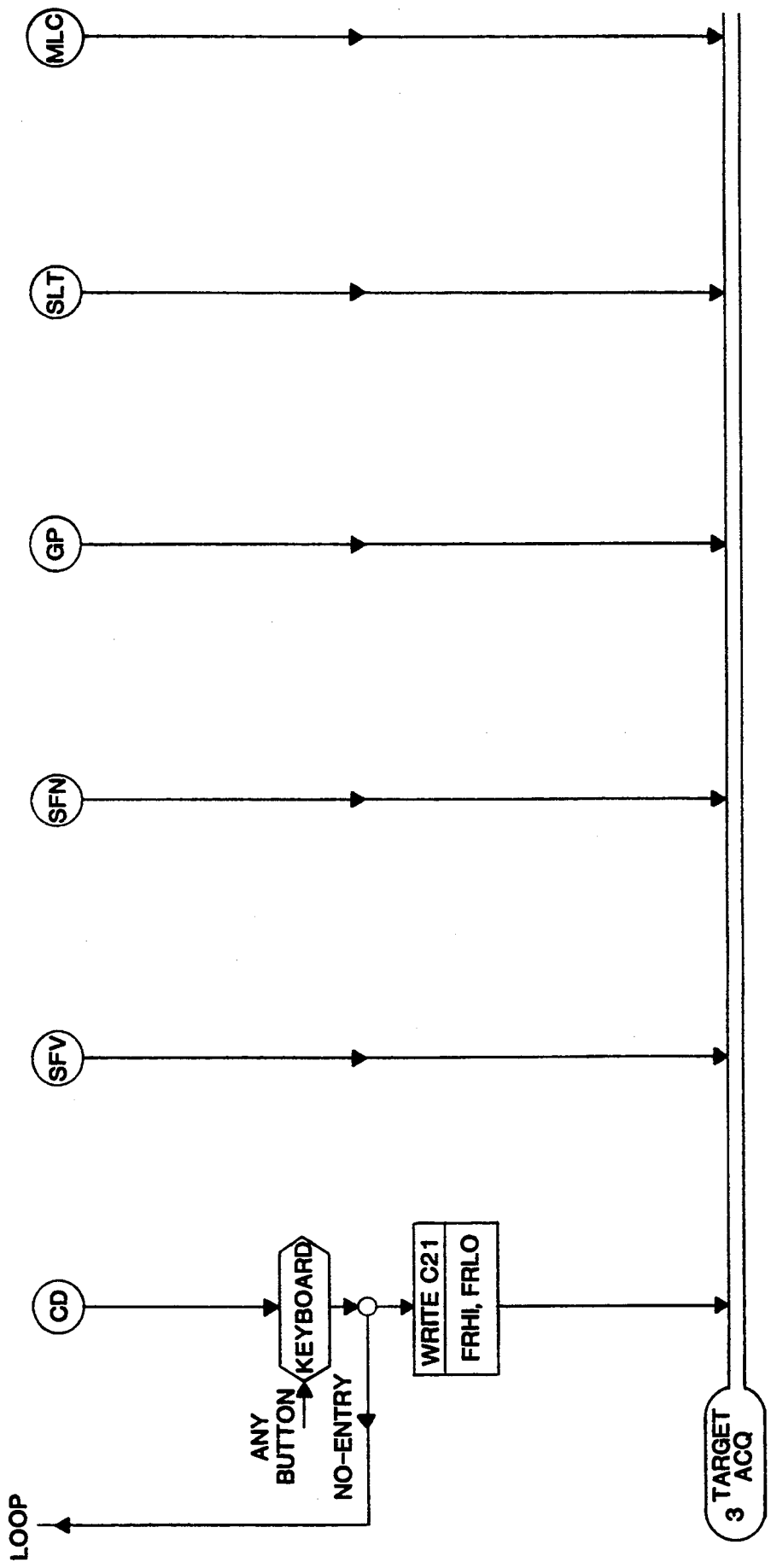
Figure 50D:
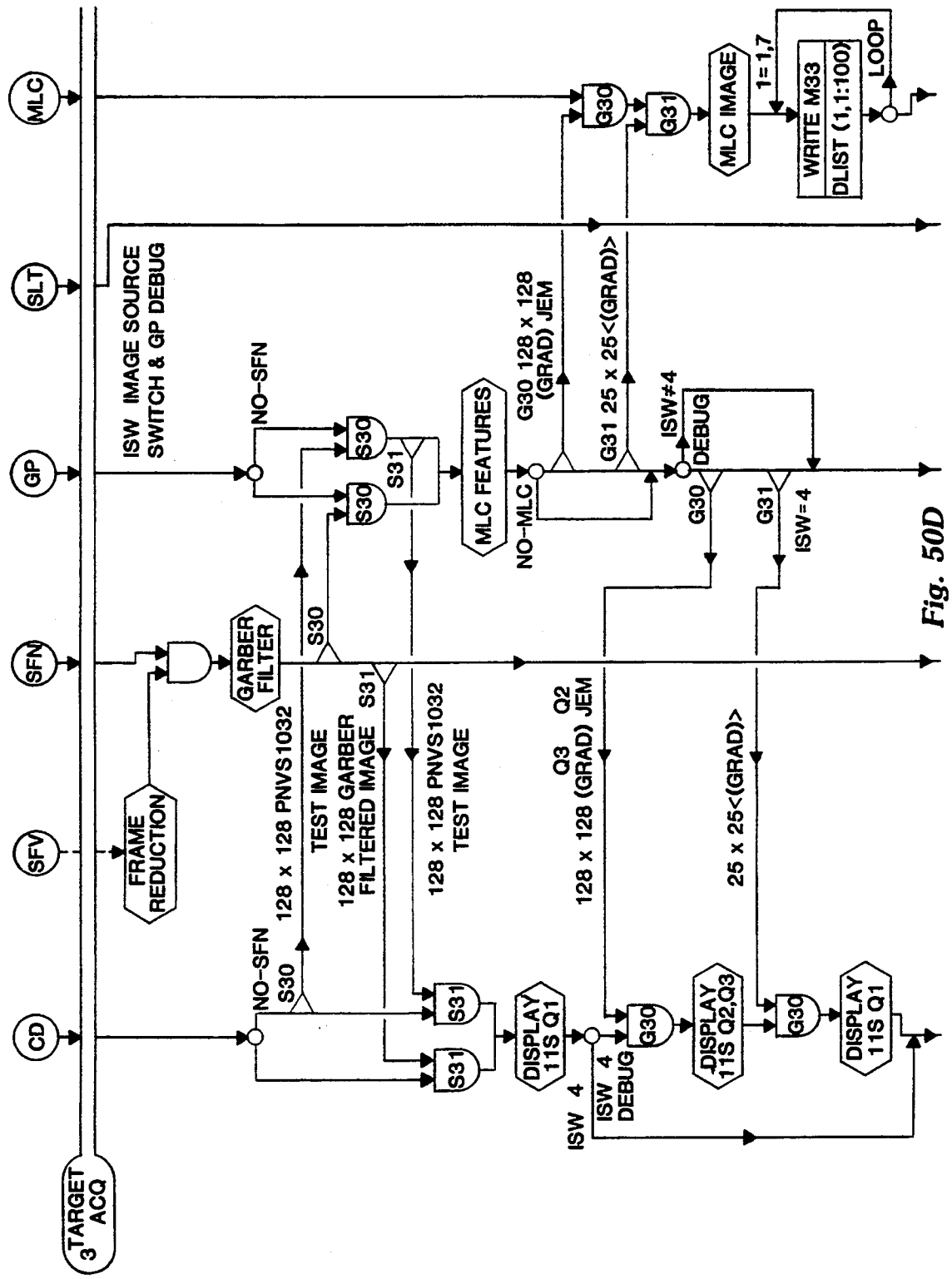
Figure 50E:
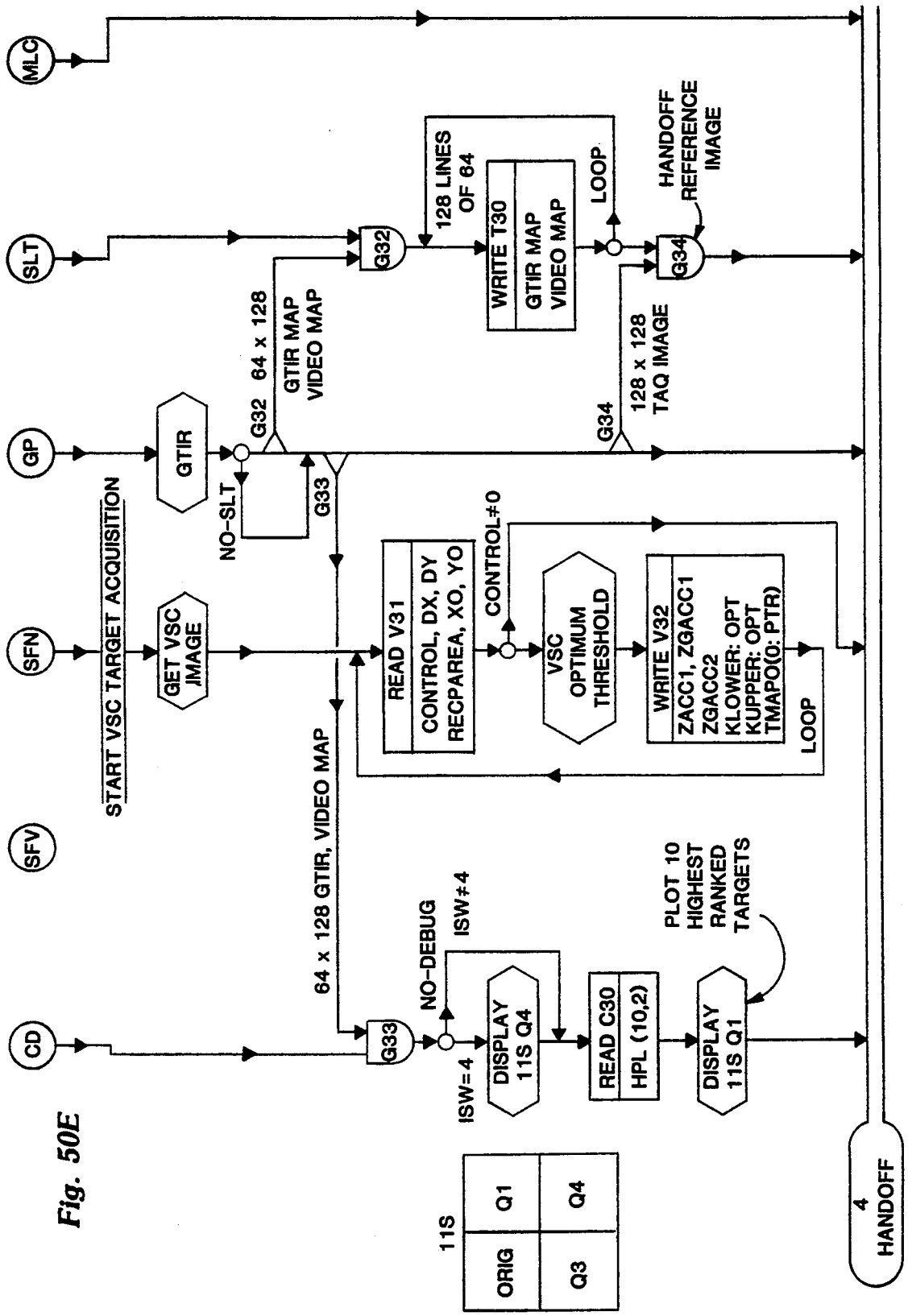
Figure 50F:
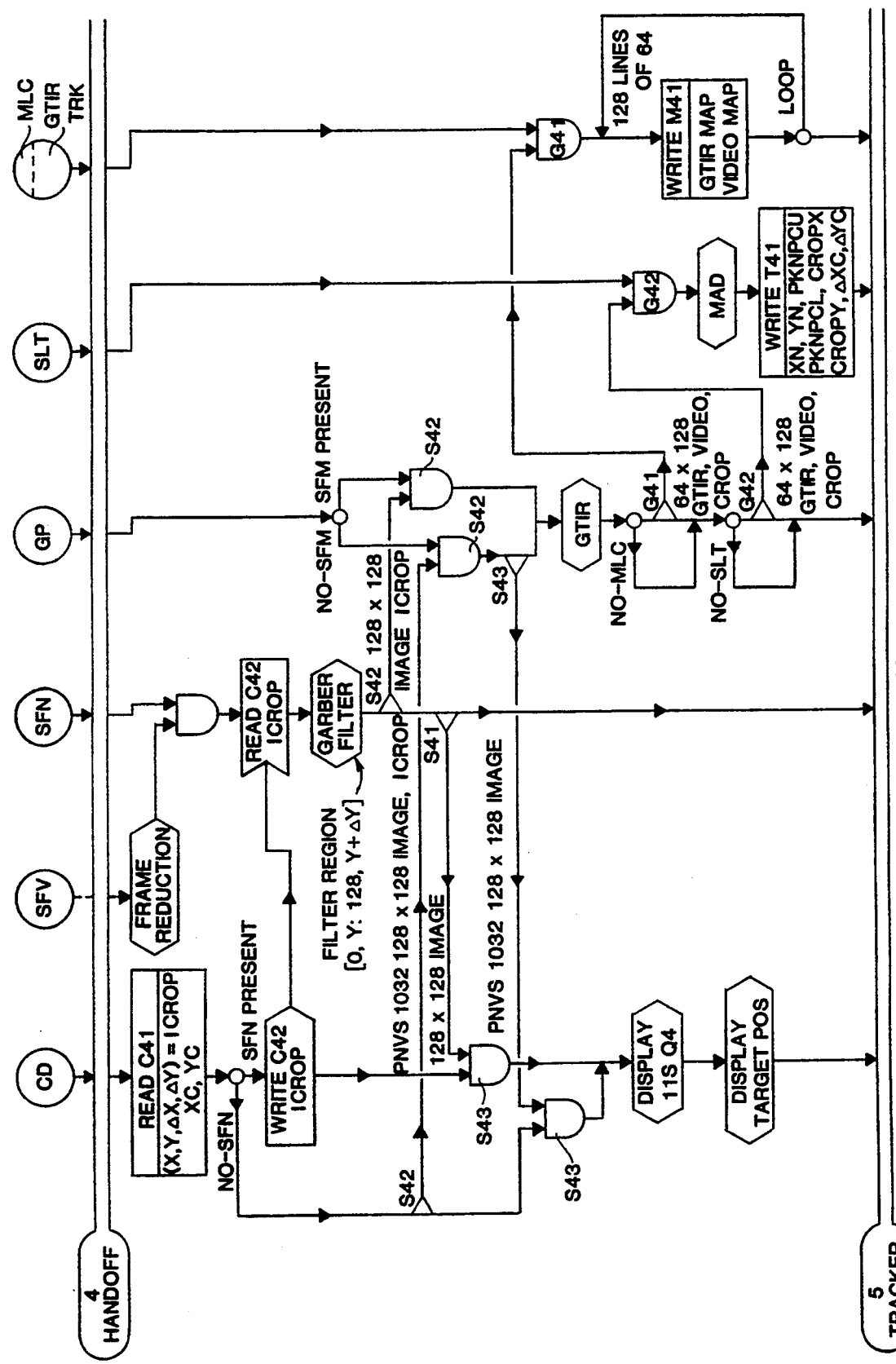
Figure 50G:
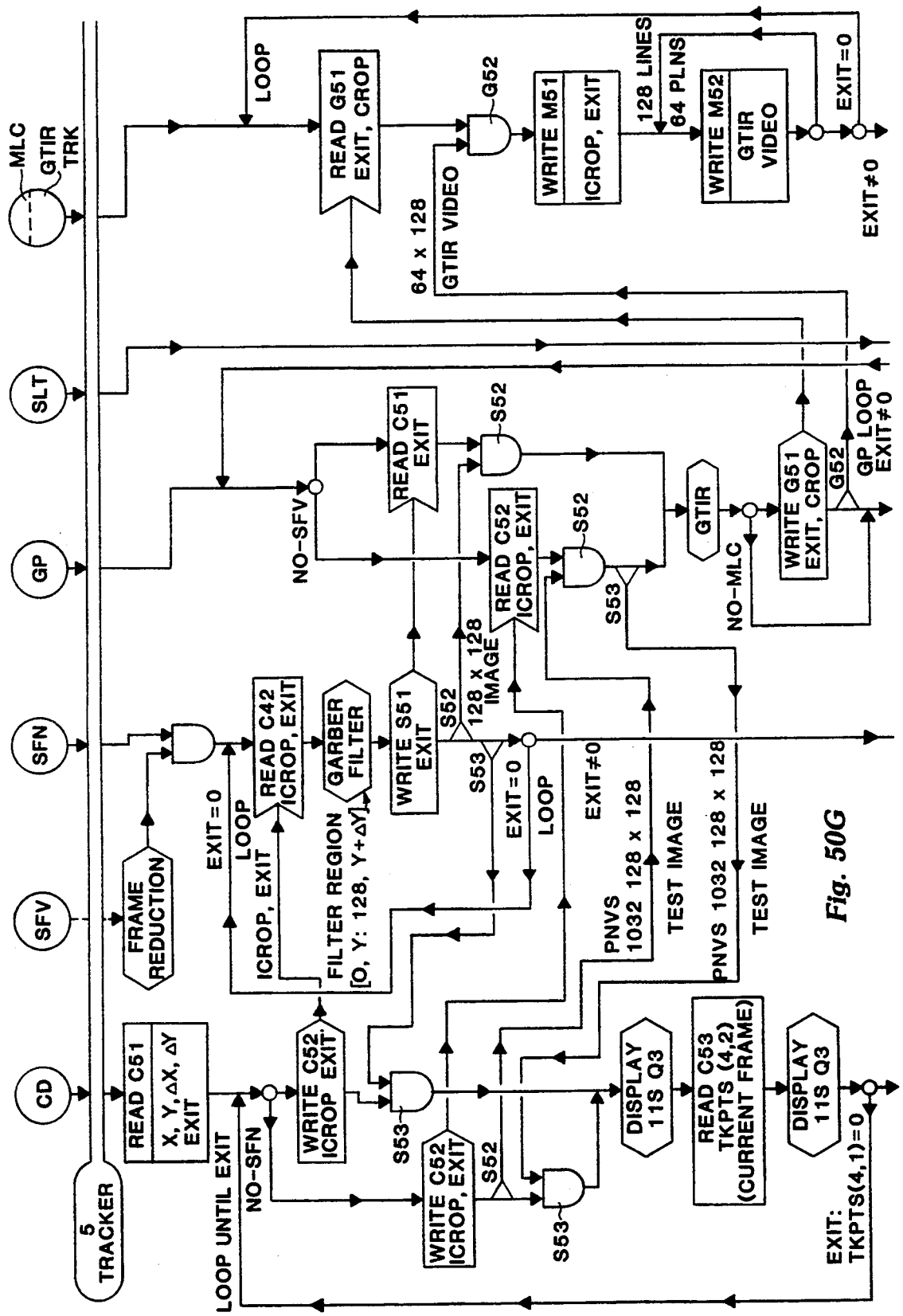
Figure 50H:
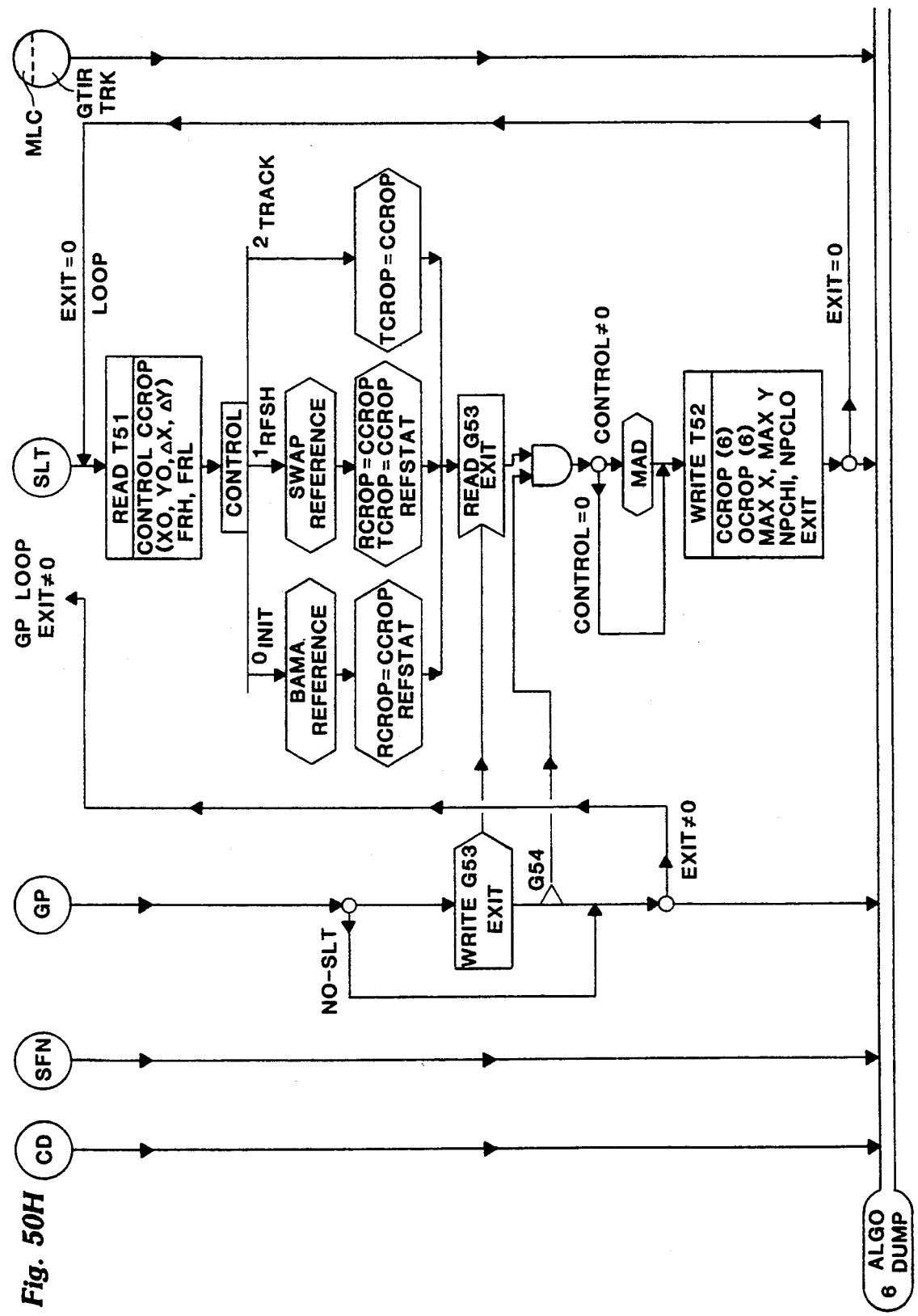
Figure 50I:
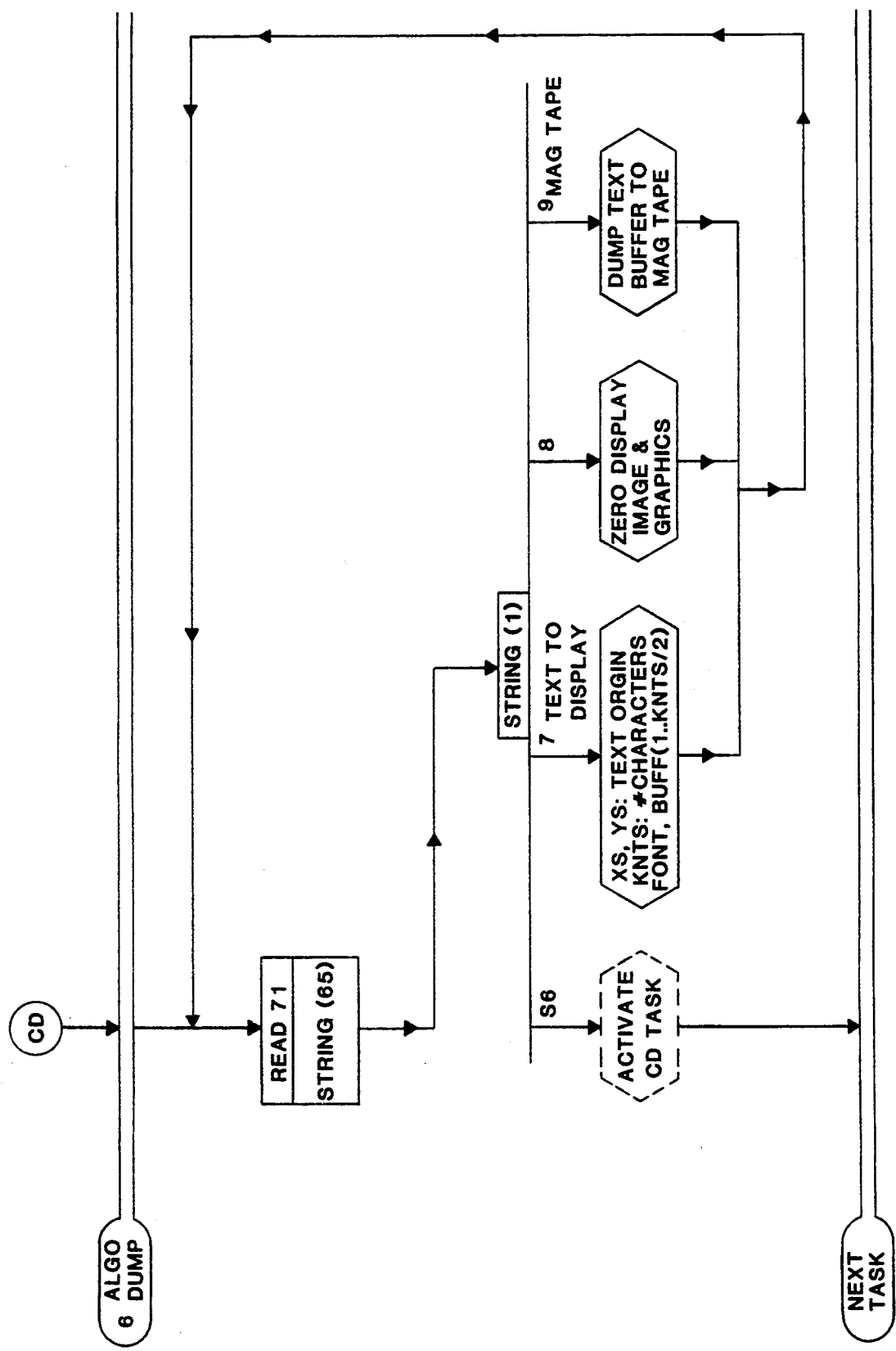

FIG. 49 illustrates the microword format used by the control and display processor of FIG. 39.

FIGS. 50A through 50I are the system data flow diagrams for the system of FIGS. 7–49.

An understanding of the algorithms processed by the system is helpful in analyzing the data flow diagrams. Therefore, a detailed explanation of the system from the functional standpoint of the system algorithms is given first, followed by an explanation of hardware usable for executing the procedure.

DETAILED DESCRIPTION OF THE PREFERRED EMBODIMENT

The present invention can be used in a weapon system designed for the top-down attack of vehicular targets by multiple submissiles but could be used for general identification of compact objects in imagery.

Figure 1A:
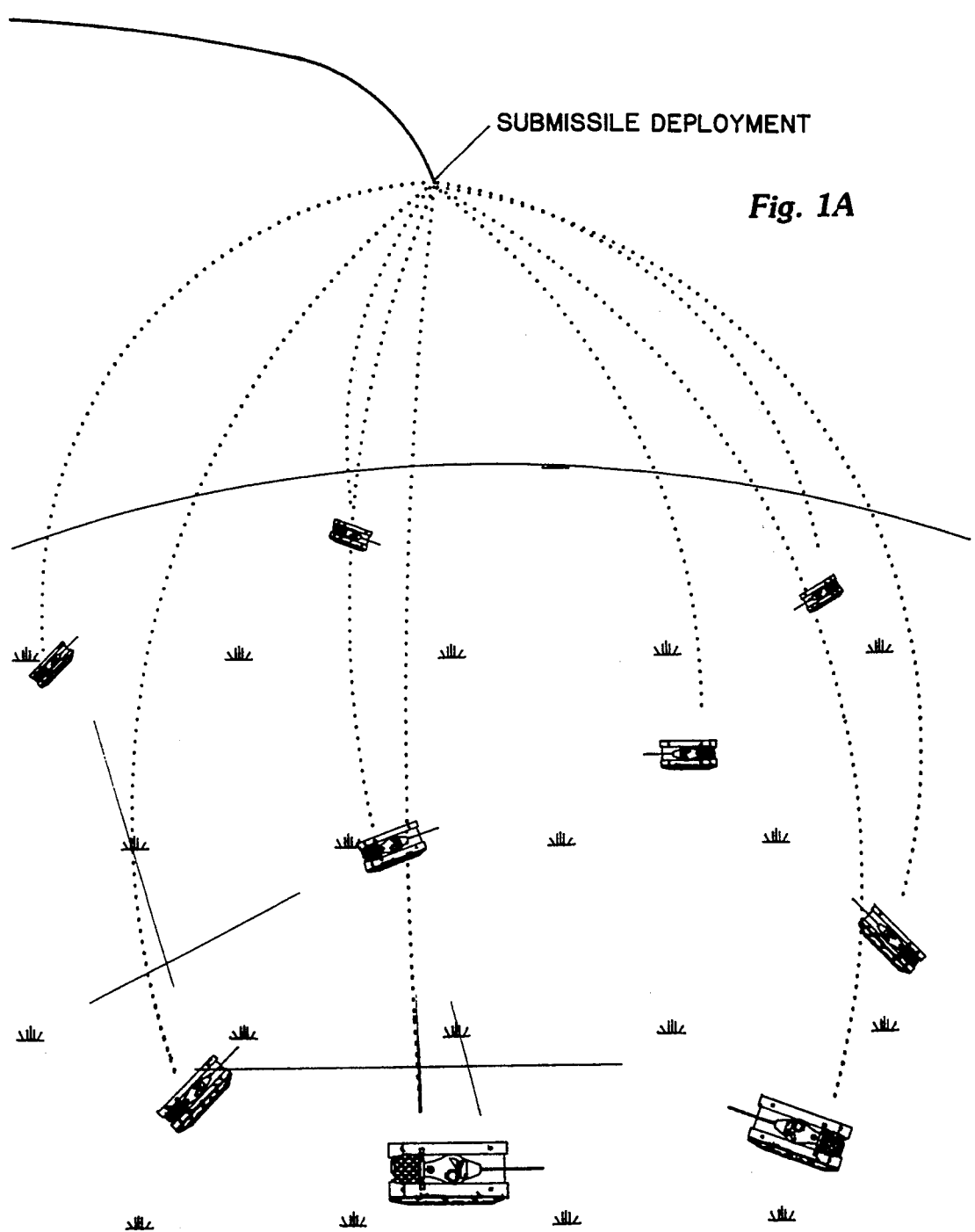
FIG. 1A illustrates the deployment of a plurality of submissiles over a target area.

In a preferred embodiment, a canister of submissiles is guided to an area in which target activity has been detected. The canister dispenses its submissiles over the area and each submissile autonomously detects and hits-to-kill a target within its field of view as illustrated in FIG. 1A.

Each submissile can include all or part of the sensor and target acquisition and tracker system of the present invention, hereinafter sometimes identified as "processor", which is a system of computing elements designed and programmed to solve autonomous target detection and tracking image processing problems encountered in plural munition smart bomb systems constructed in accordance with the present invention. The processor in each submissile acquires the ground, classifies all targets in the field of view, hands off the highest priority target to the tracker and selects the aimpoint on the target for optimum war head effectiveness while guiding the submissile to impact the target.

Figure 1B:
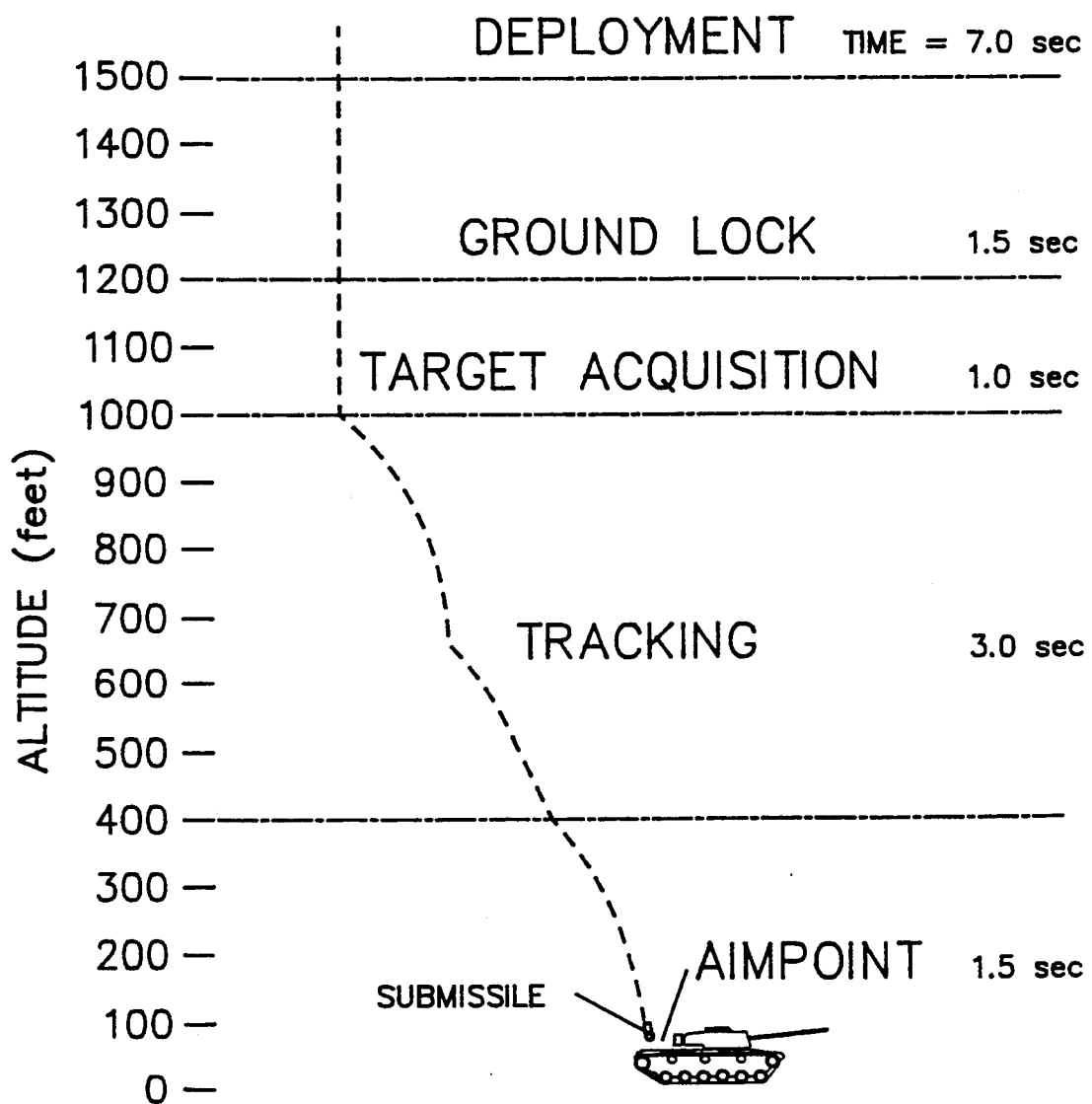
FIG. 1B illustrates the trajectory of a single submissile.

FIG. 1B depicts a representative path of a single submissile. At 1500 feet, the submissile penetrates the cloud ceiling and gains ground visibility. A ground-lock algorithm acquires the ground and then directs the submissile tracker to motion stabilize the imaging sensor for maximum image clarity. Altitude is estimated as a function of the radial divergence of the image and the submissile descent rate which is known a priori based upon the submissile's aerodynamic design.

The processor's target-acquisition mode is activated at 1200 feet. The field of view is scanned and all possible targets within the field are ranked according to their target probability. A top-ranked target is selected for tracking.

Tracker and aimpoint selection algorithms are used to guide the submissile to a particularly vulnerable spot on the target, ensuring a high probability of kill.

In the preferred embodiment, the look angle is constrained to within 20 degrees of the vertical, the descent rate of the submissile is known within 5 percent, and target size at acquisition time is about 12 pixels in length (plus or minus 10 percent).

Figure 8:
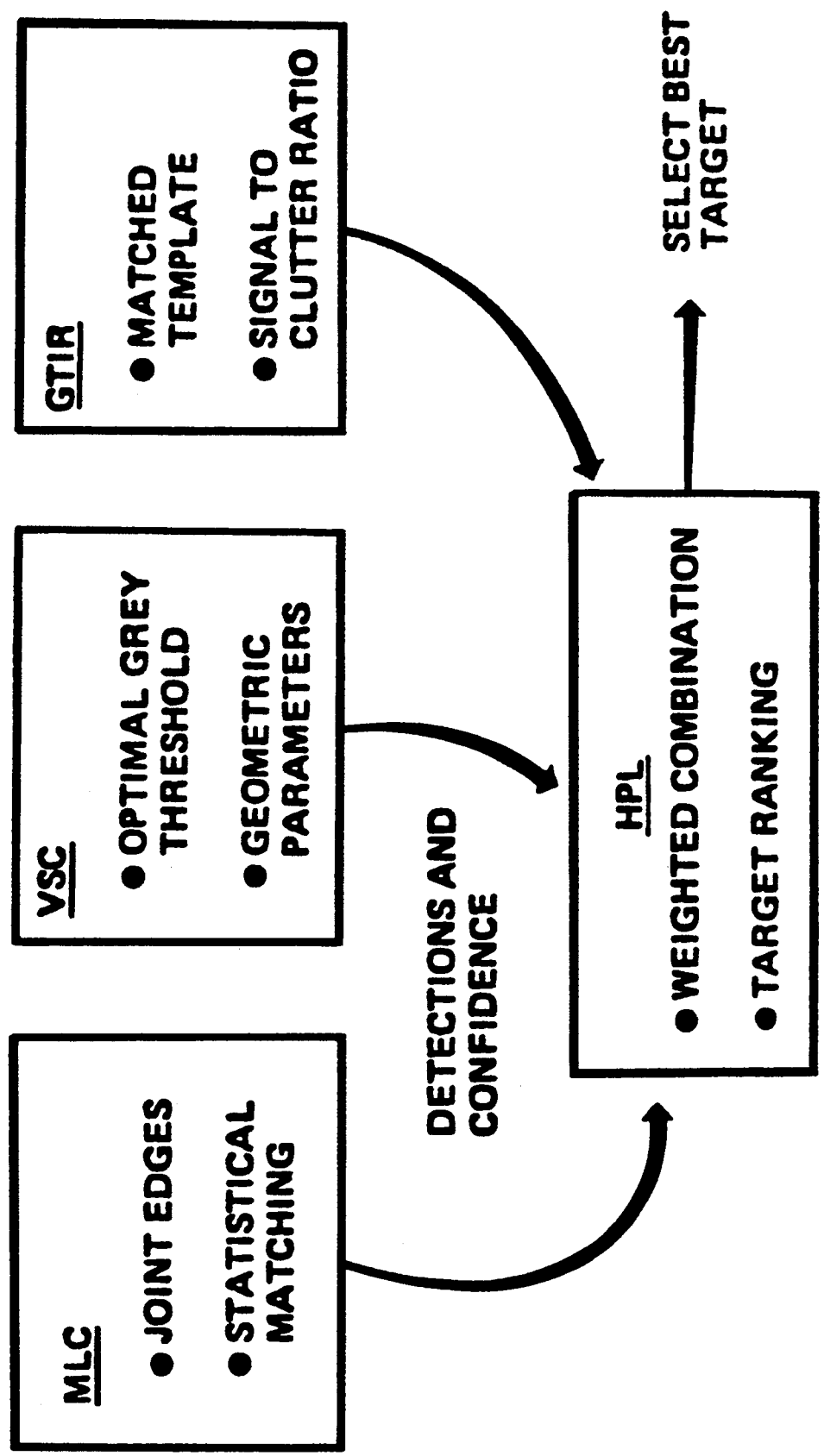
FIG. 8 is a block diagram of the target acquisition block diagram further illustrating the algorithms of the system of FIG. 7.

The target acquisition algorithms consist of a parallel set of three independent detection algorithms operating independently, asynchronously, and simultaneously to find potential target-like clusters, as shown in FIG. 8. Each algorithm views the image using a different set of characteristics as follows:

1) A Maximum Likelihood Classifier (MLC) algorithm utilizes joint edge events, in a statistical matching procedure to find targets.
2) A Target-to-Interference (GTIR) algorithm is a non-linear matched filter designed to find compact anomalous regions which are associated with targets.
3) A Video Spatial Clustering (VSC) algorithm examines target-sized regions according to grey-level statistics. An optimal threshold is computed and geometrical features computed and compared against those of known targets.
4) A Hierarchical Prioritization Logic (HPL) combines the output from the above three algorithms to form a composite measure of target probability. HPL also provides a confidence measure for each detection.

Figure 1C:
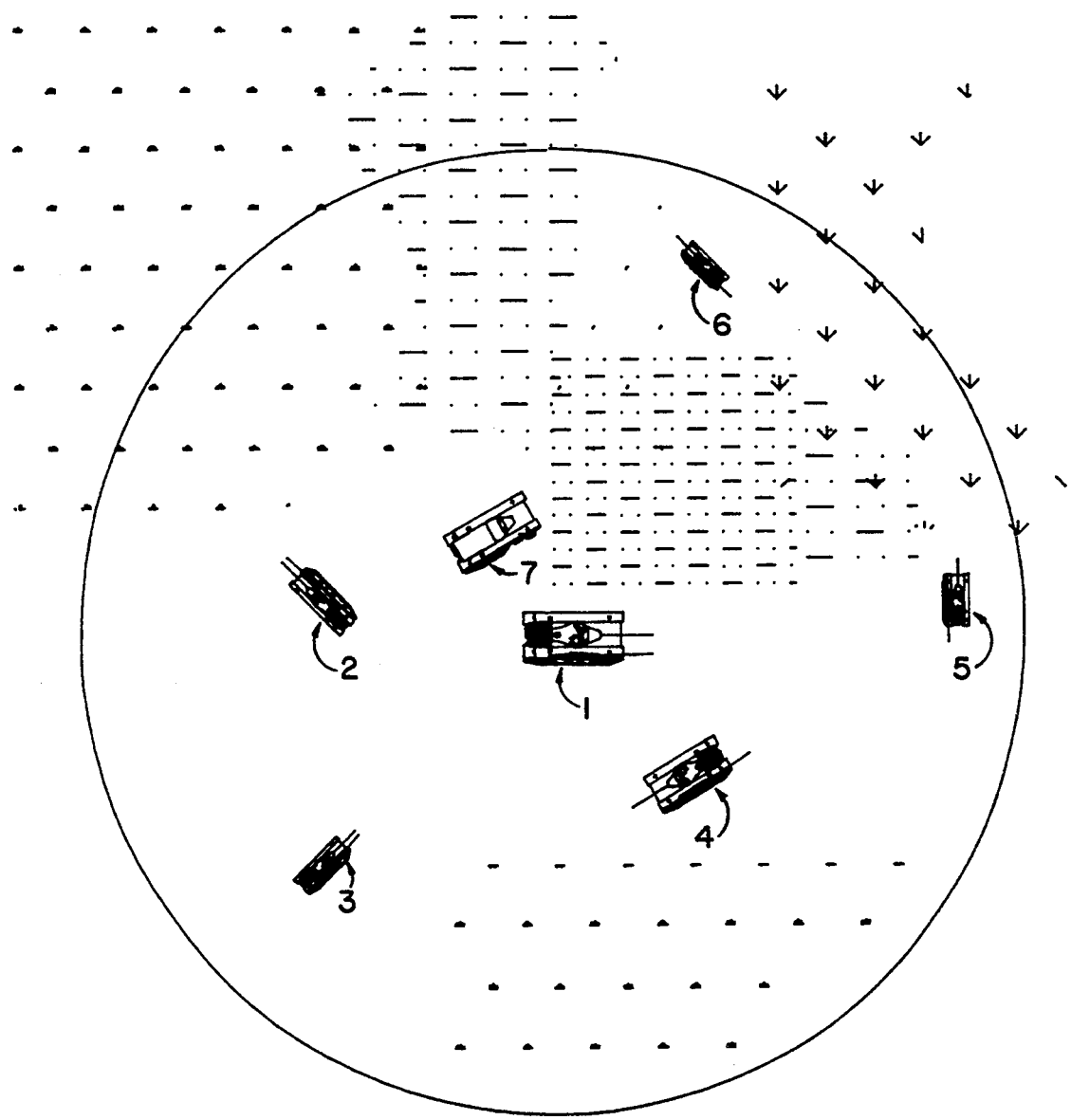
FIG. 1C illustrates the field of view of a submissile guidance system shortly after target acquisition.

FIG. 1C illustrates a typical field of view including random clutter. Seven target-like objects have been detected in the field of view, and ranked in priority from 1 to 7 according to their likeness to similar targets used in the training of the classifier. Each detected target has a "confidence of being a target" measure associated with it. Any target of sufficient confidence may be selected as the target to hand off to the tracker for ultimate aimpoint selection and guidance of the submissile to explosive impact.

The guidance system can be a strapdown seeker proportional navigation guidance system in which complex and potentially fragile inertially stabilized seeker components of conventional proportional navigation guidance systems using gyros have been replaced with strapdown electronic systems.

Figure 6:
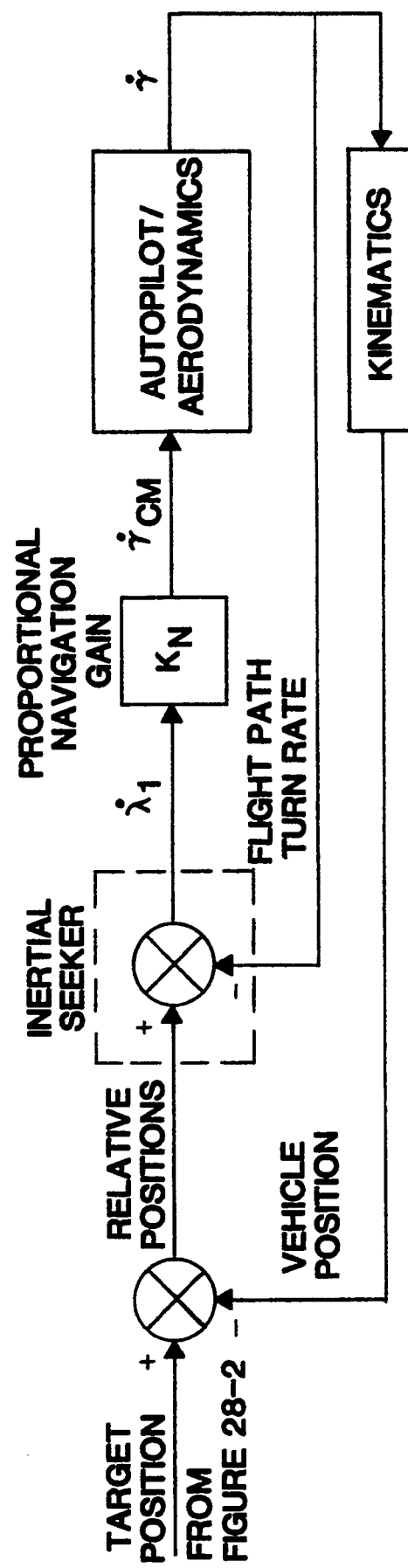
FIG. 6 is a simplified functional diagram of a classical inertial stabilized seeker proportional navigational guidance system.

One standard approach to strapdown proportional guidance use inertial gyros to estimate the vehicle attitude and linear detectors for the strapdown seeker is illustrated in FIG. 6.

However, in the preferred embodiment, any classical proportional navigation guidance system is employed.

The weapon is deployed in the vicinity of a moving or stationary target, and slowed to a terminal velocity of 250 feet per second by virtue of a drag device. On the basis of this known velocity, the seeker and image processor of this invention lock on to arbitrarily selected patches of the ground to measure roll rate and estimate altitude by measuring the apparent magnification of the image as the seeker approaches the ground at a known constant velocity. The weapon may be any guidance vehicle such as a center of gravity cruciform wing-controller vehicle with stabilizer tails. While attached to a drag device, the vehicle controls to zero roll and translation rate using separately actuatable wings. The ground lock algorithm generates negative feedback control signals. This roll control is maintained throughout the engagement. Once roll rate is zeroed, the seeker locates and begins to track to the most likely armor-type target in the field of view. At the onset of tracking (approximately 1,000 feet above ground level), the drag device is released and guidance begins.

The a priori nominal conditions, therefore, are:

| Speed: | 250 feet per second |
|---|---|
| Attitude: | 0° (vertical descent - both control axes) |
| Control: | 0° net - X and Y axes |
| Acceleration: | 1G less nominal aerodynamic drag |
| Aerodynamics: | Nominal |
| Kinematics: | Nominal |
| Max Control | ±15° - each axes |
| Max Footprint: | ~ ±500 feet each axes |
| Field of Regard | ±15° |
| Time to Impact | ~4 seconds |
| Guidance Stop: | 3.5 seconds after start (blind range of seeker at 100 feet above target) |

Figure 7:
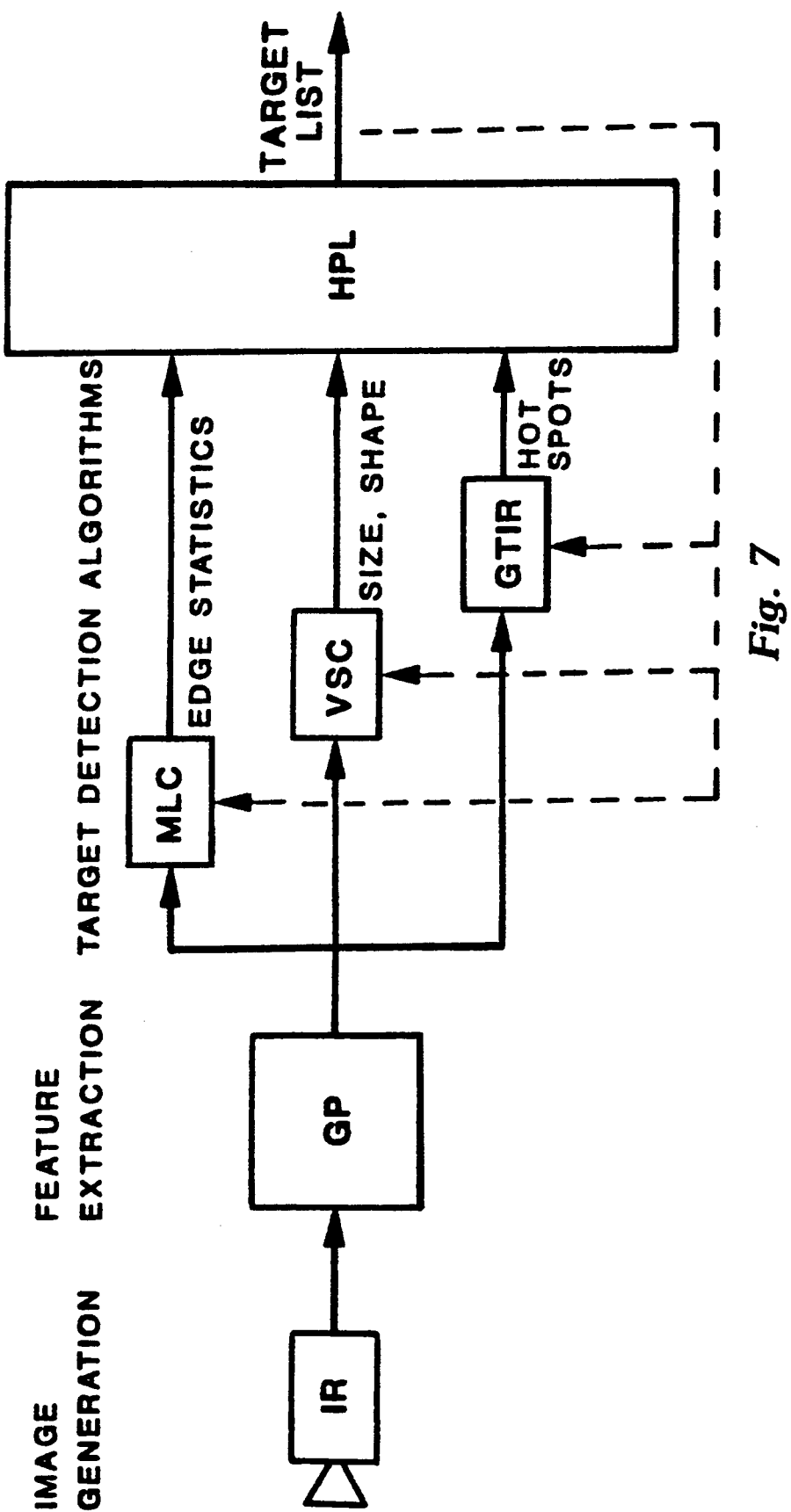
FIG. 7 is a functional block diagram of the target acquisition and tracking system of the present invention illustrating the target detection algorithms showing the information flow from the image input, through feature extraction algorithms, target detection algorithms, combining logic, to the generation of the target list.

The processor hardware is formed in a distributed, real-time computing net tailored to the processing requirements of the algorithms. FIG. 7 is an overall block diagram for the system. FIG. 29 is a block diagram of the hardware processor used to realize FIGS. 7, 8, 26, and 27.

IMAGE GENERATION

Data for the vision based algorithms is derived from infrared sensors. Therefore the target identification data consists of image quality infrared data from an overhead viewpoint but could as well be based on other spectral regions such as the human visible domain.

This is provided by a special data base of field data collected using a pilot's night vision system (PNVS) common module FLIR.

The raw data for the data base was digitized at a 17 MHz rate to accommodate the 875 line scan rate inherent in the FLIR sensor, producing a 512×384 pixel image. The image was filtered to remove streaking and reduced 3:1 in size by an averaging technique in both the horizontal and vertical dimensions, followed by subsampling to maximize the signal-to-noise ratio. The final image was cropped to a 128×128 pixel standard. The resultant data base has an image quality of 0.1 degrees MRT (mean resolvable temperature) and 50% pixel-to-pixel step response, restricting the infrared image to 140×140 pixels. In the preferred embodiment, the infrared sensor for the tactical sized autonomous munition is a staring focal plane array of 128×128 elements with an anticipated 0.05 to 0.10 MRT. The standard image is 128×128 pixels, with 8 bits per pixel.

The data base consists of images covering a wide range of scenario conditions. It includes tanks, trucks and jeeps, as seen in early morning and afternoon on sunny, overcast, and rainy days. The data base is ground truthed according to vehicle type and according to different types of background, e.g., buildings, trees, roads, clutter, tank tracks, cultivated fields, follow fields, etc.

GTIR

The Target-to-Interference Ratio Algorithm (GTIR) is an anomaly detector for locating compact hot and cold regions. The filter is decomposable into a cascade of one-dimensional convolutions, hence it is computationally efficient. The features used to discriminate targets from the background are contrast, GTIR output amplitude, and cluster size.

Figure 9:
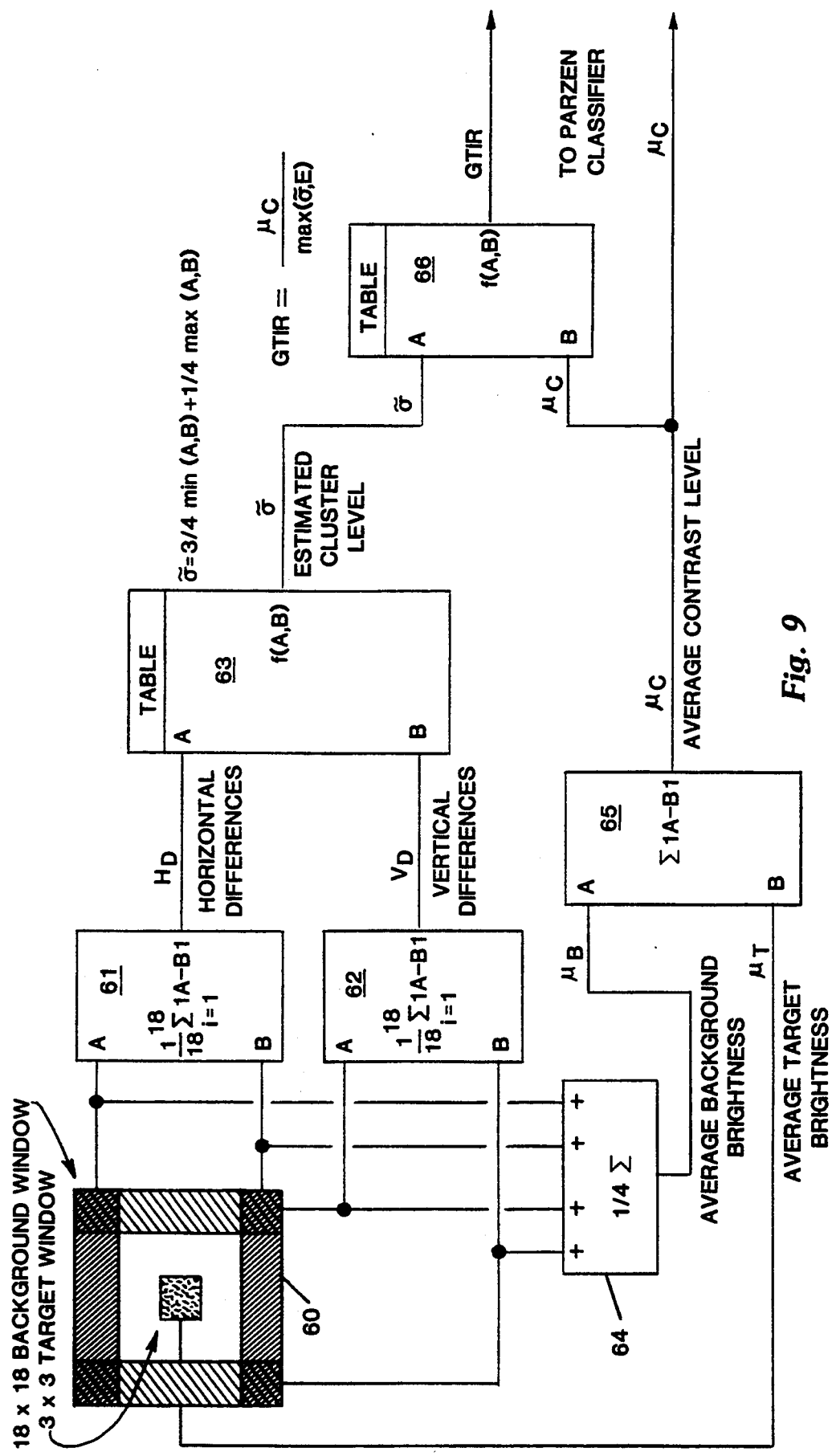
FIG. 9 is a block diagram illustrating the feature extraction process employed by the target-to-interference ratio algorithm (GTIR).

FIG. 9 illustrates the feature extraction process for the GTIR algorithm. This is a convolutional filter. Every point in the image is processed. An 18×18 pixel target-sized window 60 is selected for filtering. This window is large enough to completely contain a tank which is 12 pixels in length for any angle of rotation.

The grey level variation, in pixels for the border of the window is calculated from a horizontal component, $H_D$, and a vertical component, $V_D$. These components are obtained by summing the absolute values of the differences in intensities between corresponding pixels along the horizontal and vertical boundaries of the 18×18 window by summing means 61 and 62 respectively. A look-up table, 63, functionally combines the horizontal differences, $H_D$, and vertical differences, $V_D$, into an estimate of the grey level variation. The functional form for the combining is given by:

$$f(h_D, V_D) = \tfrac{1}{4}\mathrm{Min}(H_D, V_D) + \tfrac{3}{4}\mathrm{Max}(H_D, V_D) = \bar{\sigma}$$

This functional form was developed to help discriminate against adjacent clutter such as roads and trees. The estimated grey level variation is associated with the point at the center of the 18×18 window.

The mean of the window border points and the average of the 3×3 pixel region in the center of the 18×18 window is also required. The absolute value of their difference is a measure of the local contrast difference between the target and the background. Note that the center 3×3 region is small enough to encompass only target pixels, regardless of target orientation. It is mandatory that the statistics extracted by the background and target windows not come from mixed populations. Summing means 64 takes the average value of the outer box all the way around the target window to develop the average background brightness. The average target brightness of the 3×3 target window is subtracted from the average background brightness by the summation circuit 65. Its output is the average contrast level. The window sizes have been selected such that a tank target which is 12 pixels in length can be, if perfectly centered, contained inside the 18×18 overall region so that no portion of the target touches the outer 18×18 window and no portion of the background would be touched by the 3×3 inner window regardless of the orientation of the target. The output of 65 then, is the average contrast level which is applied to look-up table 66 along with the estimated clutter level from 63. A division operation shown as the formula just above table 66 is performed by table lookup to obtain the GTIR output.

The actual GTIR measure is obtained from look-up table 66. The local contrast difference is divided by the grey level variation of the background resulting in a Z-score statistical test. This operation is similar to applying an optimal least mean squared error matched filter for square objects.

Figure 10:
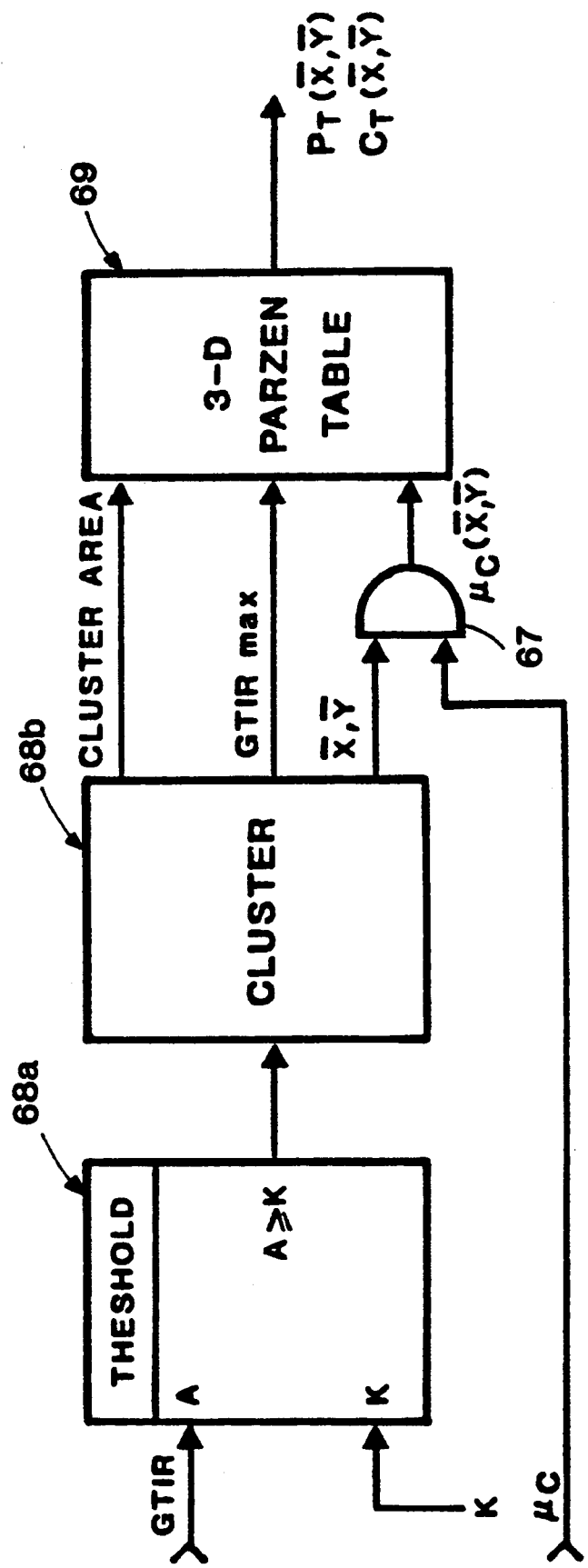
FIG. 10 is a block diagram illustrating the threshold or limiting feature of the GTIR system for eliminating targets with a poor signal-to-noise ratio.

Since the GTIR operation is applied convolutionally, small clusters of correlated GTIR values occur around target sized anomalies. In FIG. 10, the GTIR map is thresholded at 1.75 to eliminate poor signal to noise ratio responses and the remaining points are clustered. A feature vector for each compact cluster is formed consisting of: 1) cluster size, 2) maximum GTIR within the cluster, and 3) the local contrast difference at the centroid of the cluster. This feature vector indexes a 3-dimensional Parzen based classifier to produce an estimate of probability of target and confidence.

The results of the classification is passed to the Hierarchical Prioritization Logic (HPL) for combining with the estimates made by the other algorithms.

MLC

The Maximum Likelihood Classifier algorithm, (MLC), exploits edge connectivity information for recognition of targets under diverse thermal or environmental conditions. MLC utilizes a four-component feature vector to discriminate targets from clutter:

1) Major Straightness
2) Minor Straightness
3) Clockwise Curvature
4) Counter Clockwise Curvature.

At each pixel of the input IR image, the gradient intensity and the gradient (or edge) direction need to be known. The SOBEL operator was used to extract both gradient and edge information:

$$HG = \begin{bmatrix} 1 & 2 & 1 \\ 0 & 0 & 0 \\ -1 & -2 & -1 \end{bmatrix} \quad VG = \begin{bmatrix} -1 & 0 & 1 \\ -2 & 0 & 2 \\ -1 & 0 & 1 \end{bmatrix}$$

$$GRAD = SQRT(HG^2 + VG^2) \text{ Gradient Magnitude}$$
$$EM = QUANTIZE(ATAN2(HG, VG)) \text{ Edge Direction Map}$$

Where QUANTIZE labels the edge directions in a counterclockwise direction in increments of 22.5 degrees, as shown in FIG. 11.

The accuracy of the edge direction measurement depends heavily upon the local signal-to-noise ratio. It has been shown that for additive Gaussian noise, the contrast-to-noise ratio (CNR) must exceed 4 for a 95% confidence level in the measured edge direction being within 22.5 degrees of the true edge direction 95% of the time. Reference: "*Real Time Edge Detection in Noisy Imagery*", James Reis, et al, Proceeding of SPIE Conference on *Advances in Image Processing*, San Diego, August 1978. Thus edge direction measurements associated with weak gradient magnitudes are discarded, since they are clearly noise dominated and detrimental to decision making.

The preceding operators are applied to the entire 128×128 image. In addition to the edge map, a joint edge map is also required. The joint edge map provides first order connectivity and forms the basis for a powerful rotationally invariant set of recognition features. A joint edge map, JEM, is computed from the edge map, EM, by applying a 3×3 convolutional operator which uses the center pixel's edge direction to select a corresponding edge direction from those of neighboring pixels, thus forming an ordered pair of edge directions for each pixel in the 128×128 image.

Figure 12B:
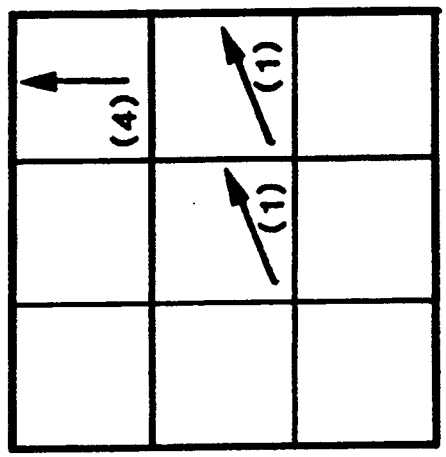
FIGS. 12A and 12B, illustrate the process of joint edge map generation used by MLC.
Figure 12A:
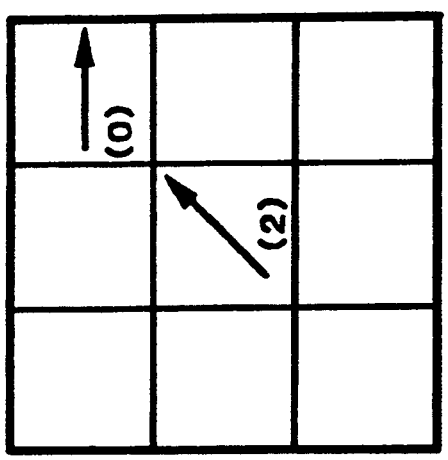

FIGS. 12A and 12B depicted the process. FIG. 12A shows the center pixel's edge direction pointing exactly to a neighboring pixel, resulting in that pixel's edge direction becoming the second component of the ordered pair. FIG. 12B shows the center pixel's edge direction pointing half way between two adjacent neighbors, which happens for each of the odd numbered edge directions. In these cases, the edge directions from both neighboring pixels are examined, and the one that is closest to the center pixel's edge direction is chosen as the second component of the ordered pair. The "average" edge direction is used for those cases where the "pointed-to" neighbors are equal distance from the center pixel's direction.

The original edge directions were quantized in 22.5 degree increments to reduce aliasing of joint edge directions for image objects oriented at such angles. For example, suppose a tank is oriented at a 22.5 degree angle relative to the horizontal axis of the sensor. If the edge directions are quantized in 45 degree increments, then the slightest noise is sufficient to cause the boundary pixel's edge direction to change from horizontal to diagonal, or vice versa. This would in turn cause the joint edge events to change randomly.

The resulting ordered pair of joint edge events are mapped into rotationally invariant features as shown in FIG. 13.

The straightness feature is divided into Perpendicular Straightness and Diagonal Straightness. This provides for accumulation of joint edge events corresponding to rectangular objects rotated at 45 degree intervals. The +C and −C curvature features are indicative of dark objects on lighter backgrounds and lighter objects on darker backgrounds, respectively. These types of slowly changing edge directions are frequently associated with man-made objects. The remaining joint edge possibilities, labeled Residuals, are associated with very rapid or discontinuous spatial changes in image intensity found in textured backgrounds. Hence, the basis vectors for MLC are particularly well suited for extracting locally connected contour information and they are easily interpreted in terms of image content.

Figure 14:
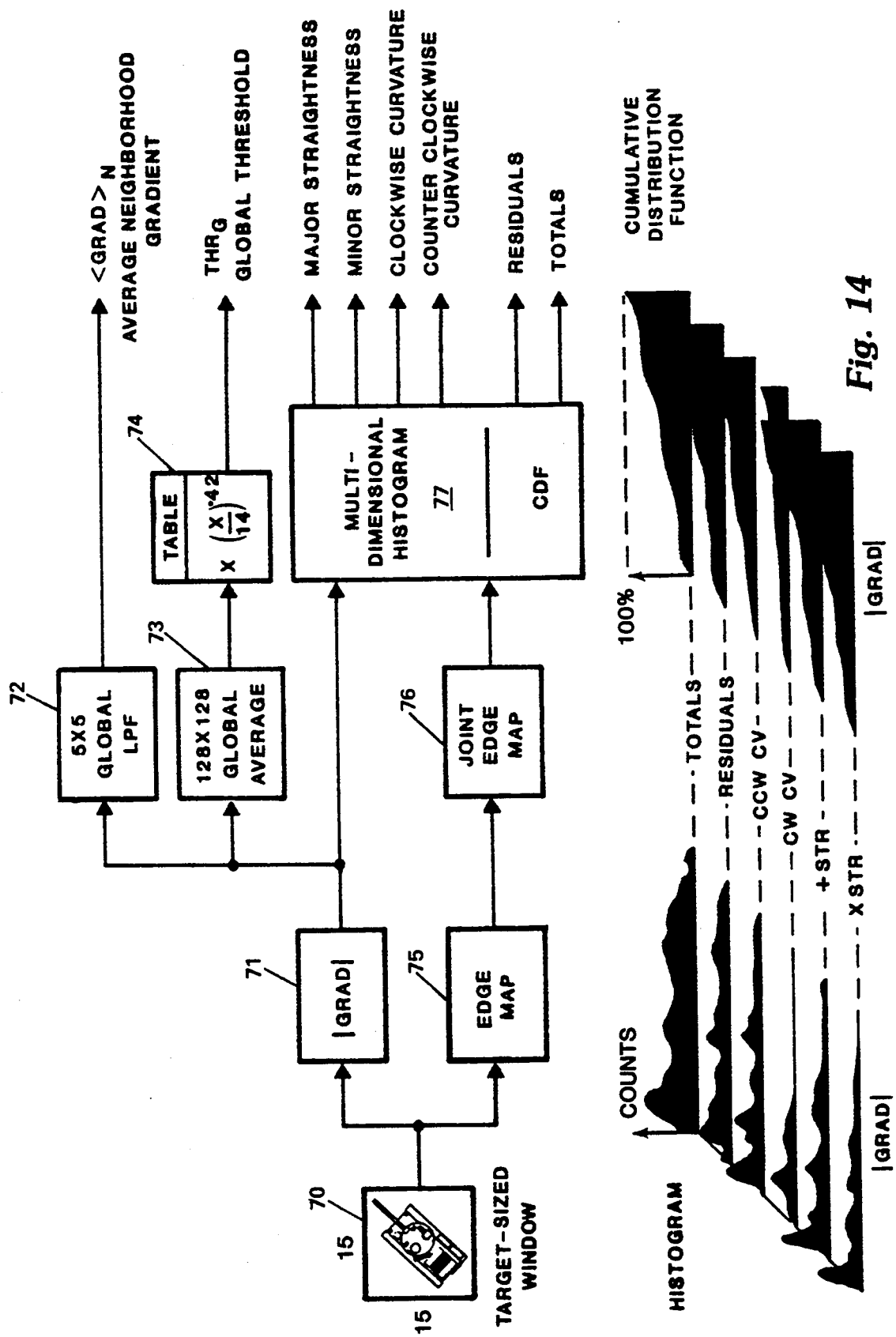
FIG. 14 is a block diagram illustrating the extraction of joint edge features by the maximum likelihood classifier used by MLC.

The extraction of the joint edge features used by MLC is illustrated in FIG. 14. A target sized window 70 of 15×15 pixels is convolutionally scanned across the image and the MLC target detection algorithm is applied to each pixel location. (The evaluation can be performed at every 5th horizontal and vertical pixel to reduce the computational load without exceeding the width of the MLC impulse response function.)

An average neighborhood gradient value is computed from the absolute values 71 by low pass filter 72 for each non-overlapping block of 5×5 pixels for use in the global-local adaptive threshold test. The average gradient value for the entire 128×128 image is also developed from the output of 71 by the global averager 73.

The average global gradient developed by 73 is used in look-up table 74 to compute the global threshold value. The coefficients 14 and 0.42 were determined experimentally.

Histograms of the Joint Edge Features for the current 15×15 pixel target sized window are computed from the edge map processor 75 and joint edge processor 76 as a function of gradient magnitude by the multi-dimensional histogram processor 77. Typically less than 50 events are available for computing the joint edge probability density functions (pdf's), thus the 8-bit gradient magnitude is reduced to 5-bits in dynamic range by division by 8. This scaling reduces the number of histogram bins from 0:255 to 0:31, reflecting the underlying precision of the pdf's being estimated. These histograms are integrated to produce cumulative distribution functions. At this stage, the total number of perpendicular and diagonal straightness events are compared. The type of straightness with the larger number of events is re-labeled as major straightness while the other is re-labeled as minor straightness. This reduces the signature variations with target orientation.

Figure 15:
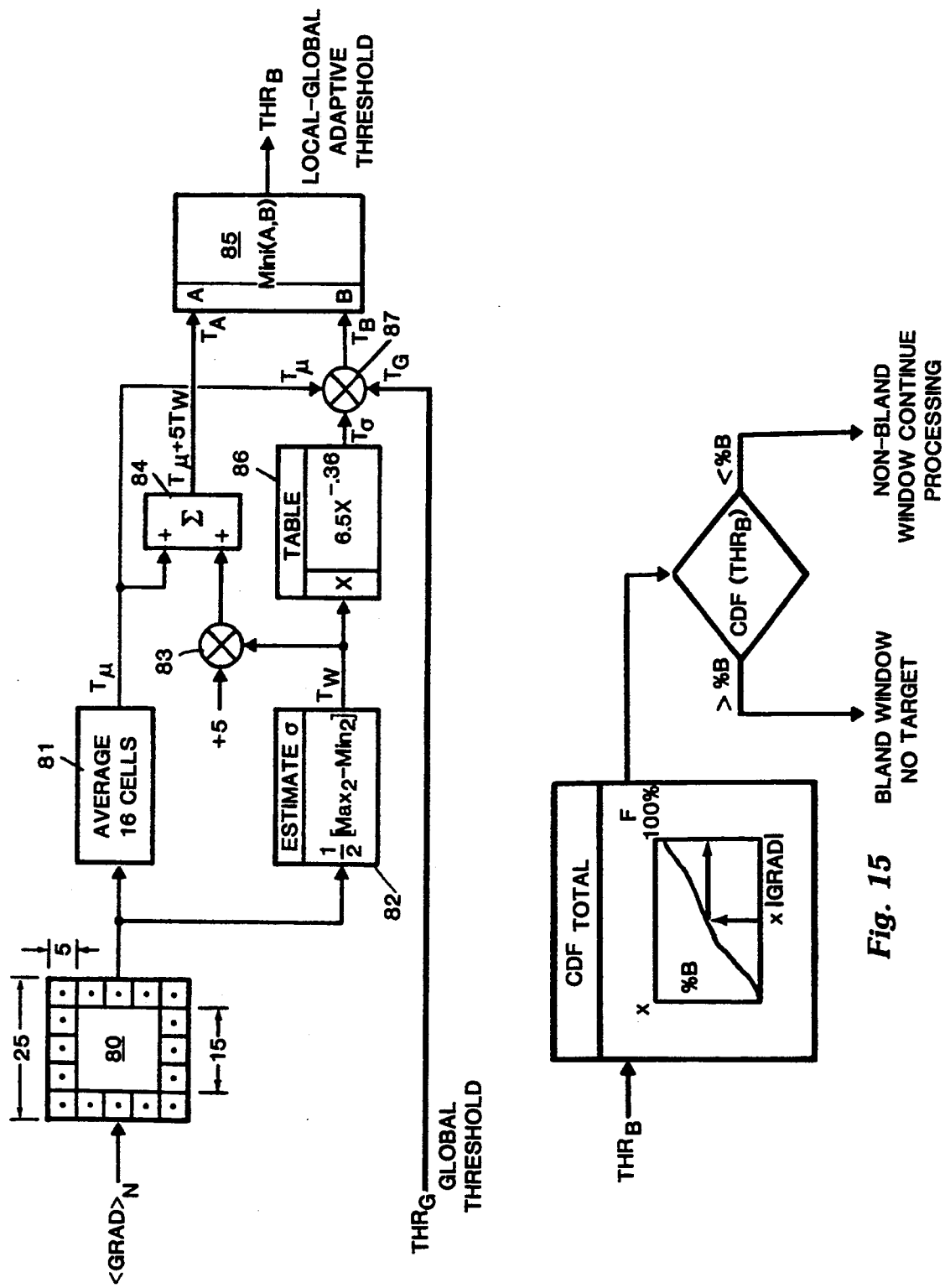
FIG. 15 is a block diagram which graphical illustrates computation of the local-global adaptive threshold used by MLC.

In the presence of high contrast interference, such as from a paved road, the target may not be the highest contrast feature. Therefore a thresholding algorithm that incorporates global as well as local adaptivity is used. It is called GLAD, Global-Local Adaptive thresholding algorithm. The GLAD threshold calculation is shown in FIG. 15. The output from the 25×25 rectangular low pass filter gradient window is sub-sampled and reduced to a square grid of cells containing 16 elements in the square arrangement 80. The average of these 16 cells is computed in averager 81. An estimate of the standard deviation of the 16 background cell components is performed by the method of order statistics in 82. This calculation is performed by taking the values contained in the 16 cells and ordering them in ascending order so that the 16 cells are arranged in increasing values. To estimate the standard deviation for the 16 numbers, the second lowest value is subtracted from the second highest value and the results divided in half, so we split the difference between the second highest and second lowest values from this set of 16 numbers. The estimated standard deviation is the output of 82. This value is multiplied by 5 by multiplier 83 to form a new value which is 5 times the standard deviation of the background. Thus fives times the standard deviation of the background window is added by 84 to the average of the background window from 81 and feed into a minimum value table 85. The output of the standard deviation estimate means 82 is also applied to look-up table 86. This table performs the functional calculation 6.5× raised to the −0.36 power to generate a mapped threshold value for the standard deviation. The map threshold value for the standard deviation is then multiplied times the average of the background and the global threshold value which was calculated in FIG. 15 by multiplier 87 to produce a threshold value which is an overall background threshold measurement.

The GLAD clutter removal threshold value is determined by MIN $[T_A, T_B]$. $T_B$, in turn, is the product of three factors, $T_B = T_G T_\mu T_\sigma$ = Background Threshold
$T_G = [\mu_G/14]^{0.42}$ = Global Component
where
$\mu_G$ = global average of gradient.
$T_\mu$ = average of 16 gradient values in neighborhood window.
$T_\sigma = 6.5\, T_w^{-0.36}$ = estimate of standard deviation,
where $T_w = 1/2\,[MAX_2 - MIN_2]$ = an order statistic estimate proportional to the standard of the 16 gradient values in the neighborhood of the MLC window.

$T_A = T_\mu + 5\, T_w$

For a target sized window of 15 by 15 pixels, the window is rejected as a region of interest if fewer than 12 pixels have gradient values that exceed MIN $[T_A, T_B]$. This result is insensitive to linear scaling in the original image.

The functional forms for $T_G$ and T were determined by noting the desired monotonicities among the parameters and then fitting actual measurements to candidate functional forms. $T_A$ was defined to serve as a reasonable limit on $T_B$, in the event that $T_w$ became too small.

Figure 16:
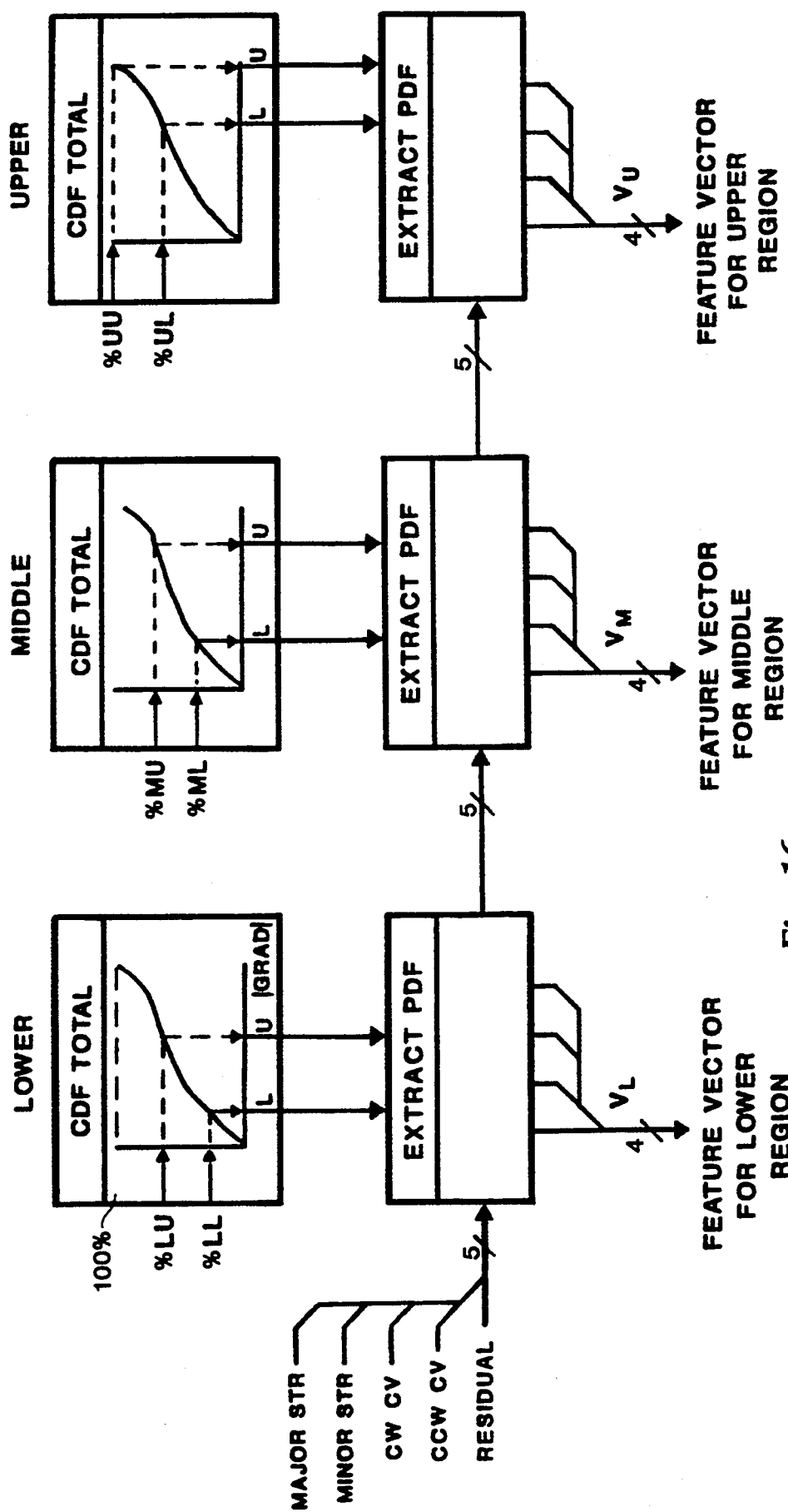
FIG. 16 illustrates the process of feature vector formation used by MLC.

Feature vectors are calculated for those windows which survive the GLAD thresholding algorithm. The gradient magnitude range is divided into three overlapping intervals, designated lower, middle, and upper. These intervals are defined in terms of percentiles on the total number of histogrammed events as shown in FIG. 16. Table 1 defines the intervals used by the real time processor. Multiple intervals are used to help detect targets adjacent to high contrast clutter or targets partially occluded by background clutter such as trees.

TABLE 1

| i | INTERVAL | LOWER % | UPPER %-TILES |
|---|----------|---------|---------------|
| 1 | LOWER    | 62 (LL) | 87 (LU)       |
| 2 | MIDDLE   | 75 (ML) | 99 (MU)       |
| 3 | UPPER    | 50 (UL) | 99 (LU)       |

Interval Definitions

The feature vectors are formed as follows.
Define the multi-dimensional CDF, F(g,k),
  F(g,k) = Cumulative Density Function for the kth Primitive
  k=1 Major Straightness (MAJ STR)
  k=2 Minor Straightness (MIN STR)
  k=3 Clockwise Curvature (CW CV)
  k=4 Counter Clockwise Curvature (CCW CV)
  k=5 Residuals
  k=6 All of the above
  5=Scaled Gradient Magnitude (0:3)
For each of the three intervals defined in Table 1,
  L(i)=Gradient Magnitude corresponding to the Lower Percentile for the ith interval
  U(i)=Gradient Magnitude corresponding to the Upper Percentile for the ith interval
The feature vectors are defined by
  V(j,i)=[F(U(i),j)−F(L(i),j)]/[[F(U(i),6)−F(L(i),6)]
  For j=1,2,3,4 (Primitives)
  And i=1,2,3 (Intervals)

The numerator of V(j,i) is the 'probability' of the jth primitive for the ith interval. The denominator is the total 'probability' for all primitives in the ith interval, which normalizes the sum of the components of the feature vector to unity.

Figure 17:
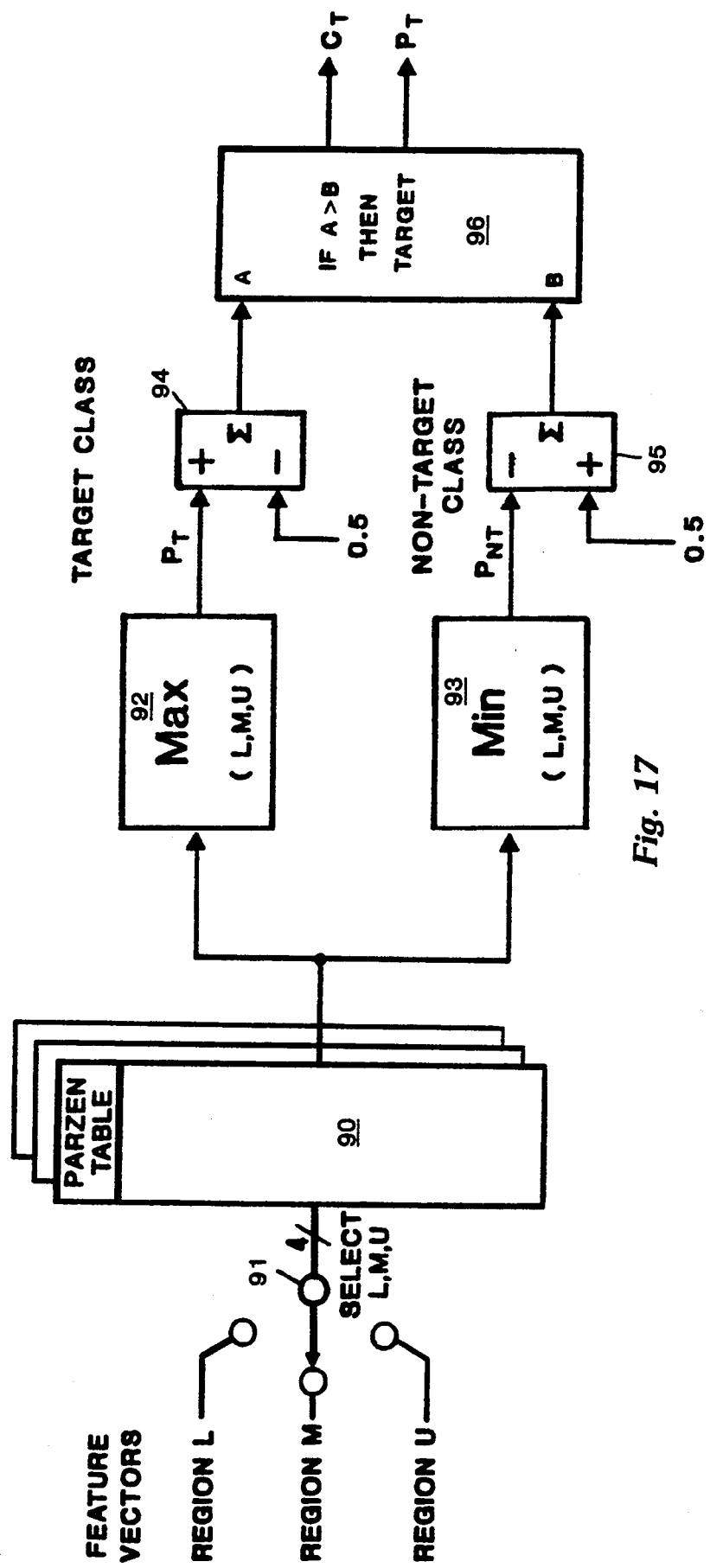
FIG. 17 is a block diagram illustrating the maximum likelihood target classification process.

The feature vectors for the three intervals are used to index a look-up table which contains the probability of target for every possible vector, as shown in FIG. 17. This table utilizes the Parzen density estimation technique to map feature vectors into probability of target, $P_T$.

FIG. 17 illustrates a three part Parzen table 90 which has been optimized for feature vectors coming from the lower regions, middle regions and upper regions. Its function is to map feature vectors into probability of target functions. Each of the different regions (L,M & U) have targets which are unique to those regions so the Parzen table is a function of which region the feature vector came from. Thus the Parzen table 90 can be considered as three tables with the active table selected by switch 91. Three probabilities of target function are generated by the Parzen table. One each for the lower, middle and upper regions. Comparators 92 and 93 determine the maximum and the corresponding minimum value of the probability of target functions for the three classes. The outputs of 92 and 93 are probabilities bound between 0 and 1. An output probability of 1.0 is absolutely a target and a probability of 0 is absolutely a non-target. A probability of 0.5 is exactly half-way in-between, it could be either a target or non-target. Classification decisions are made by subtracting 0.5 from the output of 92 by summing means 94 and subtracting to the output of 93 from 0.5 by summing means 95. The results are compared by selector 96. If the probability of being a target is greater than the probability of being a non-target, the target label is selected.

The maximum and minimum $P_T$ over the three intervals is compared against $P_T = 0.5$, with the largest deviate determining the class label (target or non-target) and the $P_T$ for the current window. Bland windows are assigned $P_T = 0.0$. Those windows which have a $P_T > 0.5$ are sent to the post processor for clustering.

Figure 18:
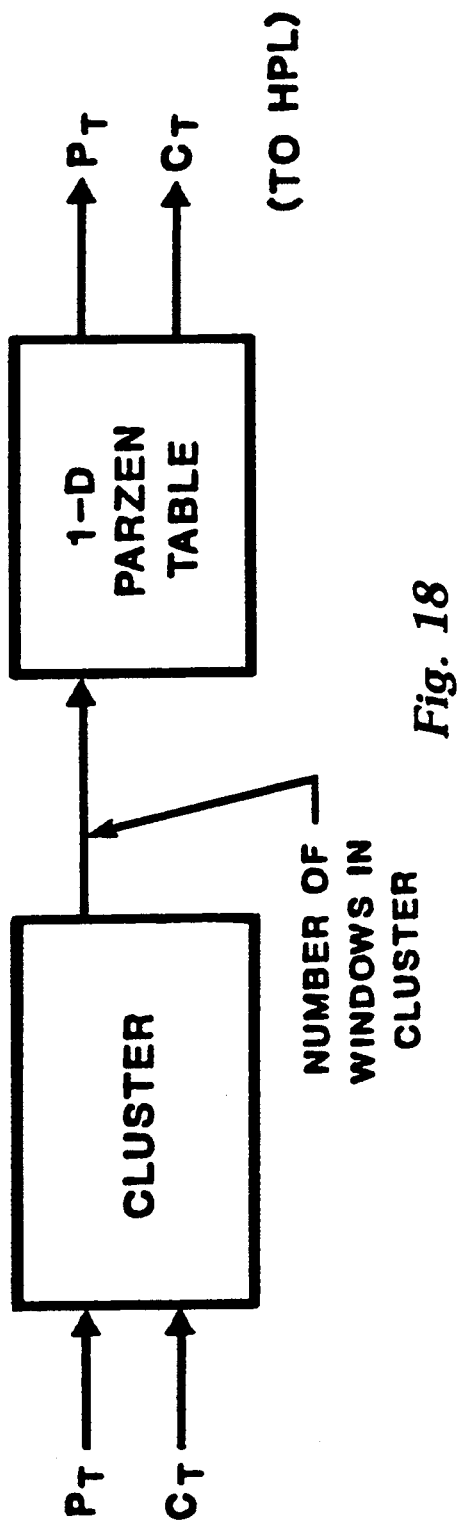
FIG. 18 is a block diagram of the post processor system for merging adjacent window detections to form a composite target/non-target decision for MLC.

Since several (overlapping) window positions may respond to the same target, a post processor is used to cluster these individual window level detections to form a cluster level detection, FIG. 18. The resulting cluster size is mapped via a Parzen table into the probability of target for the cluster, which is sent onto HPL for combining with similar detections made by the other acquisition algorithms.

The Video Spatial Clustering (VSC) algorithm exploits grey level information for the detection of targets. A four-component feature vector incorporates two global grey level components, one local grey level component, and one component corresponding to cluster size. The VSC algorithm is normally cued by one or both of the other acquisition algorithms since it is computationally slower.

Figure 19:
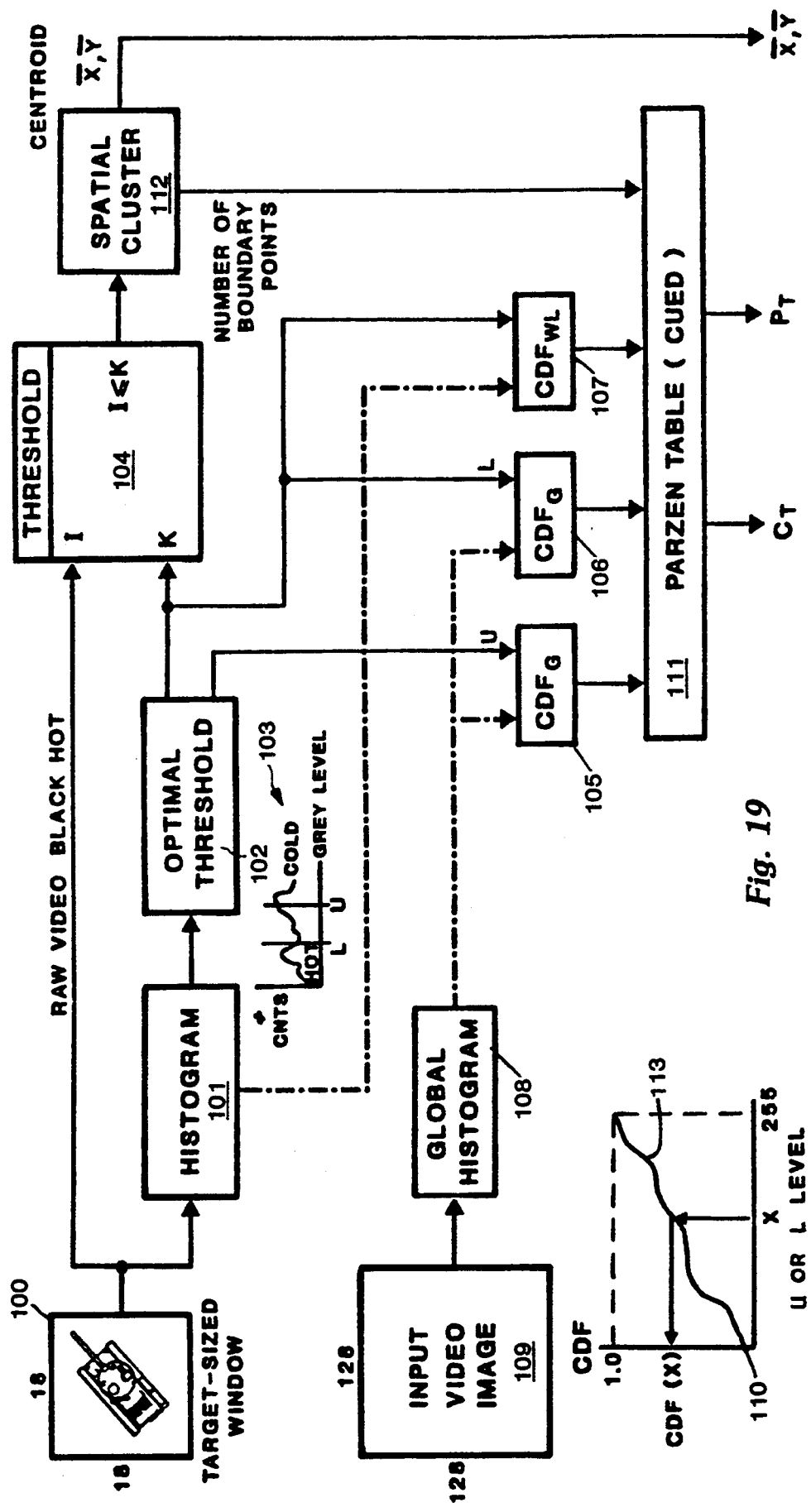
FIG. 19 is a block diagram depicting the video spatial clustering process.

Video Spatial Clustering is illustrated in FIG. 19. An 18 by 18 pixel target sized window 100 is histogrammed 101 in preparation for computing the optimal threshold 102 which is calculated as follows:

$T_{opt}(k_1,k_2) = (k_1,k_2)$ such that $\sigma_b^2$ is maximized
where
$\sigma_b^2$ = Between Class Variance = $w_0\mu_0^2 + w_1\mu_1^2 + w_2\mu_2^2 - \mu_T^2$
for
$0 \leq k_1 < k_2 \leq 255$ $$P_i = n_i/N \qquad \mu_T = \sum_{i=0}^{255}(i+1)p_i$$

-continued $n_i$ = number of histogrammed pixels of grey level 1
$N$ = total number of pixels in the histogram $$w_0 = \sum_{i=0}^{k1} p_i \qquad w_0\mu_0 = \sum_{i=0}^{k1} (i+1)p_i$$

$$w_1 = \sum_{i=k1+1}^{k2} p_i \qquad w_1\mu_1 = \sum_{i=k1+1}^{k2} (i+1)p_i$$

$$w_2 = \sum_{i=k2+1}^{255} p_i \qquad w_2\mu_2 = \sum_{i=k2+1}^{255} (i+1)p_i$$

The first two components of the feature vector are derived from the grey level percentiles from the global 128×128 pixel histogram for optimum threshold values $k_1$ and $k_2$.

The grey level percentile which corresponds to the optimum threshold value $k_1$ for the target sized window is the third component of the feature vector.

The target sized window is thresholded by value $k_1$ to isolate black-hot clusters. That cluster, if any, which contains the center point of the window is evaluated for size and centroid location. The number of boundary points in this cluster is the fourth component of the feature vector.

Probability of target is found by table look-up. The table was computed via the Parzen density estimation technique based upon a training set consisting of all target clusters detected by MLC or GTIR.

The 18×18 size target window 100 illustrated in FIG. 19 was chosen to make these algorithms perform well for the kinds of targets that are to be extracted. There is no need for commonality in target size windows between algorithms. A grey level histogram for the 18×18 target size window 100 is calculated by 101 of FIG. 19. The optimal thresholding algorithm 102 calculates two threshold values based on histogram characteristics which are labeled L and U in Graph 103. The images represent thermal data in this system so the low grey level values correspond to regions of the image which correspond to hot objects and the high valued grey levels correspond to cold regions (labeled in Graph 103). The output of the optimal thresholding algorithm 102 is applied to thresholder 104 and to inverse CDF tables 105, 106 and 107. Percentiles for these thresholding tables are in the form of a histogram related curve 113 as illustrated by graph 110. Histogram data from tables 105 and 106 are provided by Global Histogrammer 108 which processed the entire input video image 109 to yield an overall input picture histogram. Histogram data for table 107 is provided by the target window histogrammer 101. Thus the CDF tables 105 through 107 are percentile values between 0.0 and 100% representing histogram curves such as 113. The upper and lower values calculated by the optimal thresholding algorithm 102 have grey-level values between 0 and 255 and function as pointers in the CDF tables. As shown in Graph 110, the upper or lower value points to a spot on the curve 113 which is then interpreted as a percentile along the Y axis of the graph. This number, between 0 and 100%, is applied to the Parzen table 111. The same lower value that is applied to tables 106 and 107 is also applied to the thresholding stage 104 which provides a threshold output to spatial cluster 112 for all pixel values in the 18×18 window which are less than the intensity of the lower optimal threshold value that was calculated. The spatial cluster 112, as in MLC and GTIR, calculates a centroid. It also determines the number of boundary points that define the cluster. The four features, the centroid boundary point and the CDF values corresponding to the upper and lower thresholds for histogram percentile tables 105 through 107 are applied to the four feature dimension Parzen table 111 which generates the probability of target and confidence labels.

Since VSC is operated in a cued manner, for computational convenience, no post processor is required as each object is an isolated entity via spatial clustering and the probability of target is sent directly to HPL for incorporation into the final ranking.

HPL

The Hierarchical Prioritization Logic, HPL, combines individual algorithm directions into a single measure of target probability to determine composite target rankings for the image as a whole.

The HPL algorithm inputs the cluster-level target detection reports generated by the three independent acquisition algorithms. Since these individual reports are generated asynchronously with respect to each other, the combining of spatially correlated reports takes place in random order. As an aid in generating a composite target detection list as quickly as possible, the target acquisition algorithms are cueable by one another to areas of likely target activity, via HPL. When an algorithm locates a target-like object in the image, it reports it to HPL for in corporation into the composite rankings. Internally, HPL keeps an ordered doubly linked list of all target detections that have been reported by the detection algorithms. When an acquisition algorithm reports a detection to HPL, HPL generates a new composite position cue which is derived from all previous reports of the same detection by the other algorithms. When HPL cues a new algorithm to a detection by other algorithms, the algorithm being cued immediately processes that location. In the absence of a cue, the algorithm is free to choose for itself the next location to be processed. This (stochastic) method of joint mutual cueing enables the three acquisition algorithms to examine those regions of the image which are most target-like first. In this manner, the composite ranking list is built up as quickly as possible.

Figure 20:
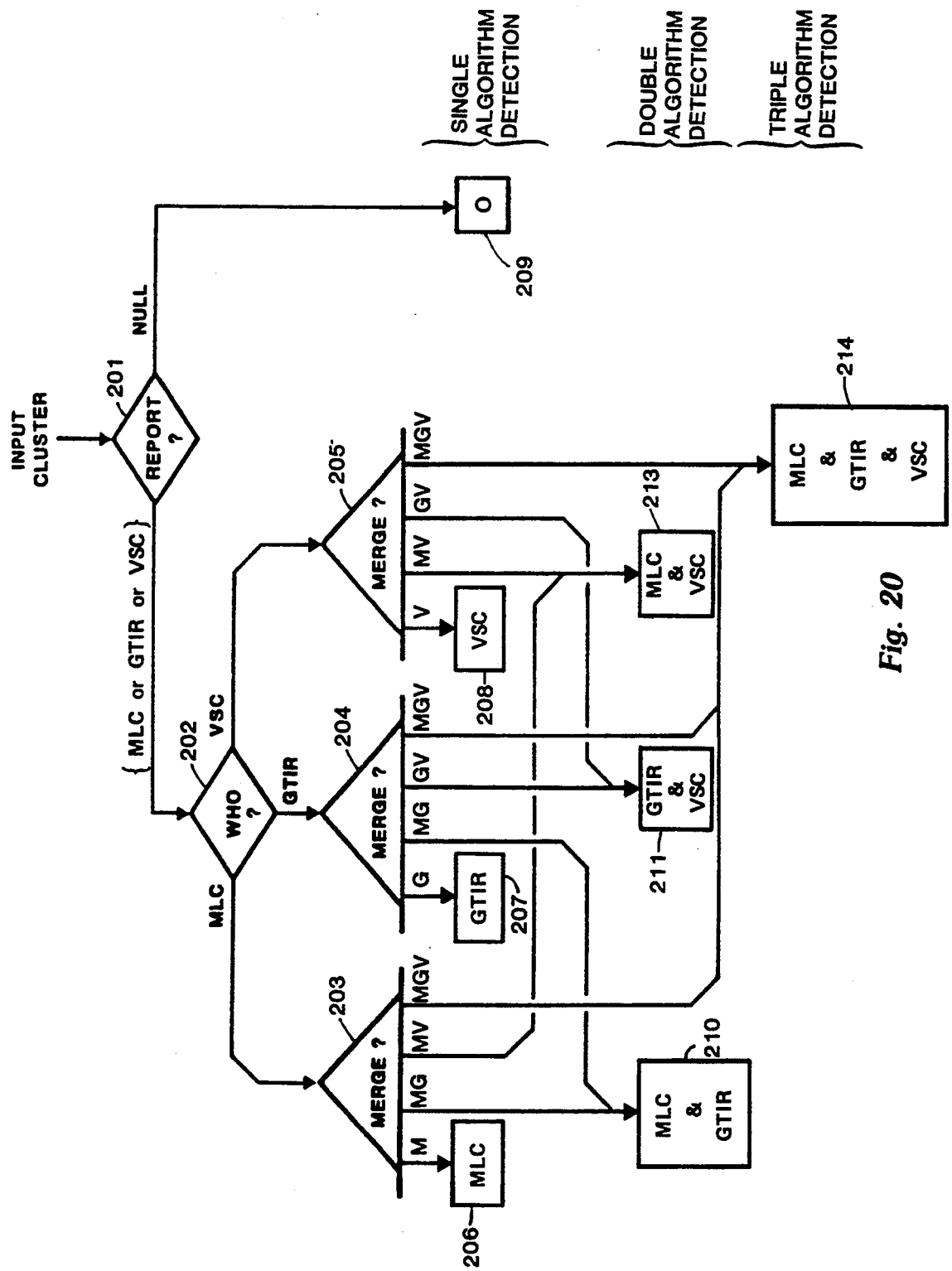
FIG. 20 illustrates the decision combining tree for hierarchical prioritization logic.

FIG. 20 illustrates the HPL combining methodology decision tree. When a new report is received, it is examined for its information content. Some reports contain null information where an algorithm could not or does not make a probability of target assessment. If the report comes from MLC, GTIR, or VSC, and is non-null, then it moves to the 'single algorithm detection' decision level. For example, if the report comes from MLC then an attempt is made to merge this new report with previous reports from other algorithms. If the new report cannot be merged (e.g., a new detection), then a one-dimensional MLC Parzen table is utilized to map the input cluster-level report into a global-level report. In similar fashion, those reports which can be merged with two or three other algorithms are mapped by a two or three-dimensional Parzen table, respectively.

Figure 21:
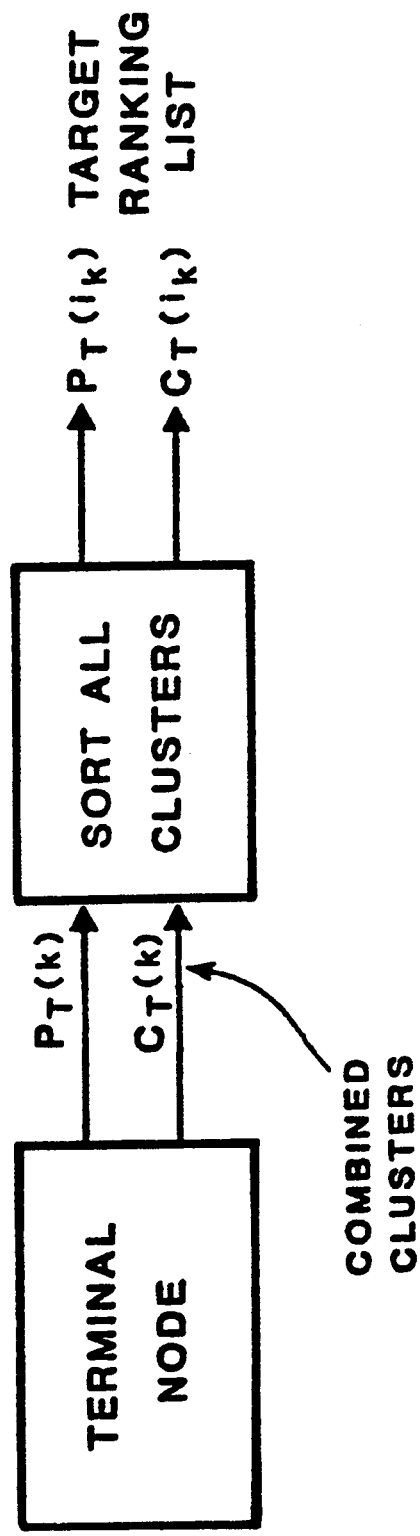
FIG. 21 is a block diagram illustrating the determination of final target rankings for HPL.

The rule for merging separate reports into a combined detection report is, if the centroids of the MLC and GTIR cluster are within 9 pixels of each other, then the two reports are merged together as a double-algorithm detection. The merged (output) centroid is the average of the input centroids. Cued VSC reports are handled in exactly the same manner. When all of the image has been examined, or when time has run out, the composite target probabilities at the terminal nodes are sorted in descending order to determine final rankings, as shown in FIG. 21.

Figure 22:
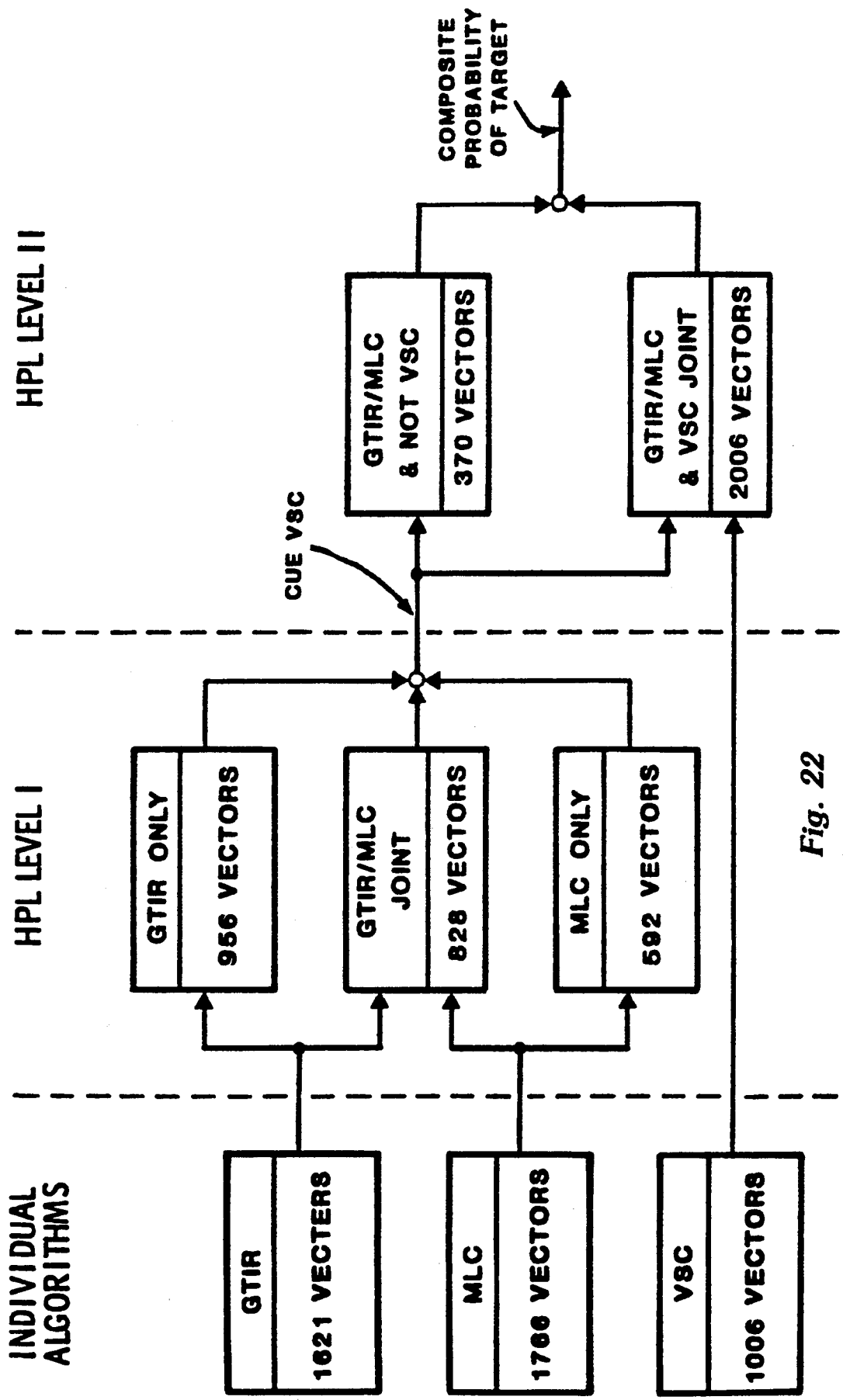
FIG. 22 illustrates the types and amounts of data used to train the various Parzen tables utilized in the real-time processor and illustrates a subset of the combining tree of FIG. 20.

The amount of data used to train the various Parzen tables used in the real time processor is shown in FIG. 22. In the preferred embodiment, 150 images were selected as representative of a scenario. Processing the images by GTIR produced 1621 feature vectors, MLC produced 1766 vectors, and VSC produced 1006 vectors. VSC is always operated in the cued mode. Therefore only those individual or joint locations found by MLC and GTIR were candidate training samples (2377 such locations were defined, of which 1006 survived the VSC clustering operation).

Since VSC is always cued, HPL is split into two levels in FIG. 22. HPL Level I generates cues for VSC combining where possible MLC and GTIR target detection reports. If VSC is successful in clustering the cued window, its report is combined by HPL Level II with the HPL Level I report to produce a composite probability of target. If VSC does not successfully cluster the cued window, then the HPL Level I report is combined with the fact that VSC failed through HPL Level II to produce a final composite probability of target.

There are three probability look up tables in HPL Level I which perform the combining of MLC and GTIR target reports. Two of these tables are for single algorithm detections, and one is for detections by both algorithms. For GTIR, of the 1621 input vectors derived from the training set, 956 vectors were not within the 9 pixel spatial limit for merging with MLC, hence, they were used to train the "GTIR ONLY" Parzen Table. Similarly, of the 1766 training vectors from MLC, 592 vectors could not be merged with GTIR, hence they were used to train the "MLC ONLY" Parzen Table. Therefore, from the available total of 3387 training vectors. 1548 correspond to single algorithm detections. The remaining 1839 training vectors are used to train the "GTIR/MLC JOINT" Parzen Table. Due to target mottling, it is very common for the individual acquisition algorithms to detect a single target more than once. These multiple detections were merged by HPL Level I resulting in a reduction of training vectors from 1839 to 828.

HPL Level II is trained with the output from HPL Level I. Of the 2376 HPL Level I training vectors, 2006 produced valid VSC target detection reports and were used to train the "GTIR/MLC & JOINT" Parzen Table. The remaining 370 vectors were used to train the "GTIR/MLC & NOT VSC" Parzen Table.

Figure 23:
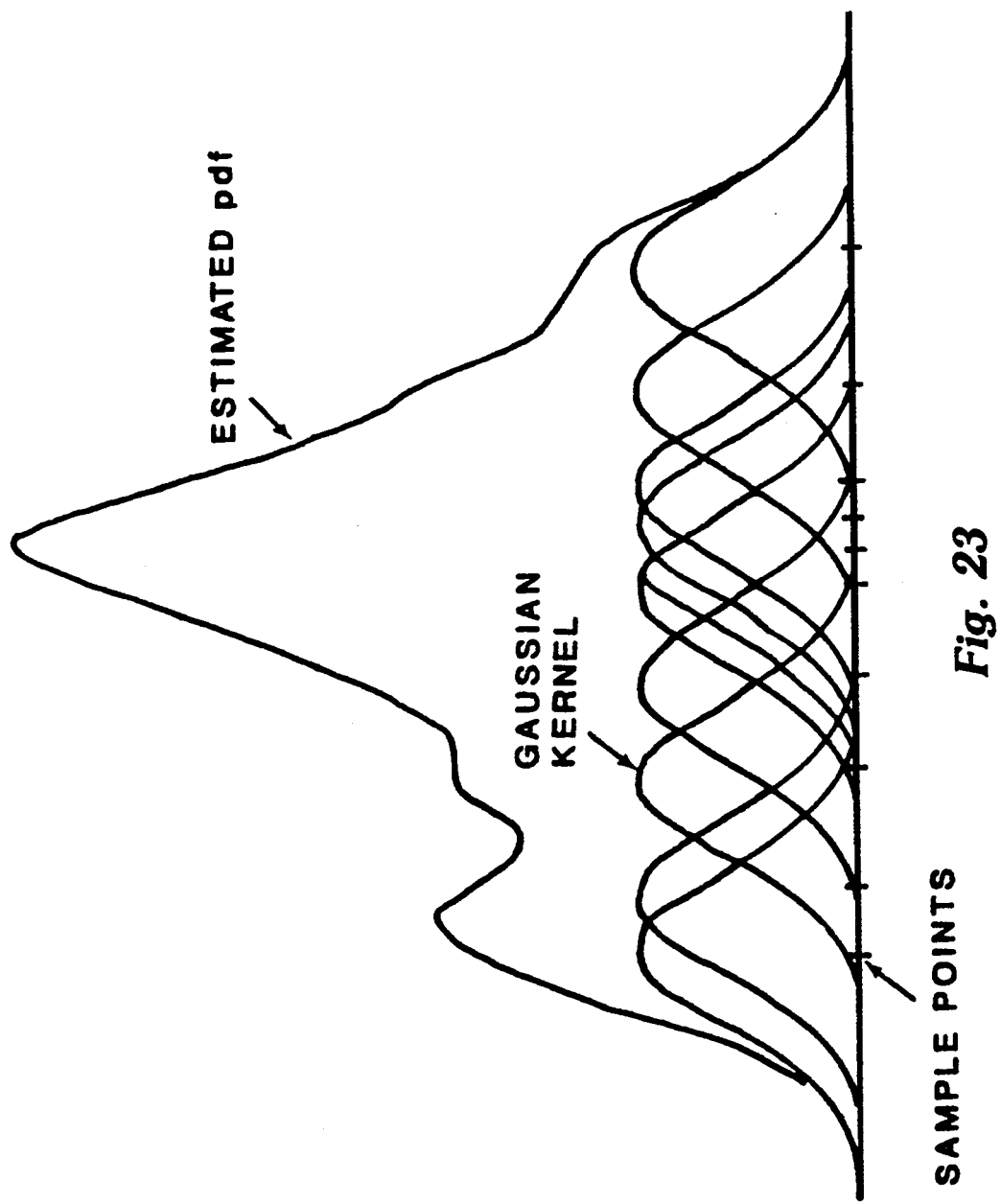
FIG. 23 is a one-dimensional example of the Parzen estimate of the probability density function for a single class.

The core of the target classification approach is based upon Parzen probability density estimation. This estimation technique is nonparametric, meaning for example, that parameters such as mean and covariance are not used in a functional form to describe an entire population. However, parametric functional forms are used in a spatially adaptive way to describe local structure. From a signal processing point of view, the Parzen technique consists of defining a variable kernel with unit volume in feature space and convolving this kernel over a data set. A one-dimensional example is depicted in FIG. 23.

The Parzen technique is essential for solving the difficult problem of estimating probability density functions (pdf's) for random variables obtained from evolutionary stochastic processes. Such processes are commonly encountered in real word data. For example, the variations of infrared signatures that occur with changes in time, range, and aspect are evolutionary stochastic processes. These variations cause corresponding variations in the features used for classification, as well as in the target probabilities output by the lower-level algorithms.

Gaussian kernels were used exclusively, although other kernels may be just as effective. The covariance matrix used to specify each multivariate gaussian kernel was determined by categorical partitioning of the data sets. For example, to estimate the pdf for clutter objects, clutter was heuristically categorized into five categories: trees, roads, buildings, cultural, and bland areas. The features (used for discriminating targets from clutter) were extracted from the image for each clutter object in a training data base. For each of the five categories of clutter objects, the inverse covariance matrix is computed and, thereby, a Gaussian kernel is defined. Now for any point X in feature space, the pdf for clutter objects, p(X C) is defined as shown below.

$$p(X|C) = \frac{1}{M} \sum_{i=1}^{M} \left( \frac{1}{(2\pi)^{n/2}} \frac{1}{h_{k(i)}^2 |\Phi_{k(i)}^{1/2}|} \exp\left[ \frac{-1}{2 h_{k(i)}^2} (X - Z_i)^T \Phi_{k(i)}^{-1} (X - Z_i) \right] \right),$$

where:
- X = the continuous random vector in feature space,
- C = the class of clutter objects,
- i = the ith sample of the clutter training set,
- $Z_i$ = the location of the ith sample in feature space,
- M = the number of samples in the training set of clutter objects,
- n = the dimensional try of feature space,
- k(i) = the categorical clutter subclass k to which sample i belongs,
- $\Phi_{k(i)}$ = the covariance matrix for subclass k,
- $h_{k(i)}$ = a free scaling parameter for the kth covariance matrix.

The pdf for targets p (X|T) is defined in an analogous manner.

The classification decision at any point X in feature space is based on Bayes' Test for Minimum Risk:

$$P(T) \, c(MD) \, p(X|T) \overset{\text{TARGET}}{\underset{\text{Clutter}}{\Sigma}} P(C) \, c(FA) \, p(X|C),$$

where P(T) and P(C) are the a priori probabilities of target and clutter, and c(MD) and c(FA) are the costs of missed detections and false alarms.

The probability of target at X is estimated by $$P(T|X) = \frac{P(T) \, p(X|T)}{P(T) \, p(X|T) + P(C) \, p(X|C)} \, .$$

The actual form of the decision variate that was used in the NATS/ASSP system is the cost-weighted probability of target Q(T|X):

$$Q(T|X) = \frac{P(T)\, c(MD)\, p(X|T)}{P(T)\, c(MD)\, p(X|T) + P(C)\, c(FA)\, p(X|C)}.$$

The way in which Q(T|X) is computed and used in the form of a classification look-up table is depicted in FIGS. 24 and 25. Fourteen classification tables are used in various parts of the system.

DUAL-MODE TRACKER

Referring now generally to FIGS. 26–28, a multiple independent hierarchical tracking algorithm is included. The same concepts that are so effective in the target acquisition algorithms are incorporated in this novel approach to target tracking.

When the tracking mode is initiated, a high priority target template is generated and a target window is centered on the selected target.

Multi-mode tracking uses more than one tracking point of view to maintain track on the target as the target signature changes from one instant in time to the next. More than one mode of view for tracking objects is necessary to increase reliability because a single technique has a particular weakness. In the prior art, if a target tracker losses its lock on the target, reacquisition is difficult. However, by having more than one tracker working simultaneously, it's easy to reacquire the target with the alternate tracker should one lose its lock on.

Referring to FIGS. 26 and 27, the dual mode system uses two kinds of trackers to provide two points of view, Minimum Absolute Difference Correlation Tracker (MAD) and a Centroid Tracker. The centroid tracker is the preferred and most accurate method but both trackers monitor the point in the input image that contains the target. Each one monitors the target from its own particular points of view, trying to keep it a consistent notion of the location of the center of the target. As the target moves into different kinds of background clutter, these various techniques may occasionally lose target lock. When this happens, an output selector on the dual mode tracker which monitors the quality of the track from either the centroid tracker or the MAD correlation tracker selects one or the other to generate the track point which is used in a feedback system to the vehicle control surfaces to recenter the vehicle so that it remains on a collision path with the target.

MAD

Operation of the Minimum Absolute Difference (MAD) correlation tracker is now described. A target sized window containing the target and some of the background area is used as a template against which the next frame of real-time imagery is then compared. This real-time image is the sensed image and the template is the reference image. In the MAD tracker, the real-time or sensed image is moving as a function of time, either the object moves or the platform moves or both move. In any event the tracked target is usually not in the same place in terms of sensor coordinates from where it was when the reference image was created. In the Minimum Absolute Correlation technique, the template is scanned over the sensed image, subtracting point from point the pixels in the reference image from the sensed image and summing these absolute differences for a given search area that is known to contain the uncertainty in the target location. The comparison determines where the reference image deviates the least from the sensed image.

If the reference image template exactly matches the sensed image, the minimum difference is 0 everywhere. If there are differences, such as the template is not perfectly centered over the target, the template is subtracted from the sensed image to produce a value other than 0. Zero is the ideal measure which the tracker seeks. Convolving the template over the uncertainty area of the sensed image and computing the sums of the absolute differences on a point for point basis creates a MAD picture that indicates the relative movement of the target. When the minimum absolute difference over the given area becomes greater than some arbitrary value (threshold value), the template must be updated with a new sensed image. Whenever the minimum absolute difference exceeds some threshold, then the last best sensed image is used to update the template.

CENTROID TRACKER

In the centroid tracker a threshold operation similar to the optimal threshold technique of the Video Spatial Cluster algorithm is employed. That is, once a threshold has been calculated, the video image inside the target window is thresholded and clustered in the same way as in the VSC operation. In the tracker mode, the centroid components are calculated from the centroid of the thresholded object. They accurately point to objects that are well within the target, as long as the mottling of the target doesn't change too dramatically. The centroid acts in the same feedback path to the auto pilot to change the pointing of the system. This closed loop operation keeps the track point inside the centroid of the object which is in the field of view. Updates are done frequently enough so the target never disappears. As long as the centroid is inside the cluster, then there is never a possibility of losing lock or walking off the target, as is possible in the MAD tracker. The weakness in the centroid tracker is that for every instance in the circulation around the tracking loop, there must be a valid centroid calculated. If there is not a valid centroid calculated, then track is instantly lost.

As long as the centroid tracker is functioning correctly, it is constantly confirming to the correlation tracker that it is presenting a valid template, and for every time it successfully finds a track point, it tells the correlator to update its reference. Whenever the centroid tracker cannot find a valid centroid, the selector recognizes that instantly. If the centroid tracker cannot find the centroid the selector switches to MAD correlation. The MAD correlation then, based upon the last valid template, will start doing the area correlation and will continue that tracking operation, while providing the centroid tracker with information with the location of the new track point. The centroid tracker keeps trying to reestablish a new centroid. Once it finds a new valid centroid, the selector switches back to centroid tracking. In the dual mode tracker, only one of the trackers is operating at a time. The system is either 1) doing centroid tracking with the MAD correlator being constantly updated with a new reference template and track centroid, or 2) Mad correlation tracking with MAD constantly updating the centroid tracker to the target location. The system is in one mode or the other, although for computational convenience, both are nominally working simultaneously.

A functional block diagram for the dual mode tracker is shown in FIG. 27, and the hardware block diagram is presented in FIG. 28-2. FIG. 28-1 shows the relation between platform induced motion, target induced motion, and the target window.

In FIG. 27, the functional block diagram for the dual mode tracker, sensor formatter 232 digitizes the data and reformats it to effectively zoom in on the target. The global processor 234 is the same global processor which was used in the acquisition algorithms. It passes the image to correlators 236, 238, 240. The scene MAD correlator, Scene MAD 236, measures scene motions as a whole. MAD 236 provides motion compensation for the line of sight of the platform independent of the vehicle tracking. (If the platform is moving in time and space, the whole scene translates and rotates due to the platform motion.) The Scene MAD 236 function is to track the scene as a whole to allow the Track Point Combining Logic (TPCL) 242 to subtract the effective target induced motion due to platform motion from the total relative motion, see FIG. 28-1. This leaves the target and centroid trackers to only worry about the relative motion between the target in the background as opposed to having to worry about the total motion of the scene as viewed from sensor coordinates.

Target MAD 238 calculates the MAD correlation expression between a sensed image and a reference scene. The centroid correlation module 240 calculates a centroid which is used as a track point.

Referring to FIG. 28-2, the Sensor Formatter digitizes a new image frame from the sensor, reformats it, and performs a streak removal process to eliminate sensor induced artifacts. The Global Processor passes the image of the filtered input scene to the MLC and SL/TT processors. The MLC processor computes the target centroid and passes it to the MLC VM02 processor for updating and track point control.

The SL/TT pipeline processor implements the MAD correlation Track Mode. Its VM02 processor executes the Track Point Combining Logic (TPCL) algorithm. The latter investigates intelligently the target track points reported by the centroid and MAD trackers, and decides upon a composite track point.

The CD pipeline processor and its VM02 continue to perform the global system control and I/O as usual.

The TPCL architecture is specially designed to offer the capability in executing multi-tracking algorithms in dedicated processors. In the preferred embodiment the pipeline and VM02 processors which are in initially software configured for target acquisition are switched to the tracking algorithms. Each individual tracking algorithm and the TPCL are loaded to different segments of the local memory of the particular processors. This multi-tracker scheme follows the same information processing strategy of the target acquisition architecture. Its salient feature reinforces the concept of independent observation from multiple points of view from separately preprocessed or derived information. More importantly, the same architecture readily accommodates multi-sensor fusion in either target acquisition or tracking. The MAD tracker returns the best match using the minimum absolute difference as the confidence measure, while the centroid tracker returns a measure of the cluster size.

The centroid tracker uses the VSC optimal thresholding technique to generate a segmented image which is clustered. Calculation of the centroid then readily follows, which, after motion compensation, is used as the track point for the next frame.

Similarly, the MAD tracker uses a search area centered at the most confident target location as reported by HPL and locates the best match position employing the reference target template. The reference target template is acquired during target handoff from HPL and subsequently updated based on the TPCL report.

The Track Point Combining Logic (TPCL) algorithm initializes itself when it receives the hand off signal. At this point, TPCL enters its track mode. Two globally set parameters are the size of the search area for both the centroid and MAD trackers and the size of the reference target template.

Once in the track mode, the MAD and centroid trackers process the windowed data of the current image. When both finish processing, they report their result to TPCL which continuously accumulates the latest output from the MAD and centroid trackers. Utilizing these target location inputs from the two separate tracking algorithms and any valid centroid tracker past history. TPCL selects the centroid tracker target track location.

While TPCL loops in consecutive tracking frames, the refresh signal for the MAD tracker will be asserted as long as a valid centroid is generated. When a valid centroid is not generated, the MAD tracker provides the track point.

When both trackers fail, the centroid tracker becomes quiescent while the MAD tracker tries to match the data residing in its reference target template.

ASSP HARDWARE

In the preferred embodiment the processor is a loosely coupled computing net of parallel processors, as shown in FIG. 29. The Global Processor performs data transformations which are applicable to the entire image, such as the computation of gradients, edge and joint-edge directions, and the GTIR filtering function. These processed images are sent via a packet protocol to their respective processors: MLC utilizes gradient and joint edge information, VSC utilizes the unprocessed video, and GTIR uses the GTIR data.

Each of the processors shown in FIG. 29 are independent and run asynchronously except during message passing. Physically they are contained in the hardware structures illustrated by the block diagram of FIG. 31. The reference designators of FIG. 29 correspond to the physical components bearing like reference designators in FIG. 31. The bipolar processors are designed to efficiently process algorithmic specific operators, e.g., MLC requires multi-dimensional histograms, and the MAD tracker requires the computation of the normalized correlation coefficient. Associated with each processor is a single board computer (CPU) which executes FORTRAN 77 and assembly language code for high level processes such as HPL and TPCL. Global memory is provided for the exchange and storage of symbolic information and data.

The System Software Block Diagram is shown in FIG. 30. The parallel lines indicate the beginning (or ending) of concurrent processing. At START time, the processor loads itself with its runtime programs and performs a SELF TEST. The processor halts with an error code if all is not well. The SENSOR FORMATTER and the IMAGE DISPLAY tests are activated and continue to run until the processor is halted. When the POINT OF INTEREST is specified (i.e., cloud ceiling penetrated), HPL., VSC, GTIR, MLC, and the GLOBAL PROCESSOR are simultaneously activated for concurrent parallel processing. When these processors have finished the Target Acquisition Task, the TRACKER and GLOBAL PROCESSOR tasks are activated in parallel. The tracking function continues until war head detonation.

The overall system consists of two different kinds of computer systems plus peripheral devices. The first computer system is a microprocessor based on the Versamodule 68000 mono-board computer system (manufactured by Motorola, Inc. of Phoenix, Ariz.) with read only memory boards programmed to interface the 68000 microprocessor with the Pipeline Processor to solve the guidance and target selection and tracking algorithms. The second computer system, the Pipeline Processor, is dedicated from a structural and program aspect to solve the systems algorithms in real time. Peripheral devices used in captive flight test, but not in an actual submissile, consist of a Keypad, Graphics Display Unit, Digital Cassette Tape Recorder, IRIG Time Code Generator, and Radar Altimeter (See FIG. 31).

The microprocessor system is created from the Motorola 68000 product line known as Versamodules. It includes chassis, power supplies, mono-board computers, and memory boards. The system used four M68KVM02 mono-board computers, two M68KVM80 memory boards, and one ROM. All boards are mounted in a Versamodule double chassis. The chassis provides a mounting fixture, power to all boards, and interconnection between boards via a bus system. (Production versions for submissiles would by necessity be packaged substantially different.)

A block diagram of an exemplary one of the four M68KVM02 mono-board computers, 11 through 14 of FIG. 31, is illustrated in FIG. 32. It includes an MC68000, 8 MHZ, 16 bit microprocessor 801, a full Versabus interface with arbitration logic 802; a local on-board bus; a 128K byte, dual port dynamic RAM 803, accessible through the Versabus from the local bus; a 64K byte user PROM: and two RS-232C Ports 805.

A block diagram of one of the two M68KKVM80 memory boards, 15 and 16 of FIG. 31, is illustrated in FIG. 33. It includes a 128K byte dynamic RAM; a Versabus interface 902, and 256K bytes user PROM 903.

The programmable read only on memory (PROM) board, 17, is a large non-alterable memory addressable through the Versabus interface 10. Its memory is contained in 32 512K byte programmable read only memory chips EPROMs programmed with the executable form of the source code and contains HPL target acquisition table look up data.

Six Pipeline Processors 21 through 26, are used to collect data, compensate for sensor deficiencies, and perform data analysis and reduction. The bipolar, bit slice logic used in the processors is laid out on ten 15×16 inch wire wrapped boards. Four processors use 2 boards each and two processors use one board each. Each processor is logically independent and supports its own microcode driven architecture. The processors interface to each other, to the video sensor, to the peripherals, and to the VM02 microprocessors 11 through 14 of FIG. 31. The Pipeline Processors 21 through 26 are interconnected in a loosely-coupled fashion. This means that each processor is independent and self contained with respect to memory requirements and computational needs and share no common memory with other processors. The processors communicate with each other only to transfer data and commands. When a processor receives the required data and/or commands, that data will be operated on autonomously. The results are passed on to another processor or to the VM02. The firmware and the hardware architecture of the processors is modular and illustrated by the block diagrams in FIGS. 34 through 39. In hardware, this means that a functional circuit on one processor is duplicated and exists as a part of another processor. For example, the micro-engine (the CPU group, address sequencer, and microcode memory) is nearly identical for all six of the processors. In firmware, this means that a common set of frequently needed firmware modules which work one processor will work on other processors. For example, the I/O firmware is almost identical on all processors.

The Writable Control Stores (WCS) is a piece of test equipment that allows one to download microcode (firmware) from the meta assembler located on the software development computer and to run that microcode on the bipolar processor under development without going to the expense of burning PROMS. The WCS also allows one to modify with the firmware in real time, as well as do various types of incremental program running/testing and debug.

The chassis used to hold the Pipeline Processors is a Mupac (347 series) which can hold up to 13 wirewrap boards (of which only 10 were actually used). Each board has five 108 pin connectors. Three connectors plug into the chassis. The power for each board comes in through the chassis connectors. The other two 108 pin connectors are on the other side of the board and are used for the WCS interface. The chassis connectors are also used for interconnection of the system data busses, I/O handshake signals, and command signals between Pipeline Processors.

Block Access Memory (BAM), is used by all of the Pipeline Processors except the SFV processor, see 1101 of FIGS. 35 through 39. In each processor, BAM is implemented by a 64K word memory module with special addressing capabilities. Conceptually, this memory looks like a 256×256 array of picture elements (pels), with two 8-bit bytes of data contained in each pel. The two bytes can be written independently. The BAM can be read with the bytes in normal position or in swapped position. There are three parts to the BAM. The three parts are: the Memory array, the DMA address chips, and the sub-sample register.

The addressing for BAM is provided by two separately controlled DMA address generator chips (Am2940). Each of these DMA chips create an 8-bit address. One DMA chip generates addresses for one side of the 256×256 array, and the other DMA chip generates addresses for the other side of the 256×256 array. The DMA chips are independent so either one can be designated the X-Axis (fast axis), or Y-Axis (slow axis). The hardware is connected in a fashion which divides the 256×256 array into four quadrants of 128×128 pels. Using the DMA chips in this fashion relieves the programmer of a great deal of computational overhead. Typically, the data in a BAM is a picture, and the algorithms operate sequentially by row or by column. With DMA chips providing the addresses, the programmer loads only the origin point and length of the window being operated on into the DMA chips. The program accesses data in the window by incrementing the fast axis DMA chip until a signal from the DMA chip indicates that the end of the window has occurred. The program then increments the slow axis and loops back. When the end of window occurs in both axis, the routine is complete.

Each BAM DMA address generator chip has a 4-bit Sub-Sample Register (SSR). The SSR controls when the DMA address can increment. Both SSR's are loaded prior to using the BAM. The values loaded into the SSR's can range from 1 to 15. The SSR allows the DMA chips to increment only when the SSR has counted through the number loaded into it. The effect of the SSR on BAM operations depend on whether the data (image) is being loaded into BAM or is being read from BAM. For example, consider an image being loaded into a BAM with both X and Y axis SSR's loaded with three. In this instance, the input digital video is sent to the BAM (at one pel per clock) and the BAM address will increment every third clock. This means that two-thirds of the image is ignored. Every third pel (horizontally) from each third line (vertically) is stored into BAM. Therefore, loading a BAM with both SSR's=3 causes a 3:1 image reduction vertically and horizontally. As a second example, consider an image being read from BAM with both X and Y axis SSR's loaded with three. In this case, when the image is read, the BAM addresses will increment only every third clock. This means that each pel (horizontally) is duplicated three times and each line (vertically) is duplicated three times. Therefore reading a BAM with both SSR's=3 causes a 1:3 enlargement vertically and horizontally. The range of this image scaling is from 1:1 to 15:1 and works on the entire picture or on a window. Image scaling can be different in each axis.

The BAM Memory Array is 256×256 x 16 bits (64K of 16-bit words). The memory chip used for the BAMs is an IMS1400. This component is a 16K×1-bit static RAM so a complete BAM requires 64 IMS1400's.

Input/output for the Pipeline Processors, FIGS. 34 through 39, is done through Am2950's 1102. This component is an 8-bit bidirectional, I/O port chip which generates handshake signals. Each processor has two 16-bit I/O ports for interprocessor communication and one 8-bit I/O port for interface to its VM02. The interprocessor I/O ports can be operated in either a DMA fashion, or in a full handshake fashion. The I/O ports between a processor and a VM02 operate only in a full handshake mode. Each processor has dedicated handshake signal lines connected to the other processors and its VM02. Communication by another processor starts by loading of an ID code into a register. The ID code selects the correct dedicated handshake signals to be set and/or monitored during the data transaction.

The micro-engine for each Pipeline Processor consists of the CPU group, the address generator, and the microcode memory of FIGS. 34 through 39.

The CPU group consists of the Am29116 16-bit bipolar microprocessor, a separate shift count register, and a separate double RAM address multiplexer.

The address generator, 1103, consists of an Am2910 sequencer with a separate vector PROM, map register, and pipeline register. Also in this circuit is the Condition Code Multiplexer (CC-Mux). The inputs to the CC-Mux are different for each processor. Generally, the CC-Mux inputs are signals which are needed by the program for jumping or looping decisions. An example of a CC-Mux input is an I/O port signal called Next-Data-Available (NDA). This signal indicates when the selected I/O port contains new data (all processors have the NDA signal connected to their CC-Mux).

The PROM (Programmable Read-Only Memory), 1104, device used for microcode memory is the Am27S35, manufactured by Advanced Micro Devices of Sunnyvale, Calif. This device is a 1K×8-bit memory with both synchronous and asynchronous output enables. It has an output latch and an initialize register. The size and location of the microcode memory varies from processor to processor. The lower 2K of microcode memory always exists on the same board as the Micro-Engine. Additional microcode memory was added to some of the processors. The size of the microcode memory, and the location of the added microcode memory is given in the following table.

| Proc. | Microcode size | Location of added Microcode |
|---|---|---|
| SFV | 2K × 88 bits | |
| SFN | 4K × 96 bits | added 2K on extender card |
| GP | 3K × 96 bits | added 2K on GP-A Board |
| MLC | 3K × 96 bits | added 2K on extender card |
| SL/TT | 2K × 112 bits | |
| CD | 4K × 96 bits | added 24K on CD-B Board |

The Multiplier Accumulator (MAC), 1105, is a TRW TDC-1010J. This is a 16 bit×16 bit, parallel, 4 quadrant multiplier/accumulator. Additional input/output multiplexing buffers were added to control the data in and out of the MAC. The programmer loads the MAC X and Y input registers separately, and can read the LSP,MSP,XTP separately. Full control of the MAC control register is also provided.

The index register, 1106, is a circuit composed of an Register/Incrementer (S161), an ALU (S181), and output drivers. The Register/Incrementer is loaded from the data bus (DBUS). The Register/Incrementer is one input to the ALU. The second input to the ALU comes directly from the Microcode Literal Field. The ALU is constrained to do only a few of the possible S181 functions. Control for the Index Register comes from three bits in the microcode word. They select the ALU function and allow the Register/Incrementer to post-increment. The Index Register provides the address for the Scratch Pad RAM, and Look-Up Tables. Below is a table showing the available addressing modes. In the table below, 'Literal Field,' refers to a particular part of the microword where the programmer specifies a value (i.e. an address or a data constant).

| ADDRESSING MODE | ADDRESS SOURCE |
|---|---|
| DIRECT | LITERAL FIELD |
| REGISTER | INCREMENTER |
| INDEXED | LITERAL FIELD + INCREMENTER |
| REGISTER POST-INCREMENT | INCREMENTER (POST INC) |
| INDEXED POST-INCREMENT | LITERAL FIELD + INC(POST INC) |
| FORCE A ZERO | ZERO CREATED BY ALU |

Clock generation and distribution is treated very carefully within the Pipeline Processor Chassis. The main system clocks are created by the CD Processor 1110 of FIG. 39. They must be distributed throughout the chassis with a minimal clock skew between processors. Also, if a WCS (Writable Control Stores) is connected to a processor, the WCS has the ability to enable/disable the system clocks. See FIG. 40 for a diagram showing clock distribution. The clock signals are wired between the connectors on the backplane as twisted pairs. The CD is the source of the clocks and is on one end of the chassis. The SFV is the farthest processor away from the CD and has terminating resistors on the clock lines to improve signal quality. All boards receive system clocks with an S240 component (Schottky buffer with input hysteresis). The S240 is located near the connector where the clock signals enter the board. The wiring stub between the connector pins and S240 is a twisted pair. Minimizing the length of the stub avoids introducing excessive ringing on the clock lines. The ground wire in the twisted pair is connected to a ground pin near the S240. The wirewrap component boards used are large and many clocked components exist on each board so a second level of clock buffering is provided. The second level of buffering replicates each system clock as many times as needed. The clocks at this level are the clocks that the operating circuits use. All circuits, on all boards, use clocks that are buffered twice from the backplane. The WCS interface for each processor has a signal which enables/disables the system clocks. Each processor sends this signal through an open-collector S38 to the backplane. The S38 outputs from all the processors are wired together and connected to the CD clock generator circuit.

Each of the processors has an interface for a Writable Control Stores (WCS). The P4 and P5 connectors are used for this interface. During checkout, the WCS's were used for microcode memory and tracing data (i.e. used as a logic analyzer). The interface to the WCS is shown in FIG. 41.

One of the images from the algorithm training set was placed into EPROM 1111 of FIG. 35. During checkout this PROM was used in place of the normal video source to provide a known image. The real-time hardware/firmware was validated using this image. The SFV Processor has a test image PROM. The SFV test image represents the image before streak removal. The CD and SFN Processors have test image PROMs also. The images in the CD and SFN Processors have a representation of the image after the streak removal process.

Each processor has a Status Register, 1112, with four (active) bar LED's. The use of the Status Register varies somewhat from processor to processor but some things can be said in general. Two of the LED's are used to indicate specific, errors. One is 'stack overflow' in the 2910 Address generator. And LED will light if the 2910 stack is full and an instruction is executed which could push another address onto the stack. The second error indicates a microcode problem in the BAM. An LED lights if the BAM DMA chip instruction directs the chip to source onto the DBUS and the microcode DBUS source field does not select the DMA chip. The BAM circuit detects this error and the DMA chip will not source onto the DBUS if this occurs. When either of these errors is detected, the LED will light and a bit is set in a register. This bit remains set until cleared by firmware or a board reset. There is a 4-bit Status Register which the programmer can access. The Status Register has 4 bits. The first 2 bits are connected to LED's which can be turned On/Off by writing the register. The third bit resets the Error Register and turns off the error indicating LED's. The fourth bit resets the associated processor's 'B' board. The programmer can read the Status Register. During a read the 4 bits of the Status Register are present along with the bits from the Error Register. When a reset occurs, the Error Register and Status Register are reset and the error LED's will light (lamp test).

Each processor has a general purpose, 16-bit internal data bus (DBUS), 1113, used to route data and control parameters on the board. The microword has a field to select the circuit which sources data onto the DBUS and another field to select the circuit which reads data from the DBUS. Generally, the two microword fields are 5-bits wide and contain an encoded value (0 − 31) to select DBUS data source and destination. By having the source/destination encoded, multiple sources onto the DBUS are avoided. The Am29116 microword control field has a bit which allows it to read the DBUS regardless of what value is in the DBUS destination field. Letting the Am29116 read the DBUS at the same time that another circuit is reading the DBUS, allows the Am29116 to calculate a check sum while passing an image in/out of BAM.

Each processor has a hexadecimal display 1114. This display has two digits for the MLC, SL/TT, GP, and 4 digits for the SFV, SFN, and CD.

Each board (except SFV) has some scratch pad RAM, 1115. This RAM is used for holding run-time parameters, for temporary buffering of data, and for holding intermediate values during calculations. The size of the scratch pad RAM varies from processor to processor. Below is a table showing the amount of scratch pad RAM per processor.

| PROCESSOR | SCRATCH PAD RAM SIZE |
| --- | --- |
| CD | 16 K WORDS |
| SL/TT | 256 WORDS |
| MLC | 256 WORDS |
| GP | 256 WORDS |
| SFN | 32 K WORDS |
| SFV | (0) |

The Sensor Formatter/Video Processor, FIG. 34, is referred to throughout this patent as the SFV. It is a single board Processor which has its own clock. This clock operates at a frequency different from the other processors. The SFV is the ASSP sensor interface. The SFV has no algorithmic duties other than video filtering. The SFV is the source of the digital video picture for the ASSP. The SFV is functionally slaved to the SFN. More specifically, the purpose of the SFV is to receive the real-time digitized picture, extract the 384×384 pel or pixel 'picture of interest' from the input video, do a 3:1 reduction horizontally, do a line by line average of the current field with the previous field, and respond to commands from the SFN. The final picture formed by the SFV is a 128×384 image. (The streak removal filter in the SFN reduces the image to 128×128 ).

The SFV uses the following common circuit modules which were previously discussed: wirewrap boards; a microengine, clocks, a WCS interface, test image PROMs, a status register, and hexadecimal displays.

The Micro-Engine in the SFV does not support a shift count register or double register addressing for the CPU. This is because of the special clock generated on the SFV. The test image PROM, 1111, on the SFV contains a 128×384 image that has not had the streaks removed. This PROM contains the same image data that would have come out of the SFV if the sensor had been looking at the 'test image'. The SFV has two I/O ports, 1120, which are unique.

The SFV is the only processor using both system and 'on board' clocks. A clock generator oscillating at 17.3 MHz is used by the digitizer (A/D), Blanking Synchronizer, and Data Synchronizer circuits. The significance of this clock period is that the digitizer will digitizer 'square' pixels from the 875 line video. To digitize 'square' pixels, the aspect ratio of the sampling period is 4:3. This is the inverse of the 3:4 aspect ratio of the in coming 875 line video. The remainder of the SFV uses clocks which are three times slower than the 17.3 MHz oscillator. The slower clocks are referred to as processor clocks.

The A/D Converter and Sync Box strips horizontal and vertical blanking from the incoming video and sends these signals to the SFV Blanking Synchronizer. These signals are asynchronous to the SFV. The Blanking Synchronizer detects where the leading edge of the active video line is (i.e. the end of the horizontal blank), with respect to the processor clock. The outcome of this detection process is sent to the Data Synchronizer. The horizontal and vertical blank signals are also sent to the 2910 CC-Mux for synchronizing the SFV microcode program to the incoming video field.

The Data Synchronizer 1121 of FIG. 34, receives the 8-bit digitized video from the A/D Converter and Sync Box. The digitized data is sent through three successive delaying registers clocked by the 17.3 MHz clock. The Blanking Synchronizer determines how the incoming video line relates to the processor clock. The data will be selected from the delaying register having the correct number of delays to sync the video with the processor clock.

The digitized data from the Data Synchronizer goes directly to the 3:1 Horizontal Reduction circuit 1122. This circuit adds three successive 17.3 MHz 8-bit pixels in real-time to form a 10-bit sum. The sum is passed, in real-time, to the Field Store Memory.

The Field Address Counter, 1123, is a 16-bit counter used to address the Field Store Memory, 1124. This counter can be loaded from DBUS and can be read from DBUS. Control for this counter is a separate bit in the microword which enables the counter to increment.

The Field Store Memory (FSM), 1124, is a 48K×10-bit static RAM memory. The data for the FSM is the digital video stream from the 3:1 Horizontal Reduction Circuit. The address for the FSM is provided by the Field Address Counter. The SFV microcode controls the FSM address counter and write pulse so that the central 128×384 pixels are stored in the FSM. The programmer can write and read the FSM from the data bus.

The Two Field Adder circuit 1125 is a simple adder with two 10-bit inputs and an 11-bit output. One input is the digital video stream from the 3:1 Horizontal Reduction Circuit. The other input is from the FSM. The purpose of the Two Field Adder is to add, in real-time, the pixels from the current field with the corresponding pixels in the previous field.

The data source for the Divide By Six, 1126, is the Two Field Adder circuit 1125. The pixels coming into the Divide By Six circuit are six times the value they need to be. The 3:1 Horizontal Reduction Circuit 1122 adds three successive pels together, and the Two Field Adder sums together two pixels from the 3:1 Horizontal Reduction Circuit. The Divide By Six circuit divides each pixel by six in real-time. Functionally, the Divide By Six circuit is a PROM (Programmable Read Only Memory). The data at each PROM address is 1/6th the value of its address.

The Image Address Counter (IAC), 1127 of FIG. 34, is a 16-bit counter for addressing the Image Store Memory, 1128, and the Test Image Table 1111. This counter can be loaded (pre-set) from DBUS, and can be read from DBUS. The increment for this counter can come from either the SFV Microcode, or from the SFN Microcode. The SFV controls the IAC when the Image Store Memory is being written to. The SFN controls the IAC when the ISM is being read. The SFN commands the SFV to place the increment control of the IAC with the SFN or the SFV. The SFN can only increment the IAC, and cannot load it or read it.

The Image Store Memory (ISM), 1128, is a 48K×8-bit static RAM. Data for the ISM comes from the Two Field Average Circuit. The address for the ISM is provided by the Image Address Counter. To load the ISM, the SFV Microcode program controls the IAC address increment and ISM write pulse. As the digital video stream comes in, the central 128×384 pixels are stored into the ISM. The programmer can write and read the FSM from DBUS.

The Test Image Table, 1111, is a 64K by 8-bit PROM addressed by the IAC. Part of this table (48K) is a Test Image PROM.

The SFV I/O port, 1132, is similar to the I/O Common Module. The difference is that there is only one port. The I/O port is a 16-bit bidirectional port which is used both synchronously and asynchronously with the SFN. Because the SFV has only one port, there is no port select circuitry. The port handshake signals are connected directly to the CC-Mux. The handshake signals to the SFN go through synchronizing flip-flops to eliminate problems caused by the different clocks on the SFN.

The Sensor Formatter/Numeric Processor, FIG. 35, is referred to throughout this document as the SFN. The SFN is a single board processor which completes the sensor image processing which was started by the SFV, and sends that picture to the GP. During acquisition, the SFN performs the VSC algorithm.

The following previously discussed common circuit modules are used in the SFN: wirewrap boards, block access memory (BAM), I/O ports, micro-engine, MAC, index register, clocks, WCS interface, test image PROMs, status register, data bus source/destination, hexadecimal displays, and scratch pad RAM.

The I/O circuitry 1102 in the SFN is similar to the previously described I/O ports, except that there is an additional 16-bit port for communicating with the SFV. The address for the Test Image PROM on the SFN comes from the BAM DMA address chips.

A Reciprocal Table 1141 is contained in a 2K×16-bit PROM. The table contains the three coefficients of the quadratic equation defining reciprocals. These coefficients are piece-wise linear with respect to the true curve. Obtaining the correct coefficients is achieved by correctly indexing into the table. The address for the table is generated by the Index Register.

A square-root table 1142 is contained in a 2K×16-bit PROM. The table contains the three coefficients of the quadratic equation defining square-roots. These coefficients are piece-wise linear with respect to the true curve. Obtaining the correct coefficients is achieved by correctly indexing into the table. The address for the table is generated by the Index Register 1106.

The Row Processor is a group of circuits in the SFN which perform a streak removal filter function on the SFV image. The streak removal filter involves taking each pixel in a line and doing a MX+B calculation on it*, followed by a

*where m=gain correction factor for the line x=pixel grey scale value
b=grey level offset for the line
power of two scaling, and then adding that pixel to the pixel directly above it in the image. This goes on for three lines. When these three lines have been processed into one line they are returned to the BAM and the next three lines are processed. The Row Processor is where the 128×384 image from the SFV is reduced (vertically) to 128×128. The sections below discuss the individual circuits in the Row Processor.

The MAC X-Register Input Mux circuit, 1143, in the Row Processor is similar to the Common Module multiplier accumulator previously discussed. The difference here is that the MAC X-register has an additional input mux. This mux brings data directly from the Scratch Pad RAM to the MAC X-register without using DBUS. The programmer can load 16-bit data from the Scratch Pad RAM into the MAC X-register. The programmer may also load only the upper byte from Scratch Pad RAM with zero in the lower byte. A third option for the programmer is to load the lower byte from Scratch Pad RAM into the upper byte of the MAC X-register with zero into the MAC X-register lower byte.

The MAC circuit is similar to the Common Module Multiplier Accumulator previously described. The difference is in the additional X-register input mux described above and in the added output data path to the adder. In the Row Processor the MAC Y-register is loaded with the 'M' coefficient in the MX+B calculation and the 'X' values come from the Scratch Pad RAM.

The B-Register, 1144, is a 16-bit register which is loaded from DBUS and can be read back from DBUS. This register provides the 'B' coefficient in the MX+B calculation.

The Adder, 1145, in the Row Processor performs the '+' function in the MX+B calculation. One input is the 16-bit output from the MAC MSP register. The other input to the Adder is the value loaded into the B-register. The output from the Adder is a 17-bit sum. The sum goes to the scaling headers onto DBUS.

The Scaling Headers, 1146, provide a method of scaling the output of the Adder by powers of two (i.e. shift right or shift left). The scaling is accomplished in hardware by wiring jumpers to the Header pins. The input to the Scaling Headers is the 17-bit sum from the Adder, and the output of the Scaling Headers is a 16-bit value. The 17-bit input value can be shifted up by five places with zero fill or with one fill. The 17-bit input value can be shifted down by four places with zero fill, one fill, or sign fill. The current mechanization is with no scaling and the sign bit is ignored. The 16-bit output from the Scaling Headers goes to the ALU.

The ALU, 1147, in the Row Processor is fabricated using S181 ALU's. There are two inputs to the ALU. One input is the 16-bit value from the Scaling Headers and the other input is the 16-bit value from the One Line Memory. The control lines into the ALU are constrained such that only two functions are possible. One function is to pass the Scaling Header value without modification, and the second function is to add both inputs together. The ALU function is determined by a bit in the Microcode word. The output of the ALU goes to the One Line Memory, 1148, and to the Clip and Divide By Three PROM Circuit 1149.

The One Line Memory, 1148, is made up of four, 256×4 RAM memory chips which have separate input and output pins (93422). Together with the One Line Memory Address Generator these RAMs function as a 128 word memory for temporary storage of one line of video which is partially processed. The One Line Memory is interconnected with the ALU in a manner that allows a read-modify-write operation to occur. During one clock cycle, data is read from the Memory into the ALU, modified by the ALU, and written back to Memory at the same address. One bit in the microcode word enables the write pulse in the One Line Memory. This is the same bit which allows the One Line Memory Address Generator to post-increment.

The One Line Memory Address Generator, 1133, is an 8-bit register/counter which is loadable and readable from DBUS. This counter provides the address for the One Line Memory. One bit in the microcode word enables the One Line Memory Address Generator to post-increment, this is the same bit which enables the write pulse in the One Line Memory.

The Row Processor does an MX+B calculation on each pixel in a line while adding three lines pixel by pixel. At the end of the third line of processing, the final values of each pixel are three times what they should be. As each pixel value in the third video line comes out of the ALU these pixels go through the Clip and Divide By Three PROM Circuit. The Clip and Divide By Three PROM 1149 is 2K×8-bits. The input (address) is the upper 12-bits from the ALU. The lower 4-bits from the ALU are ignored. The output is an 8-bit value. The Clip and Divide By Three PROM Circuit, 1149, does the following function:

If the ALU data is negative (i.e. bit 15 is 1), the output is zero.
If the ALU data is greater than 765 (decimal), the output is 255.
If the ALU data is between 765 (decimal) and zero, the output is the input data divided by three.

The Global Processor is referred throughout this document as the GP. It is illustrated in block diagram form in FIG. 36. The GP is a double board processor with special datareducing hardware for pre-processing data. Several of the algorithms require various convolutional kernels to be convolved over the data acquired and filtered by SFV and SFN. GP performs the General Target to Interference Ratio algorithms.

The following previously described common circuit modules are used in the GP: wirewrap boards, block access memory (BAM), I/O ports, micro-engine, clocks, WCS interface, status register, data bus source/destination, and hexadecimal displays.

The GP has two BAM memories, 1101, with a mapped addressing scheme. The programmer configures the source of destination of data flow between the memories along with the fast (X) and slow (Y) axis increments through an address mapping register. Data from a BAM can be routed through the Generalized Convolutional Operator (GCO), Look-Up Table (LUT), or Merge Table (MT) logic on its way to the other BAM or I/O port.

The Generalized Convolutional Operator GCO is a one or two dimensional filter capable of convolving a BAM source with a selected kernel at BAM access rates. A high speed, bit sliced, carry-save-adder network is used to convolve a 9 element kernel (either 3 by 3 or 1 by 9) in parallel with 9 elements in the data pipeline.

DBUS data are used as an address into the selected LUT PROM and the contents of the address passed on as the result in a single cycle.

Six bits in the upper and six bits of the lower DBUS data bytes are used as a 12-bit address into a selected Merge Table PROM. The 8-bit data found at that address is passed on as the result in a single cycle.

The Maximum Likelihood Classifier Processor illustrated in block diagram form in FIG. 37 is referred to throughout this document as MLC. The MLC consists of two wirewrap boards. The MLC algorithm is performed in this processor during target acquisition.

The following previously described common circuit modules are used in the MLC: wirewrap boards, block access memory (BAM), I/O ports, micro-engine, MAC, index register, clocks, WCS interface test image PROMs, status register, data bus source/destination, hexadecimal displays, and scratch pad RAM.

The MLC has two internal data busses named DBUS, 1113, and EBUS 1160. The EBUS is used to provide a second data path during the MLC algorithm. Some of the Common Modules listed above have a second output mux for interface to the EBUS. The MLC Microword contains a second data bus source for the EBUS source definition. There is one data bus destination field in the MLC microword for both the DBUS and EBUS. The EBUS destinations are the Histogrammer and MAC.

A Reciprocal Table, 1161, is contained in a 2K×16-bit PROM. The table contains the three coefficients of the quadratic equation defining reciprocals. These coefficients are piece-wise linear with respect to the true curve. Obtaining the correct coefficients is achieved by correctly indexing into the table. The address for the table is generated by the Index Register. The Reciprocal Table can be read by the DBUS or EBUS.

The purpose of the MLC Histogram is to provide statistical information on the Joint-Edge features, occurring in selected two dimensional gradient regions, within the image or sub-image. The sections below will describe the hardware implementation of the Histograms.

The Histogram Control Register, 1163, is a 16-bit register accessible as a source and destination on the DBUS. Five bits from this register are the Histogram ALU control bits. Another bit disables the two Mapping PROMs. If the Mapping PROMs are disabled, Histogram increment control is selected by a bit in the Histogram Control Register and the Histogram address is in the Index Register. Two other bits in the Histogram Control Register control the most significant address bits into each Mapping PROM. With these two bits the programmer selects between two data sets contained in the Mapping PROMs.

The Absolute Gradient Mapping PROM, 1164, is a 512×8-bit PROM. The lower seven bits of the PROM address come from the lower seven bits of the EBUS. The most significant address bit comes from the Histogram Control Register. The purpose of this PROM is to translate the Absolute Gradient information of a pixel into a Histogram address. The Histogram address formed by this PROM is used by all Histogrammers 1162 simultaneously.

The Joint-Edge Mapping PROM, 1165, is a 512×8-bit PROM. The lower seven bits of the PROM address come from EBUS bits 8-14. The most significant address bit for the Joint-Edge Mapping PROM comes from the Histogram Control Register. The purpose of this PROM is to decode the Joint-Edge information of a pixel into six discrete output signals. Each signal is connected to a Histogram.

The MLC has six Histogram 1162 with 12-bit data paths using three 256×8-bit RAMS (93422), three ALU's (S181), and a 12-bit output buffer. The ALU function defined by the Histogram Control Register is the same for all six ALU's. The address into the Histogram RAMs comes from the absolute Gradient Mapping PROM. A separate ALU increment pulse for each Histogram is derived from the Joint-Edge Mapping PROM. Each of the six Histogram output buffers can be read through the DBUS using its address in DBUS source field.

The Histogrammer $F_1$ and F2 circuit is a 12-bit adder. Inputs are from Histogram 1 and 2 RAM outputs. The output of this circuit can be read on the DBUS and goes to the Compare circuit.

The Compare circuit, 1166, is a 12-bit comparator. One input to the comparator is the output of the Histogrammer $F_1$ and F2 circuit. The other input to the comparator comes from the EBUS. The MLC algorithm uses the Multiplier Accumulator (MAC) output as EBUS source when the Compare circuit is being used. The Compare circuit output is two signals which go to the CC-Mux. These two signals indicate:

(SUM HISTOGRAM $F_1$ and F2)=(MAC PRODUCT)

AND (HISTOGRAMMER $F_1$ and F2)>(MAC PRODUCT)

The MLC Parzen Table, 1167, is a 256K WORD look-up table using 32, 2764 EPROMs (8K×8). There is a 16-bit latch for holding the lower address bits and a 4-bit latch for holding the upper address bits. The circuit wiring supports using 27128 EPROMs (16K×8) by changing the jumpers on a header. If 27128 PROMs are used, the maximum size of the table would be 512K words.

The Scene Lock Target/Track Processor is referred to throughout this document as the SL/TT. It is illustrated in FIG. 38 as a block diagram. The SL/TT consists of two wirewrap boards. The SL/TT Processor performs the Minimum Absolute Difference (MAD) correlation during track mode.

The following previously described common circuit modules are used in the SL/TT: wirewrap boards, block access memory (BAM), I/O ports, micro engine, MAC, index register, clocks, WCS interface, status register, data bus source/destination, hexadecimal displays, and scratch pad RAM.

The SL/TT has two BAM, 1101, and two MAC, 1105, Common Circuit Modules. One MAC is on board A. The BAMs and second MAC are on board B and have special control circuits. The SL/TT Microcode word has two MAC and two BAM control fields. The SL/TT Microcode PROMs are distributed on both boards. Board A has Microcode bits 0-79, and Board B has Microcode bits 64-111. Note that boards A and B both have Microcode bits 64-79 (Data Bus Source/Destination fields).

A Reciprocal Table, 1170, is contained in a 2K×16-bit PROM. The table contains the three coefficients of the quadratic equation defining reciprocals. These coefficients are piece-wise linear with respect to the true curve. Obtaining the correct coefficients is achieved by correctly indexing into the table. The address for the table is generated by the Index Register. The Reciprocal Table can be read to the DBUS or EBUS.

A Square-Root table, 1171, is contained in a 2K×16-bit PROM. The table contains the three coefficients of the quadratic equation square-roots. These coefficients are piece-wise linear with respect to the true curve. Obtaining the correct coefficients is achieved by correctly indexing into the table. The address for the table is generated by the Index Register.

The SL/TT has a 64K word Look-Up Table, 1172. The address for the table comes from a 16-bit register which is loaded from DBUS. The table is fabricated with eight 27128 EPROMs (16K×8). Part of this table is a combined Reciprocal/Square Root table. Also located in the SL/TT Look-Up Table is a Reciprocal Table.

Part of the SL/TT Look-Up Table is a Reciprocal/Square Root Table. This table is a straight look-up table. If the programmer desires the Reciprocal/Square Root of a number, that number is used as the address into the table. The data out of the table is the Reciprocal/Square Root.

Part of the SL/TT Look-Up Table is a Reciprocal Table. This table is a straight look-up table. If the programmer desires the reciprocal of a number, that number is used as the address into the table. The data out of the table is a 16-bit number. If this 16-bit number were multiplied by the original number the result would be hex 10000.

The SL/TT BAM Control Selector, 1173, consists of a 6-bit BAM Control Register (BCR) and some signal multiplexers. The BCR can be loaded and read from DBUS. Only one bit is active in the BCR. This bit defines which BAM is BAM 1. There are two BAMS on the SL/TT which are labeled, in hardware, BAMA and BAMB. All control signals and flags for both BAMs go through signal multiplexers. The programming model for SL/TT labels the BAMs and BAM1 and BAM2. During track mode, context of the BAMs are being swapped continuously. One BAM has the reference image and the other BAM has the current image. When the reference image is obsolete, BAM context is switched and the BAM which was the current image now becomes the reference image. The SL/TT BAM Control Selector allows the Microcode Tracking routines to be written with BAM1 as the reference and BAM2 as the current image. When BAM context needs to be switched, the bit in the BCR is toggled and the track program continues.

The MAC-B has a special Control Register circuit, 1174. This circuit consists of a 12-bit register followed by a mapping FPLA. The register can be loaded and read from DBUS. The lower 4 bits of the register hold the MAC-B control terms (i.e. Round, Subtract, Accumulate, 2's Complement). The next 4 bits are MAC-B X-Register Input Select codes. These bits go to the mapping FPLA for decoding into the proper enable signals. There is one additional input to the FPLA. The signal from the BCR which identifies BAM1 is also an input to the FPLA. The FPLA has seven output terms. Four of the output terms are the upper/lower byte enable terms for BAMA/BAMB. The programmer loads the BAM1/BAM2 choice into the MAC-B Control Register. The FPLA enables either BAMA or BAMB based on the programmers choice and the state of the BCR bit. The other three terms from the FPLA are select terms which go to the MAC-B, X-Register Input Mux.

The MAC-B, X-Register Input Select Mux, 1175, is composed of 4:1 and 2:1 selectors. The 4:1 selectors are for the lower 8 bits, and the 2:1 selectors are for the upper 8 bits. The four choices of the MAC-B, X-Register inputs are:

| UPPER BYTE | LOWER BYTE |
|---|---|
| ZERO | BAMA |
| ZERO | BAMB |
| 00 | 01 |
| DB-UPPER | DB-LOWER |

The SL/TT Mask Memory Address Generator is identical to the BAM Address Generator. The SL/TT Mask Memory array, 1176, is quite different from a BAM. The Mask Memory array is configured as a 256×256×1-bit memory. Data is loaded into the Mask Memory in byte packed format, and read a single bit at a time. This occurs because the lower 3 bits from the X-Address Generator are not connected to the Mask Memory chips. The X-Address Generator lower 3 bits are connected to an output mux which selects the Mask Memory data one bit at a time.

The SL/TT Zero Buffer, 1178, provides 8 bits of zero to the upper half of DBUS and/or the lower half of DBUS.

The Control and Display is referred to throughout this patent as the CD. It is illustrated in block diagram form in FIG. 39. The CD consists of two wirewrap boards. The CD Processor directs the other processors through their operational modes and interfaces with the peripheral devices.

The following previously described common circuit modules are used in the CD: wirewrap boards, block access memory (BAM), I/O ports, micro-engine, MAC, clocks, WCS interface, test image PROMs, status register, data bus source/destination, hexadecimal displays, and scratch pad RAM.

The CD Processor has several more interface ports than the other Pipeline Processors and is the source of the system clocks. The CD directs all the Pipeline Processors through their modes of operation. The CD is also the system interface to all peripherals.

The System Clock Generator, 1110, is located on the CD Processor. The clock generator uses a 20 MHz crystal oscillator for generation of all system clock signals. There are six phases to the system clocks and all have a period of 200 ns (5 MHz), see FIG. 43. Four clocks have a 25% duty cycle and two clocks have a 50% duty cycle. The 25% duty cycle clock phases are non-overlapping. The 50% duty cycle clock phases overlap by 25%. The four 25% clock phases are labeled CLOCKA, CLOCKB, CLOCKC, and CLOCKD. The two 50% clock phases are labeled CLOCKE and CLOCKF. All six clock signals can be enabled and disabled by a signal from the backplane. This enable/disable signal originates from a writable control stores (WCS). There is a seventh clock on the backplane labeled CLOCKW. CLOCKW is a free running clock with is in phase with CLOCKA and is unaffected by the WCS enable/disable signal. CLOCKW is generated for the WCS which needs a free running clock for proper operation. The seven clocks are distributed across the backplane with twisted pairs. Each processor buffers all clock inputs. The processor farthest from CD (i.e., the SFV) terminates each clock line.

The CD Processor has a 64K word look-up table, 1180. It is made up of sixteen (2764) EPROMs. Addressing is through a 16-bit latch. This 64K table has several smaller tables located with in it.

There are two Test Image tables within the CD Look-Up Table, 1180. One was previously described. The other is a translated version of the original Test Image. The translation is about 10 pixels in the horizontal direction. By switching between the two images a pseudo moving picture was created. This method was used to validate the tracker mode of operation.

The CD Processor reads the IRIG Time Code Generator, 36 of FIG. 31, and displays it on the International Imaging System (IIS) Model 70/F graphics display unit, 32. To simplify decoding of the IRIG code, a look-up table is used. This table is part of the CD Look-Up Table, 1180 of FIG. 39.

The IIS requires a specific data transfer format consisting of header and trailer information. The IIS also requires a great deal of initialization. To simplify the IIS data interface the header/trailer formats and initialization parameters are also stored in the CD Look-Up Table 1180.

The CD Processor has interfaces to all of the ASSP system peripherals. Each of the peripheral I/O circuits are described below.

The IIS Graphics Display Unit Interface, 1181, consists of two unidirectional, 16-bit differential, I/O ports. One port is for CD to IIS, and the other is for IIS to CD. A separate IIS master clear signal to the interface is controlled by a bit in the CD Microcode word. There are two handshake signals. One is a command signal from the CD to IIS, and the other is the IIS response. There is a response timer which starts when the CD issues a command to the IIS. If the IIS does not respond within 200 ms, a flag is set in the CC-MUX. The cabling between the CD and the IIS are two 36 strand ribbon cables. In both cables, every other wire is ground. The IIS displays a multi-image picture array of 256×256 pixels. For flight test, four quadrants of 128×128 pixels are displayed. The quadrants are used for displaying the incoming video and the subsequent results. The IIS also displays the IRIG time and the Radar Altitude.

The interface, 1182, to the IRIG Time Code Generator is a demand/response interface. The CD requests IRIG data, waits for the IRIG data ready flag, then reads the 16-bit encoded data. Cabling to the IRIG is a 36 strand ribbon cable. In this cable every other signal is ground. The IRIG time is displayed on the IIS and is stored on the Digital Tape Recorder at end of Acquisition.

The Radar Altimeter Interface, 1183, consists of three signals plus three grounds. One signal is a clock and the second signal is a Validity bit. The third signal is an altitude pulse which is true for a specific number of clock periods. The number of clock periods is the altitude. The clock signal is used for incrementing counters. The altitude pulse is used to enable the counters. There are some flip-flops in the interface circuit which look for the trailing edge of the altitude pulse signal. At the trailing edge of the altitude pulse, the count is loaded into a 16-bit register, a flag is set to the CC-MUX, and the counter is cleared. This process is autonomous with regard to the CD Microcode. The Validity bit is connected as the MSB in the 16-bit register. The cabling between the Radar Altimeter and the CD is with three twisted pair of wire. The Radar Altitude is displayed on the IIS.

The Digital Tape Recorder Interface, 1184, is a partial implementation of Digital Equipment Corporation's UNIBUS. Cabling between CD and the Digital Tape Recorder consists of two 36 wire ribbon cables soldered to a UNIBUS connector. A standard UNIBUS connects the UNIBUS connector to the Digital Tape Recorder. The Digital Tape Recorder is used to store the IRIG time, initial video image, and final results.

The Keypad interface, 1185, is on both CD boards. The interface on the CD-A board consists of an 11-bit output latch, a 13-bit input buffer, 5 V power, and ground. CD-A reads and writes to the Keypad pushbuttons. CD-B has an 8-bit input buffer for reading the thumbwheel switches. The interface is through two 36 wire ribbon cables. The programmer selects either the Keypad or the Thumbwheels for reading. The Keypad is used to reset the Pipeline Processors, set the Pipeline integration level, and to start algorithm processing.

The Keypad, 31 of FIG. 31 is the operator interface to the system. It is illustrated in FIG. 42. It consists of 15 push-buttons, 1191, two thumbwheel switches, 1193, and 8 DIP switches, 1194. Ten of the push-buttons are the numerals 0-9. Three push-buttons control keypad enter (ENT), clear (CE), and escape (ESC). The push-button labeled RST is the Pipeline Processor reset signal. One push-button was not defined. One numeric value is valid at one time. Each push-button has a red LED and a yellow LED. The CD Processor can enable any one or all numeric push-buttons. The yellow LED's light to indicate which numeral s the CD Processor has selected as valid. When the operator pushes a valid push-button, the red LED will light. The selected push-button will stay active with the red LED lit until the CD Processor reads and clears the Keypad. The ENT, CE, ESC and RST push-buttons are valid at all times. The CE push-button will clear the selected numeral. The ENT and ESC are latched signals to the CD Processor CC-Mux. The upper thumbwheel is used to dial in a constant to be used by the ASSP algorithms. The lower thumbwheel is used to indicate the system integration level. The 8-bit DIP switches are not used.

The IIS Graphics Display Unit 32 of FIG. 31 is an International Imaging Systems (IIS) Model 70/F Image Computer and Display Terminal. The IIS is a powerful Color Graphics Display computer measuring 26×19×16 inches. The system uses only a small portion of the IIS capabilities. The system uses the IIS to translate the digital video out of the CD into R-G-B format for display on a R-G-B monitor. The CD also uses the IIS graphics plane to display IRIG time, Radar Altitude, ASSP mode, and Acquisition results. A small box was added to the IIS chassis for summing all three video outputs (i.e. RED, GREEN, BLUE) and sync. The sum is a pseudo RS-170 output which can be recorded with a video recorder.

The Digital Tape Recorder 34 of FIG. 31 consists of two standard 19 inch rack-mount chassis. One chassis is a Wesperline Model WP909 four slot DEC compatible UNIBUS backplane and power supplies. It holds a Western Peripherals Model TC-180 magnetic tape controller/formatter. The TC-180 is a DEC PDP-11 compatible unit which emulates a TM-11 /TU-10 tape subsystem. The second chassis is Wesperline Model 2101 S/D Cassette Drive unit. The Cassette Drive unit has two drives which use 3M type, ¼ inch tape cartridges. The Tape Controller is interfaced to the CD Processor with a standard UNIBUS cable.

The Radar Altimeter 35 of FIG. 31 is a U.S. Government APN-209 Radar Altimeter Set which has a range of 1500 feet.

The IRIG Time Code Generator 36 of FIG. 31 device is a DATUM Model 9300 Time Code Generator/Translator. The 9300 chassis is 1¾ inches high and fits in a standard 19 inch equipment rack. In the flight test system, the 9300 is used as a Time Code Generator. The standard 1KHZ IRIG-B signal is recorded by the analog video recorders. The CD Processor interfaces to the digital output of the 9300 to read days, hours, minutes, seconds, and milliseconds.

The following figures illustrate the Microword layout for each processor.

The SFV Microword is shown in FIG. 44.
The SFN Microword is shown in FIG. 45.
The GP Microword is shown in FIG. 46.
The MLC Microword is shown in FIG. 47.
The SL/TT Microword is shown in FIG. 48.
The CD Microword is shown in FIG. 49.

All of the Pipeline Processors are controlled by microcoded instructions. The microword definitions for the processors are similar and reflect the usage of common circuit modules in the processor hardware implementation. The commonality in both hardware and microword definitions include macros which are portable to each processor.

The MACLANG collection of microcode macros and routines are portable between all the processors. These routines and macros are divided into the categories of Program Control, Arithmetic Operations, Program Branching Primitives, and Read/Write-Import-/Export Macros. Each category is described below.

The MACLANG Program Control Macros are intended to provide 'Hi-Level Language,' program control capabilities. MACLANG contains Macros which can accomplish IF-THEN-ELSE, DO loops, DO-WHILE loops, and DOUNTIL loops. MACLANG also defines GOTO, CALL, and RETURN. The memory cells used for loop count and test values can be 29116 registers, Scratch RAM address, or an element of an array in Scratch RAM.

The MACLANG Arithmetic Operations define a variety of useful arithmetic, logical, and data movement operators. The operators can be used for single precision and double precision values. Some of the operators available are: Increment, Decrement, Move, Complement, Negate, Add, Subtract, AND, OR, Multiply, Rotate, and Shift. The location of the operands and destinations of the result can be 29116 registers, Scratch RAM address, or an element of an array in Scratch RAM. Double Precision Values must be adjacent memory cells.

The MACLANG Program Branching Primitives are used to compare two operands and then branch to the indicated label if the specified relation (between operands), is true. The relations available are: Less Than, Less Than or Equal To, Equal, Greater Than or Equal To, and Greater Than. The operands can be double precision values. The operands can be 29116 registers, Scratch RAM address, or an element of an array in Scratch RAM. Double Precision Values must be adjacent memory cells.

The MACLANG Read/Write and Import/Export Macros provide inter-processor data communication. These Macros execute a very sophisticated I/O protocol which does a great deal of error check and retry subroutines. The Read/Write macros are used for transferring a data list between processors, and for doing I/O with a VM02. The Import/Export Macros are used to pass a 128×128 image between processors. All data transfers in Read/Write use full handshake. In the Import/Export Macros, data is sent synchronously in a DMA-like fashion, and I/O control and error check parameters are sent asynchronously with full handshake.

The built in test capabilities of the system to provide a limited processor level test, an End-To-End operational test, and a Fault Location test. Each of these tests are described below.

Processor level tests are performed by all processors at reset. The processor level tests consist of an exhaustive test of all BAMs. The BAM test exercises the Micro-Engine and Data Bus Source/Destination circuits.

An End-To-End Operational test selects the Test Image as the video source, runs the processors, and displays the results on the monitor. If the results are not correct, an error is detected.

A Fault Location test selects the Test Image as a video source, selects a System Integration Level, runs the process, and interprets the results displayed on the monitor. The System Integration Level is initially run with only the CD in the System. If the results are positive, then the System Integration Level is increased by adding another processor to the system and the test repeated. When the results indicate a failure, the last processor added is where the problem is. This test utilizes I/O branching to allow one-by-one integration of the processors. The VM02 programs do not have the comparable branching capabilities. The Operational VM02 programs assume all processors and all VM02s are present. This means that the VM02 Operational programs will not complete, and the system will not complete operation, with the System Integration Level set to anything other than all processors. By careful interpretation of the monitor display, correlated with the System Integration Level, the location of a failed greater processor can be determined.

The following are some general comments about the general operating features and utility features of each of the classifiers and how it would be useful in considering how to use them singly or in various combinations.

MLC is particularly useful in separating targets based upon straight line structures which are characteristic of many man-made objects. Since VSC is extracting these straight line structures one can distinguish certain kinds of false alarms that are not easy for some other kinds of algorithms to distinguish against.

GTIR is an algorithm whose performance is keyed to finding anomalous regions that are about the size of a target. Many targets that we are dealing with have hot and cold spots that extend for quite a few pixels an area. The GTIR algorithm is very good at finding these spots very quickly. When hot and cold things are placed together then the GTIR algorithm is very effective at seeing their proximity. So then, while MLC would only be interested in the fact that the boundaries of these high contrast things exist, where GTIR actually looks at the magnitude of the pixels that make up these given boundaries. VSC, on the other hand, is an algorithm that is looking at the characteristic shapes of the objects that its trying to find the indifferences in grey level value that go to make up the object. VSC, the way it is implemented, is the slowest of the algorithms.

MLC and GTIR are the most valuable combination of two algorithms because the GTIR algorithm brings in amplitude information in a compact way and MLC brings in edge information in an efficient way. Putting MLC and GTIR extracts a good deal of information from an image that allows separation of targets from random background: targets being a collection of man-made straight features that have inside them high-contrast hot and cold spots. By leaving VSC out of the triad, some of the capability to distinguish targets from certain kinds of cultural clutter is lost. For instance, buildings of certain shapes, or objects which may be shaped in some irregular way, as to which VSC would helpful in discriminating against. The decision for the MLC/GTIR pair would be that a target is anything that both of the classifiers like MLC and GTIR would identify. While the preference would be for the higher priority target be the one that both MLC and GTIR simultaneously agree are targets, there could be instances where MLC may identify a target with very high confidence and GTIR not even detected it all. But the nature of the hierarchical combining, since the algorithms extract independent kinds of information, it is possible for either algorithm to detect targets independently. And, the system as disclosed herein will work with just MLC and GTIR. If VSC were to stop functioning, for whatever reason, the system would continue to generate target list and probabilities. But the false alarm rate would be higher than if VSC were functioning.

The same thing would be true if all but one of the algorithms were functioning. If GTIR were suddenly to stop functioning next, the system would still continue to operate and generate target priority lists based upon MLC all by itself.

The primary advantage in using hierarchical combining, as HPL, is to allow the use a training set, which for practical reasons, is always relatively small, to combine independent or even information which is anti-correlated, or weakly-correlated, together in an optimal manner and to build a unitary classifier, which is of large dimensionality as a unitary algorithm but which, in fact, is made up of pieces where the smaller pieces do not interact amongst each other. This then leads to a total classifier which is substantially more robust than on where it was tried to experimentally determine a single classifier where all the individual elements were allowed to interact together.

In this disclosure the independence of the classifiers has been stressed. The concept, however is broader and includes anti-correlation. The notion of independence from a statistical point of view, essentially means that (in this case in reference to about independence and false alarms) if one algorithm were to generate a false alarm than the probability, the fact that a particular algorithm detected a false alarm of a particular type is not related to the kind of false alarms that other algorithms would generate. So, if it did in fact generate the same false alarm, then it was a purely random example for generating it as opposed to one which had some fundamental causative relationship for happening. Anti-correlated is a better property than independence in that if, for example, algorithm MLC were to generate a false alarm, if that false alarm were anti-correlated say with GTIR then that would mean that GTIR would definitely not generate that particular kind of false alarm i.e., it would be impossible for GTIR to generate it. The nature of anti-correlation, is that it is impossible or at least a substantially less possible event in a causative manner, as opposed to a simply random fashion, although there are degrees between fully anti-correlated and fully correlated. Fully anti-correlated would be if an event occurs in one algorithm then, with probability one, it cannot occur in another algorithm. Fully correlated is exactly the opposite. If an event occurs in one algorithm then it would occur with probability one, in another algorithm if they were positively correlated. The independence is essentially halfway between those two points. Saying if an event occurred in one algorithm then that information cannot help in any way in predicting whether that event will occur in another algorithm. HPL allows one to take whatever correlations exist, positive, negative, or independence and to combine that information together in an optimal manner to allow one to make the best decision possible based upon the training data that you have collected in order to estimate these probabilities. MLC, GTIR and VSC are weakly anti-correlated, as it turns out.

Essentially what the Parzen density of the estimation approach does is to start off looking at the covariance matrix for the features that are being fit into it. The covariance matrix is the statistical measure for correlation in a generalized sense and the covariance matrix is generated (it is computing the joint correlation properties for the variables coming in, in terms of one at-a-time, two at-a-time, three at-a-time). All that is contained inside the covariance matrix. The Parzen density estimation looks at how the elements are correlated based upon experimental data. Based upon this correlation, the sample data into a continuous set of data for all the samples that were not seen to generate a probability density function for the observations at hand to end up with a probability measure that automatically takes into account the inherent correlation properties, whatever they may be. In this way, they are automatically taken into account by the Parzen density method. The Parzen method is applicable anytime one maps a set of features into a set of class labels, with probability measure. That happens in each of the algorithms, individually for MLC, VSC and GTIR. The Parzen density estimation process is used to map the respective feature vectors into the probability of targets and HPL does the same thing again using the output measures from the individual algorithms to map into a total composite measure of probability of target.

Hierarchical should be taken in a broad sense if one starts off with a number of bricks to build a house, the individual bricks would be at one given level and would be combined together to form another independent unit, a wall level, and combined as four walls together to form a shell, on which is put a roof. Those things combined together then, were the house, which is a combination of these independent elements that are connected together by some relationship is a hierarchy and they are hierarchically combined when the individual pieces at the lower level are not connected together in some way at a lower level. So in this case, there are the three independent algorithms MLC, GTIR and VSC. Each one is separately extracting information from an image, without regard or without passing information to the other algorithms. They are operating all by themselves in isolation. Each one of those algorithms then has a certain understanding of the picture based upon its point-of-view (information that its capable of extracting). If I then layer on top of those individual algorithms, another algorithm that takes those independent things and combines them together then the output of this higher level algorithm (in our case HPL) has a scope of understanding which spans the understanding of the individual algorithms underneath it. Now, another aspect of a hierarchy is that the information happening at the let's say the second level in a hierarchy, it only communicates with the level below it and the level directly above it, so that in a hierarchical system the information is passed from one level to another, but only at one level at a time, so that you would never pass information at two given levels directly in a hierarchy. To go back to the building analogy, the house which is made up of a roof on top of walls, are two adjacent levels of hierarchy. The house level would not be considered a collection of bricks because the bricks are at a level lower in the hierarchy, so bricks can't talk to houses, but houses can talk to roofs and walls. So that kind of structure allows control of the way information is put together in a system as applied here. Joint edge features do not talk to probability of targets at HPL level because the joint hedge events from MLC are at the lowest level of the hierarchy and then MLC algorithm maps those into a MLC probability of target. An MLC probability of target then is mapped by HPL into a total probability of target. So the total probability of target while it is a function of the joint edge events, the total probability of target has no concept or notion that a joint hedge event ever existed. It only knows that a maximum likelihood of probability target event existed. Correspondingly, the MLC algorithm, it knows that joint hedge events exist and it knows that it is going to output a probability MLC target, but it has no concept of a total probability of target as will be output by a later stage. So the information is isolated in such a way that the piece which receives the information only needs to know about those sources that are providing the information, not how that information is obtained and it then will output a piece of information and what it outputs is not passed on to those who provided the information to it to begin with. In this application, there are three levels in the hierarchy, the lowest level is the input image which is made up of pixels (picture elements), the picture elements are at the lowest in this hierarchy, the next level up then is the algorithmic level where features are extracted at the interface between these pixels and these algorithms. In the new picture here, there is a television camera or sensor which is inputting imagery into the lowest level of the hierarchy, which is the pixel level, there is a feature attraction process which connects the pixel level of the hierarchy into the algorithm level of the hierarchy and the feature attraction (or extraction) process then, in the case of MLC, four joint edge features. In GTIR, there are three features based upon anomalies and in VSC, there are three features based upon a grey level statics. Each one of these algorithms then, at the algorithm level, generate an output which used by the third level of the algorithm as features, so MLC will generate a probability of target given that it comes from the MLC algorithm and so forth for GTIR and VSC. So the third level then is the combining level and has scope as large as MLC, GTIR and VSC is entirely put together. At level two MLC does not talk to GTIR in any way and VSC does not talk to MLC or GTIR in any given way and at the pixel level, the pixels do not talk to each other either they do not communicate to each other in any way at all. So the individual pixels that are in this thing are all separate little entities and then MLC you look at a group of pixels and map them into a feature. The same thing with the other algorithms and HPL. Finally, HPS looks at super groups of pixels to finally put together a final measure of probability of target. That is the nature then of the mapping algorithm herein described. The hierarchy here consists of the three distinct levels that are shown from pixels, to algorithms, to combining the final total output.

What is claimed is:

1. Target detection apparatus comprising:
   MLC means for determining joint edge feature data and for mapping the same into a probability of target with confidence bounds based upon a maximum likelihood statistic experimentally derived from a training set of known examples of known imagery,
   GTIR means for determining target-to-interference ratio matched filter feature data in such a manner so to be independent or anticorrelated to said MLC means, and for mapping the same into a probability of target with confidence bounds based a maximum likelihood statistic experimentally derived from said training set,
   VSC means for determining grey level feature data in such a manner as to be independent or anticorrelated singly and jointly to said MLC and GTIR means, and for mapping said grey level feature data into a probability of target with confidence bounds based upon a maximum likelihood statistic experimentally derived from said training set, and
   HPL means for combining or mapping the target detection outputs from said MLC, GTIR, and VSC means into a composite probability of target with confidence bounds based upon a maximum likelihood statistic experimentally derived from said training set to select a target.

2. A target detection apparatus as defined in claim 1 further including
   means for tracking said selected target.

3. A target detection apparatus as defined in claim 2, wherein said tracking means includes
   a MAD tracker and a centroid tracker,
   said MAD tracker comprising
   means for determining the minimum absolute difference correlation between input data and prior input data, and
   said centroid tracker comprising means for optimal thresholding input data and calculating the centroid of the resulting image.

4. A target detection system as defined in claim 3, wherein one of said trackers reacquires if said other tracker loses said target.

5. A target detection apparatus as defined in claim 1, wherein said GTIR comprises
   means for determining the average local contrast difference between target related picture elements and background related picture elements,
   means for determining the local grey level variation, and
   means for generating a target to interference related function from said local contrast difference and said local grey level variations.

6. A target detection apparatus as defined in claim 5, comprising
   table look-up means for generating a probability of target function and a confidence function from said target to interference function and said local contrast difference,
   said table look-up means comprises a three feature Parzen table array,
   means for generating a feature vector input to said three feature Parzen table from the cluster size, maximum target to interference function level and contrast difference at the target cluster center, means for developing said target cluster size and maximum target to interference function from said target to interference related function, and means for creating said contrast difference at target cluster center from said target to interference related function and said average contrast difference.

7. A target detection apparatus as defined in claim 6, wherein said means for determining the local grey level variation comprises:

means for averaging the vertical picture element values, means for averaging the horizontal picture element values, and means for determining a grey level variation from said vertical picture element value and said horizontal picture element value.

8. A target detection apparatus as defined in claim 6, wherein said means for determining the local grey level variation comprises:

means for averaging the vertical picture element values, means for averaging the horizontal picture element values, and means for determining a grey level variation from said vertical picture element value and said horizontal picture element value.

9. A target detection apparatus as defined in claim 1, wherein said MLC means comprises means for developing an adaptive threshold level for target windows, and means for producing an edge direction map for each picture element in a target sized window.

10. A target detection apparatus as defined in claim 9, wherein said means for developing an adaptive threshold level for target windows comprises means for determining the intensity gradient for non-overlapping neighborhoods having less than target size areas, means for determining the average intensity gradient for the entire image area, look-up table means for developing an average global gradient from said average entire image area gradient, means for averaging the intensity gradient of a group of said non-overlapping neighborhoods and, means for estimating the standard deviation of said group of said non-overlapping neighborhoods, means for summing a function of said standard deviation of said group of said non-overlapping neighborhoods with said average intensity gradient as a group of said non-overlapping neighborhoods, look-up table means for developing a function of said standard deviation of said group of said non-overlapping neighborhoods, and means for producting said average global gradient, said average intensity gradient of said group of said non-overlapping neighborhoods, and said look-up table developed function of said standard deviation of said group of said non-overlapping neighborhoods.

11. A target detection apparatus as defined in claim 9 wherein said means for producing an edge direction map for each picture element in a target sized window comprises:

convolutional means for generating a joint edge map from said edge directional map data, means for computing histograms for target sized window increments of data for those target sized windows containing data above said adaptive threshold level from said joint edge map data and said gradient intensity data, said histogram including means for extracting lower, middle, and upper classes of feature vectors from data representing each selected target window, said each class of feature vectors bounded by upper and lower values and having overlapping ranges, lower, middle, and upper look-up table means for mapping said feature vectors as probability of target functions, and means for producing a target affirmative indication when the probability is 0.5 or greater and a non-target indication when the probability is less than 0.5.

12. A target detection apparatus as defined in claim 1, wherein said VSC means comprises:

means for developing a grey level histogram of a target sized window, means for calculating upper and lower threshold levels for said histogram as a function of histogram characteristics, means for eliminating picture elements falling below the low level value, means for calculating the centroid of a cluster of pixels exceeding said threshold value, means for creating a global histogram from the entire video image, means for calculating a first optimal global histogram from said global histogram and said upper grey level threshold, means for calculating a second global histogram function from said lower grey level threshold, means for calculating a target sized histogram from said target sized histogram data and said low level threshold value, and look-up table means responsive to said upper threshold level global histogram said lower threshold level global histogram said target sized window histogram and said centroid for producing a probability of target function and a confidence function.

13. A target detection apparatus as defined in claim 1, wherein said HPL means comprises means for determining if an input data cluster contains a probability of target assessment, means for determining the types of probability assessments, means for forwarding MLC probability of target data to a one dimensional decision Parzen table, means for forwarding VSC data to a one dimensional decision Parzen table, means for merging MLC probability target and VSC probability of target and data, a two dimensional Parzen table responsive to said merged MLC and VSC data, means for merging MLC probability of target and GTIR probability of target and data, a two feature Parzen table responsive to said merged MLC and GTIR data, a single feature Parzen table responsive to GTIR probability of target data, means to merge GTIR probability of target and VSC probability of target and data, a two feature Parzen table responsive to said merged GTIR and VSC probability of target data, means to merge MLC, GTIR, and VSC probability of target, and a three feature Parzen table responsive to said merged MLC, GTIR, and VSC probability of target data.

14. Apparatus as defined in claim 13, comprising:
final target selection means for ranking the outputs of said decision Parzen tables representing the entire field of view,
a dual mode tracker responsive to the outputs of said final target selection means for selecting a desired target,
said dual mode tracker including a minimum absolute difference correlation tracker 27 and a centroid tracker,
sensor formatter for digitizing the field of view containing the selected target and its immediate surroundings as a target template,
means for generating a minimum absolute difference function for the field of view represented by said template,
means for compensating for tracking vehicle motion,
means for calculating the correlation between a sensed image and a reference provided by said template, and
means for providing feedback signals to the vehicle direction control system.

15. Target detection method comprising the steps of:
determining joint edge feature data and for mapping the same into a probability of target with confidence bounds based upon a maximum likelihood statistic experimentally derived from a training set of known examples of known imagery,
determining target-to-interference ratio matched filter feature data in such a manner so to be independent or anticorrelated to said MLC means, and for mapping the same into a probability of target with confidence bounds based a maximum likelihood statistic experimentally derived from said training set,
determining grey level feature data in such a manner as to be independent or anticorrelated singly and jointly to said MLC and GTIR steps, and for mapping said grey level feature data into a probability of target with confidence bounds based upon a maximum likelihood statistic experimentally derived from said training set, and
combining or mapping the target detection outputs from said MLC, GTIR, and VSC steps into a composite probability of target with confidence bounds based upon a maximum likelihood statistic experimentally derived from said training set.

16. A target detection method as defined in claim 15 further including the step of
tracking said selected target.

17. A target detection method as defined in claim 16, wherein said tracking step includes
determining the minimum absolute difference correlation between input data and prior input data, and
optimal thresholding input data and calculating the centroid of the resulting image.

18. A target detection method as defined in claim 17, wherein one of said trackers reacquires said target if said other tracker loses said target.

19. A method as defined in claim 16, comprising
a final target selection step for ranking the outputs of said decision Parzen tables representing the entire field of view,
providing a dual mode tracker responsive to the outputs of said final target selection means for selecting a desired target,
said dual mode tracker including a minimum absolute difference correlation tracker 27 and a centroid tracker,
a sensor formatter step for digitizing the field of view containing the selected target and its immediate surroundings as a target template,
generating a minimum absolute difference function for the field of view represented by said template,
compensating for tracking vehicle motion,
calculating the correlation between a sensed image and a reference provided by said template, and
providing feedback signals to the vehicle direction control system.

20. A target detection method as defined in claim 15, wherein said GTIR comprises
means for determining the average local contrast difference between target related picture elements and background related picture elements,
means for determining the local grey level variation, and
means for generating a target to interference related function from said local contrast difference and said local grey level variations.

21. A target detection method as defined in claim 20 comprising
generating a probability of target function and a confidence function from said target to interference function and said local contrast difference and storing the same in a look up-table comprising a three feature Parzen table array,
generating a feature vector input to said three feature Parzen table array from the cluster size maximum target to interference function level and contrast difference at the target cluster center,
means for developing said target cluster size and maximum target to interference function from said target to interference related function, and
means for creating said contrast difference at target cluster center from said target to interference related function and said average contrast difference.

22. A target detection method as defined in claim 21, wherein said means for determining the local grey level variation comprises
averaging the vertical picture element values,
averaging the horizontal picture element values, and
determining a grey level variation from said vertical picture element value and said horizontal picture element value.

23. A target detection method as defined in claim 15, wherein said MLC step comprises
developing an adaptive threshold level for target windows, and
producing an edge direction map for each picture element in a target sized window.

24. A target detection method as defined in claim 23, wherein said step for developing an adaptive threshold level-for target windows comprises
determining the intensity gradient for non-overlapping neighborhoods having less than target size areas,
determining the average intensity gradient for the entire image area,
a look-up table step for developing an average global gradient from said average entire image area gradient,
averaging the intensity gradient of a group of said non-overlapping neighborhoods and, estimating the standard deviation of said group of said non-overlapping neighborhoods, summing a function of said standard deviation of said group of said non-overlapping neighborhoods with said average intensity gradient as a group of said non-overlapping neighborhoods, a look-up table step for developing a function of said standard deviation of said group of said non-overlapping neighborhoods, and producting said average global gradient, said average intensity gradient of said group of said non-overlapping neighborhoods, and said look-up table developed function of said standard deviation of said group of said non-overlapping neighborhoods.

25. A target detection method as defined in claim 23 wherein said step for producing an edge direction map for each picture element in a target sized window comprises:

a convolutional step for generating a joint edge map from said edge directional map data, computing histograms for target sized window increments of data for those target sized windows containing data above said adaptive threshold level from said joint edge map data and said gradient intensity data, said histogram step including extracting lower, middle, and upper classes of feature vectors from data representing each selected target window, said each class of feature vectors bounded by upper and lower values and having overlapping ranges, a lower, middle, and upper look-up table step for mapping said feature vectors as probability of target functions, and producing a target affirmative indication when the probability is 0.5 or greater and a non-target indication when the probability is less than 0.5.

26. A target detection method as defined in claim 15, wherein said VSC step comprises developing a grey level histogram of a target sized window, calculating upper and lower threshold levels for said histogram as a function of histogram characteristics, eliminating picture elements falling below the low level value, calculating the centroid of a cluster of pixels exceeding said threshold value, creating a global histogram from the entire video image, calculating a first optimal global histogram from said global histogram and said upper grey level threshold, calculating a second global histogram function from said lower grey level threshold, calculating a target sized histogram from said target sized histogram data and said low level threshold value, and a look-up table step responsive to said upper threshold level global histogram said lower threshold level global histogram said target sized window histogram and said centroid for producing a probability of target function and a confidence function.

27. A target detection method as defined in claim 15, wherein said HPL step comprises determining if an input data cluster contains a probability of target assessment, determining the types of probability assessments, forwarding MLC probability of target data to a one dimensional decision Parzen table, forwarding VSC data to a one dimensional decision Parzen table, merging MLC probability target and VSC probability of target and data, a two dimensional Parzen table step to said merged MLC and VSC data, merging MLC probability of target and GTIR probability of target and data, providing a two feature Parzen table responsive to said merged MLC and GTIR data, providing a single feature Parzen table responsive to GTIR probability of target data, merging GTIR probability of target and VSC probability of target and data, providing a two feature Parzen table responsive to said merged GTIR and VSC probability of target data, merging MLC, GTIR, and VSC probability of target, and providing a three feature Parzen table responsive to said merged MLC, GTIR, and VSC probability of target data.

28. The target detection method as in claim 15, in which said combining step is carried out in a joint decision space.

29. The target detection method as in claim 15, further including running a training set of known images through each of the above four steps to train the system.

30. Target detection apparatus comprising first means for determining first feature data and for mapping the same into a probability of target with confidence bounds based upon a maximum likelihood statistic experimentally derived from a training set of known examples of known imagery to give a first list of targets, second means for determining second ratio matched feature data in such a manner so to be independent or anticorrelated to said first means, and for mapping the same into a probability of target with confidence bounds based a maximum likelihood statistic experimentally derived from said training set to give a second list of targets, said first and second feature data being statistically independent or anticorrelated, means for combining or mapping the target lists from said first and second means into a composite probability of target with confidence bounds based upon a maximum likelihood statistic experimentally derived from said training set, and target prioritization means for ranking the target output of said means to yield a target ranking list.

31. In a target detection method for detecting targets in a sensed image to determine the correlation probability of objects in the image to stored feature recognition data, comprising generating a feature pattern corresponding to a first algorithmic point of view of the scene, matching the feature pattern with a stored set of feature recognition data of the same algorithmic point of view to determine the correlation probability therewith, generating one or more other feature patterns from one or more other points of view of the scene which are independent of the first point of view in all combinations, both singly and jointly, matching the other feature patterns with other stored sets of feature recognition data of the other points of view, said points of view being represented by algorithms different from each other in such ways as to generate correlated true detection but independent of anticorrelated false detections in all combinations, both singly and jointly.

32. Apparatus for detecting targets in a sensed image to determine the correlation probability of objects in the image to stored feature recognition data, comprising means for generating a feature pattern corresponding to a first algorithmic point of view of the scene, means for matching the feature pattern with a stored set of feature recognition data of the same algorithmic point of view to determine the correlation probability therewith, means for generating one or more other feature patterns from one or more other points of view of the scene which are independent of the first point of view in all combinations, both singly and jointly, means for matching the other feature patterns with other stored sets of feature recognition data of the other points of view, said points of view being represented by algorithms different from each other in such ways as to generate correlated true detection but independent of anticorrelated false detections in all combinations, both singly and jointly.

33. A target detection method comprising determining joint edge events and for mapping the same into a measure of probability of target based on a maximum likelihood junction derived from a training set, determining target-to-interference ratio data and for mapping the same into a measure of probability of target based on a matched filter function, determining spatial clustering features and for mapping the same into a measure of probability of target based on a geometric function, said MLC, GTIR, VSC, and HPL steps being capable of being trained by a set of known targets in sets of exemplar visual fields to develop a knowledge base, said MLC, GTIR, and VSC steps being substantially singly and jointly independent of or anticorrelating of each other in all combinations, HPL combining the target detection outputs from said MLC, GTIR, and VSC means into a mapping function based upon the training data, so that said system is ready to process and identify unknown targets in new visual fields, running a training set including known targets each of the above process steps to develop a knowledge base of extrapolated known situations subsequently processing new visual fields with unknown targets using said knowledge base through each of said MLC, GTIR, VSC, and HPL steps.

34. A target detection system comprising

MLC means for determining joint edge events and for mapping the same into a measure of probability of target based on a maximum likelihood function derived from a training set to develop a knowledge base, GTIR means for determining target-to-interference ratio data and for mapping the same into a measure of probability of target based on a matched filter function derived from a training set to develop a knowledge base, VSC means for determining spatial clustering features and for mapping the same into a measure of probability of target based on a geometric function derived from a training set to develop a knowledge base, said MLC, GTIR, and VSC means being substantially singly and jointly independent of or anticorrelating of each other in all combinations, HPL means for combining the target detection outputs from said MLC, GTIR, and VSC means into a mapping function based upon the training data, said MLC, GTIR, VSC, and HPL means being capable of being trained by a set of known targets in sets of visual fields to develop a knowledge base, so that said system is ready to process and identify unknown targets in new visual fields.

35. Target detection apparatus comprising

MLC means for determining joint edge feature data and for mapping the same into a probability of target with confidence bounds based upon a maximum likelihood statistic experimentally derived from a training set of known examples of known imagery to select a target, GTIR means for determining target-to-interference ratio matched filter feature data in such a manner so to be independent or anticorrelated to said MLC means, and for mapping the same into a probability of target with confidence bounds based on a maximum likelihood statistic experimentally derived from said training set to select a target, and means responsive to said MLC means for aiming a missile at said target.

36. A target detection apparatus comprising

GTIR means for determining target-to-interference ratio matched filter feature data in such a manner so to be independent or anticorrelated to other target detection means, and for mapping the same into a probability of target with confidence bounds based on a maximum likelihood statistic experimentally derived from said training set to select a target, said GTIR means including means for determining the average local contrast difference between target related picture elements and background related picture elements, means for determining the local grey level variation, and means for generating a target to interference related function from said local contrast difference and said local grey level variations.

37. A target detection apparatus as defined in claim 36, comprising table look-up means for generating a probability of target function and a confidence function from said target to interference function and said local contrast difference said table look-up means comprises a three feature Parzen table array, means for generating a feature vector input to said three feature Parzen table from the cluster size, maximum target to interference function level and contrast difference at the target cluster center, means for developing said target cluster size and maximum target to interference function from said target to interference related function, and means for creating said contrast difference at target cluster center from said target to interference related function and said average contrast difference.

38. Target detection apparatus comprising
MLC means for determining joint edge feature data and for mapping the same into a probability of target with confidence bounds based upon a maximum likelihood statistic experimentally derived from a training set of known examples of known imagery to select a target, and
means responsive to said MLC means for aiming a missile at said target.

39. A target detection apparatus as defined in claim 38, wherein said MLC means comprises
means for developing an adaptive threshold level for target windows, and
means for producing an edge direction map for each picture element in a target sized window.

40. A target detection apparatus as defined in claim 39, wherein said means for developing an adaptive threshold level for target windows comprises
means for determining the intensity gradient for non-overlapping neighborhoods having less than target size areas,
means for determining the average intensity gradient for the entire image area,
look-up table means for developing an average global gradient from said average entire image area gradient,
means for averaging the intensity gradient of a group of said non-overlapping neighborhoods and,
means for estimating the standard deviation of said group of said non-overlapping neighborhoods,
means for summing a function of said standard deviation of said group of said non-overlapping neighborhoods with said average intensity gradient as a group of said non-overlapping neighborhoods,
look-up table means for developing a function of said standard deviation of said group of said non-overlapping neighborhoods, and
means for producing said average global gradient, said average intensity gradient of said group of said non-overlapping neighborhoods, and said look-up table developed function of said standard deviation of said group of said non-overlapping neighborhoods.

41. A target detection apparatus as defined in claim 39 wherein said means for producing an edge direction map for each picture element in a target sized window comprises:
convolutional means for generating a joint edge map from said edge directional map data,
means for computing histograms for target sized window increments of data for those target sized windows containing data above said adaptive threshold level from said joint edge map data and said gradient intensity data,
said histogram including means for extracting lower, middle, and upper classes of feature vectors from data representing each selected target window, said each class of feature vectors bounded by upper and lower values and having overlapping ranges,
lower, middle, and upper look-up table means for mapping said feature vectors as probability of target functions, and
means for producing a target affirmative indication when the probability is 0.5 or greater and a non-target indication when the probability is less than 0.5.

42. In target detection apparatus including a plurality of means for target selection
HPL means for combining said target selections from said means into a composite probability of target with confidence bounds based upon a maximum likelihood statistic experimentally derived from a training set, and
target prioritization means for ranking the target output of said HPL means to yield a target ranking list.

43. A target detection apparatus comprising
MLC means for determining joint feature data and for mapping the same into a probability of target with confidence bounds based upon a maximum likelihood statistic experimentally derived from a training, of known examples of known imagery to select a target,
GTIR means for determining target-to-interference ratio matched filter feature data in such a manner so to be independent or anticorrelated to other target detection means, and for mapping the same into a probability of target with confidence bounds based on a maximum likelihood statistic experimentally derived from said training set to select a target,
VSC means for determining grey level feature data in such a manner as to be independent or anticorrelated singly and jointly to said MLC and GTIR means, and for mapping said grey level feature data into a probability of target with confidence bounds based upon a maximum likelihood statistic experimentally derived from said training set to select a target,
HPL means for combining (or mapping) said target selections from said means into a composite probability of target with confidence bounds based upon a maximum likelihood statistic experimentally derived from a training set,
means for determining if an input data cluster contains a probability of target assessment,
means for determining the types of probability assessments,
means for forwarding MLC probability of target data to a one dimensional decision Parzen table,
means for forwarding VSC data to a one dimensional decision Parzen table,
means for merging MLC probability target and VSC probability of target and data,
a two dimensional Parzen table responsive to said merged MLC and VSC data,
means for merging MLC probability of target and GTIR probability of target and data,
a two feature Parzen table responsive to said merged MLC and GTIR data,
a single feature Parzen table responsive to GTIR probability of target data,
means to merge GTIR probability of target and VSC probability of target and data,
a two feature Parzen table responsive to said merged GTIR and VSC probability of target data,
means to merge MLC, GTIR, and VSC probability of target, and
a three feature Parzen table responsive to said merged MLC, GTIR, and VSC probability of target data, and
target prioritization means for ranking the target output of said HPL means to yield a target ranking list.

44. Apparatus as defined in claim 43, comprising
final target selection means for ranking the outputs of said decision Parzen tables representing the entire field of view,
a dual mode tracker responsive to the outputs of said final target selection means for selecting a desired target,
said dual mode tracker including a minimum absolute difference correlation tracker 27 and a centroid tracker,
sensor formatter for digitizing the field of view containing the selected target and its immediate surroundings as a target template,
means for generating a minimum absolute difference function for the field of view represented by said template,
means for compensating for tracking vehicle motion,
means for calculating the correlation between a sensed image and a reference provided by said template, and
means for providing feedback signals to the vehicle direction control system.

45. Target detection apparatus comprising
MLC means for determining joint edge feature data and for mapping the same into a probability of target with confidence bounds based upon a maximum likelihood statistic experimentally derived from a training set of known examples of known imagery, and
VSC means for determining grey level feature data in such a manner as to be independent or anticorrelated singly and jointly to said MLC means, and for mapping said grey level feature data into a probability of target with confidence bounds based upon a maximum likelihood statistic experimentally derived from said training set,
means for combining or mapping the target detection outputs from MLC and VSC into a ranked composite probability to select a most probable target.

46. Target detection method comprising
MLC means for determining joint edge feature data and for mapping the same into a probability of target with confidence bounds based upon a maximum likelihood statistic experimentally derived from a training set of known examples of known imagery to select a target,
a GTIR step for determining target-to-interference ratio matched filter feature data in such a manner so to be independent or anticorrelated to said MLC means, and for mapping the same into a probability of target with confidence bounds based on a maximum likelihood statistic experimentally derived from said training set to select a target, and
a step responsive to the output of one of said MLC or GTIR step for aiming a missile at said target.

47. A target detection method comprising
a GTIR step for determining target-to-interference ratio matched filter feature data in such a manner so to be independent or anticorrelated to said MLC means, and for mapping the same into a probability of target with confidence bounds based on a maximum likelihood statistic experimentally derived from said training set to select a target,
determining the average local contrast difference between target related picture elements and background related picture elements,
determining the local grey level variation, and
generating a target to interference related function from said local contrast difference and said local grey level variations.

48. A target detection system as defined in claim 47 comprising
generating a probability of target function and a confidence function from said target to interference function and said local contrast difference and storing the same in a look-up table comprising a three feature Parzen table array,
generating a feature vector input to said three feature Parzen table array from the cluster size maximum target to interference function level and contrast difference at the target cluster center,
developing said target cluster size and maximum target to interference function from said target to interference related function, and
creating said contrast difference at target cluster center from said target to interference related function and said average contrast difference.

49. A target detection method as defined in claim 48, wherein said means for determining the local grey level variation comprises
averaging the vertical picture element values,
averaging the horizontal picture element values, and
determining a grey level variation from said vertical picture element value and said horizontal picture element value.

50. Target detection apparatus comprising
an MLC step for determining joint edge feature data and for mapping the same into a probability of target with confidence bounds based upon a maximum likelihood statistic experimentally derived from a training set of known examples of known imagery to select a target, and
a step responsive to said MLC step for aiming a missile at said target.

51. A target detection method as defined in claim 50, wherein said MLC step comprises
developing an adaptive threshold level for target windows, and
producing an edge direction map for each picture element in a target sized window.

52. A target detection method as defined in claim 51 wherein said step for developing an adaptive threshold level for target windows comprises
determining the intensity gradient for non-overlapping neighborhoods having less than target size areas,
determining the average intensity gradient for the entire image area,
a look-up table step for developing an average global gradient from said average entire image area gradient,
averaging the intensity gradient of a group of said non-overlapping neighborhoods,
estimating the standard deviation of said group of said non-overlapping neighborhoods,
summing a function of said standard deviation of said group of said non-overlapping neighborhoods with said average intensity gradient as a group of said non-overlapping neighborhoods,
a look-up table step for developing a function of said standard deviation of said group of said non-overlapping neighborhoods, and
producting said average global gradient, said average intensity gradient of said group of said non-overlapping neighborhoods, and said look-up table developed function of said standard deviation of said group of said non-overlapping neighborhoods.

53. A target detection method as defined in claim 51 wherein said step for producing an edge direction map for each picture element in a target sized window comprises a convolutional step for generating a joint edge map from said edge directional map data, computing histograms for target sized window increments of data for those target sized windows containing data above said adaptive threshold level from said joint edge map data and said gradient intensity data, said histogram step including extracting lower, middle, and upper classes of feature vectors from data representing each selected target window, said each class of feature vectors bounded by upper and lower values and having overlapping ranges, a lower, middle, and upper look-up table step for mapping said feature vectors as probability of target functions, and producing a target affirmative indication when the probability is 0.5 or greater and a non-target indication when the probability is less than 0.5.

54. Target detection method comprising a MLC step for determining joint edge feature data and for mapping the same into a probability of target with confidence bounds based upon a maximum likelihood statistic experimentally derived from a training set of known examples of known imagery to select a target, a VSC step for determining grey level feature data in such a manner as to be independent or anticorrelated singly and jointly to said MLC step, and for mapping said grey level feature data into a probability of target with confidence bounds based upon a maximum likelihood statistic experimentally derived from said training set to select a target, and a step responsive to one of said MLC step or VSC for aiming a missile at said target.

55. A target detection method comprising a VSC step for determining grey level feature data, and for mapping said grey level feature data into a probability of target with confidence bounds based upon a maximum likelihood statistic experimentally derived from said training set to select a target, including the steps of developing a grey level histogram of a target sized window, calculating upper and lower threshold levels for said histogram as a function of histogram characteristics, eliminating picture elements falling below the low level value, calculating the centroid of a cluster of pixels exceeding said threshold value, creating a global histogram from the entire video image, calculating a first optimal global histogram from said global histogram and said upper grey level threshold, calculating a second global histogram function from said lower grey level threshold, calculating a target sized histogram from said target sized histogram data and said low level threshold value, and a look-up table step responsive to said upper threshold level global histogram said lower threshold level global histogram said target sized window histogram and said centroid for producing a probability of target function and a confidence function.

56. Method for detecting targets in a sensed image to determine the correlation probability of objects in the image to stored feature recognition data, comprising generating a feature pattern corresponding to a first algorithmic point of view of the scene, matching the feature pattern with a stored set of feature recognition data of the same algorithmic point of view to determine the correlation probability therewith, generating one or more other feature patterns from one or more other points of view of the scene which are independent of the first point of view in all combinations, both singly and jointly, matching the other feature patterns with other stored sets of feature recognition data of the other points of view, said points of view being represented by algorithms different from each other in such ways as to generate correlated true detection but independent of anticorrelated false detections in all combinations, both singly and jointly.

57. Target detection method comprising the steps of:

determining a first feature data and mapping the same into a probability of target with confidence bounds based upon a maximum likelihood statistic experimentally derived from a training set of known examples of known imagery, determining a second feature data in such a manner so to be independent or anticorrelated to said first data and mapping the same into a probability of target with confidence bounds based upon a maximum likelihood statistic experimentally derived from said training set, and combining or mapping the target detection outputs from said first and second feature data determining steps into a composite probability of target with confidence bounds based upon a maximum likelihood statistic experimentally derived from said training set.

58. Target detection apparatus comprising

MLC means for determining joint edge feature data and for mapping the same into a probability of target with confidence bounds based upon a maximum likelihood statistic experimentally derived from a training set of known examples of known imagery to select a target, VSC means for determining grey level feature data in such a manner as to be independent or anticorrelated singly and jointly to said MLC and GTIR means, and for mapping said, grey level feature data into a probability of target with confidence bounds based upon a maximum likelihood statistic experimentally derived from said training set to select a target, and means responsive to one of said MLC or VSC means for aiming a missile at said target.

59. A target detection apparatus comprising

VSC means for determining grey level feature data and for mapping grey level feature data into a probability of target with confidence bounds based upon a maximum likelihood statistic experimentally derived from said training set to select a target, said VSC means including means for developing a grey level histogram of a target sized window, means for calculating upper and lower threshold levels for said histogram as a function of histogram characteristics, means for eliminating picture elements falling below the low level value, means for calculating the centroid of a cluster of pixels exceeding said threshold value, means for creating a global histogram from the entire video image, means for calculating a first optimal global histogram from said global histogram and said upper grey level threshold, means for calculating a second global histogram function from said lower grey level threshold, means for calculating a target sized histogram from said target sized histogram data and said low level threshold value, and look-up table means responsive to said upper threshold level global histogram said lower threshold level global histogram said target sized window histogram and said centroid for producing a probability of target function and a confidence function.

* * * * *